United States Patent
Goulding et al.

(10) Patent No.: US 7,335,404 B2
(45) Date of Patent: *Feb. 26, 2008

(54) LIQUID CRYSTAL COMPOSITION FOR USE IN BISTABLE LIQUID CRYSTAL DEVICES

(75) Inventors: Mark John Goulding, Ringwood (GB); Matthew Francis, Eastleigh (GB); John Clifford Jones, Leighsinton (GB); Stephen Beldon, Ledbury (GB)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 183 days.

This patent is subject to a terminal disclaimer.

(21) Appl. No.: 10/555,593

(22) PCT Filed: Apr. 13, 2004

(86) PCT No.: PCT/EP2004/003866

§ 371 (c)(1),
(2), (4) Date: Nov. 7, 2005

(87) PCT Pub. No.: WO2004/099343

PCT Pub. Date: Nov. 18, 2004

(65) Prior Publication Data

US 2007/0080325 A1  Apr. 12, 2007

(30) Foreign Application Priority Data

May 8, 2003 (EP) .................. 03010370

(51) Int. Cl.
*C09K 19/42* (2006.01)
*C09K 19/30* (2006.01)
*C09K 19/34* (2006.01)
*C09K 19/20* (2006.01)
*C09K 19/12* (2006.01)
*G02F 1/1333* (2006.01)

(52) U.S. Cl. ............. 428/1.3; 252/299.01; 252/299.61; 252/299.63; 252/299.66; 252/299.67; 349/177; 349/182

(58) Field of Classification Search ................ 428/1.1, 428/1.3; 252/299.61, 299.63, 299.66, 299.67, 252/299.01; 349/177, 182
See application file for complete search history.

(56) References Cited

U.S. PATENT DOCUMENTS

| | | | |
|---|---|---|---|
| 6,249,332 B1 | 6/2001 | Bryan-Brown et al. | |
| 6,440,506 B1 | 8/2002 | Kojima et al. | |
| 6,569,503 B1 | 5/2003 | Hirschmann et al. | |
| 2002/0086120 A1 | 7/2002 | Jacob et al. | |
| 2003/0043323 A1 | 3/2003 | Roosendaal et al. | |
| 2006/0054858 A1* | 3/2006 | Francis et al. | 252/299.01 |
| 2006/0115603 A1* | 6/2006 | Francis et al. | 428/1.1 |

FOREIGN PATENT DOCUMENTS

| | | |
|---|---|---|
| DE | 10020059 | 1/2001 |
| WO | WO 9714990 | 4/1997 |
| WO | WO 9934251 | 7/1999 |
| WO | WO 0140853 | 6/2001 |
| WO | WO 2004053020 | 6/2004 |
| WO | WO 2004053021 | 6/2004 |

OTHER PUBLICATIONS

Jones J et al: "Novel Bistable Liquid Crystal Displays Based on Grating Alignment" Proceedings of the SPIE, SPIE, Bellingham, VA, US, vol. 3955, Jan. 27, 2000 pp. 84-93, XP008003419.

Jones J C et al: "Transflective and Single Polariser Reflective Zenithal Bistable Displays" 2003 SID International Symposium Digest of Technical Papers. Baltimore, MD, May 20-22, 2003, SID International Symposium Digest of Technical Papers, San Jose, CA: SID, US, vol. vol. 34/1, May 20, 2003, pp. 190-193, XP001171719.

* cited by examiner

*Primary Examiner*—Shean C Wu
(74) *Attorney, Agent, or Firm*—Millen, White, Zelano, Branigan, P.C.

(57) ABSTRACT

The invention is directed to the use of a liquid crystal composition in a bistable liquid crystal device and especially in a single polariser reflective or transflective zenithal bistable nematic liquid crystal device as well as a bistable liquid crystal device comprising the liquid crystal composition.

31 Claims, 3 Drawing Sheets

Figures
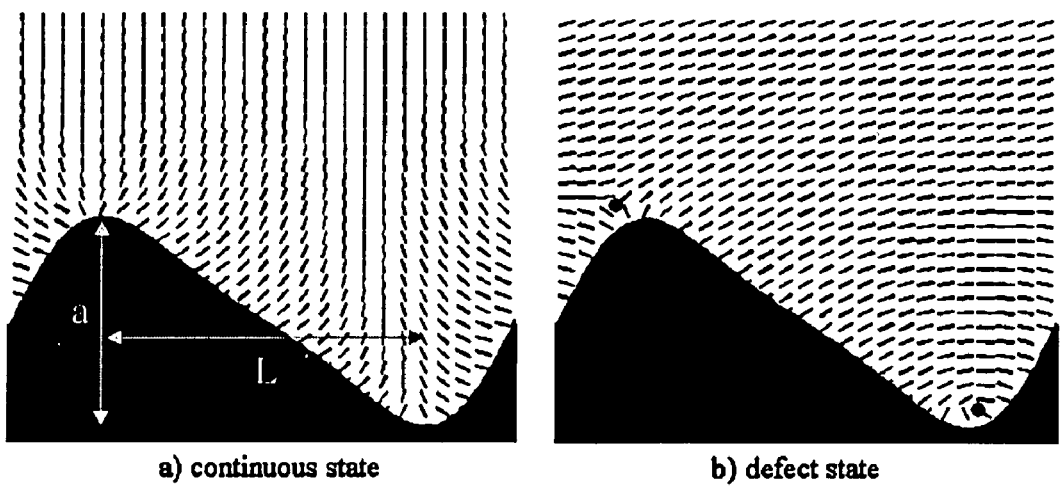
a) continuous state        b) defect state
Figure 1. Illustration of zenithal bistability using grating alignment (with the lines indicating the local director) showing a) the high tilt (continuous) and b) the low tilt (defect) states.
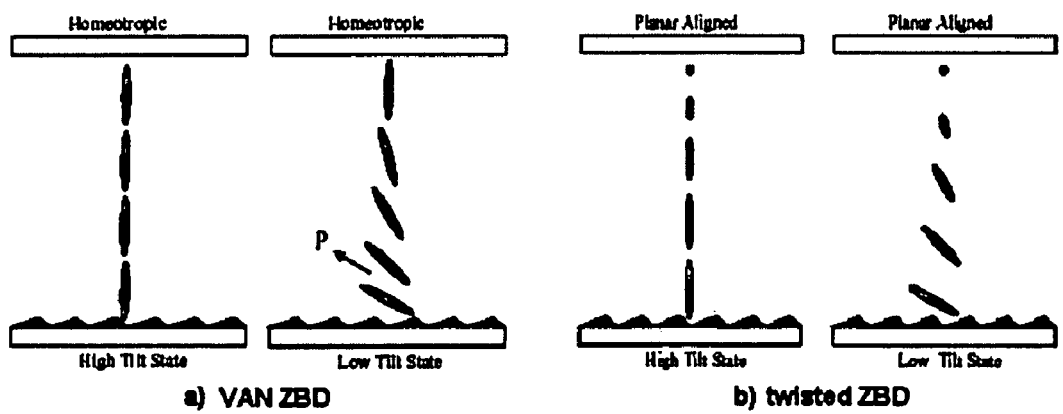
Figure 2. The a) VAN-HAN and b) HAN-TN geometries for ZBD showing the director distribution of the high and low tilt states.

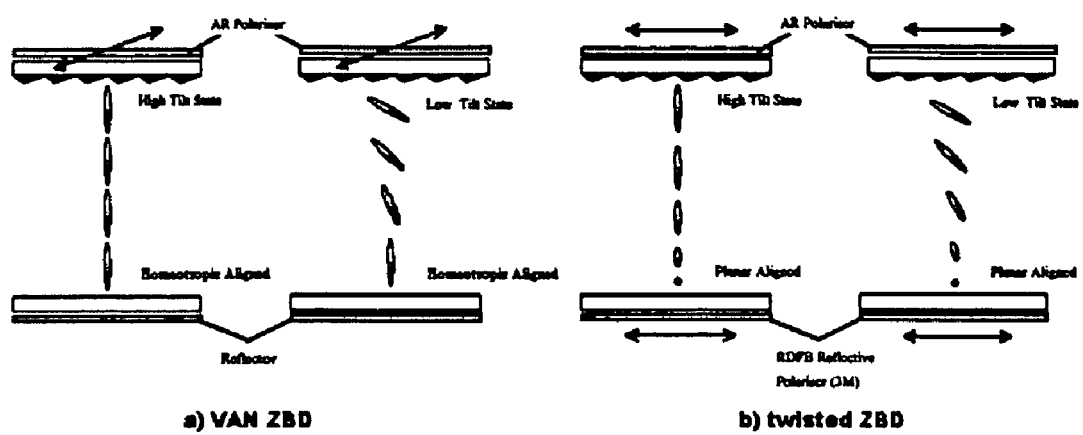
Figure 3. The a) VAN-HAN and b) HAN-TN geometries for ZBD reflective devices

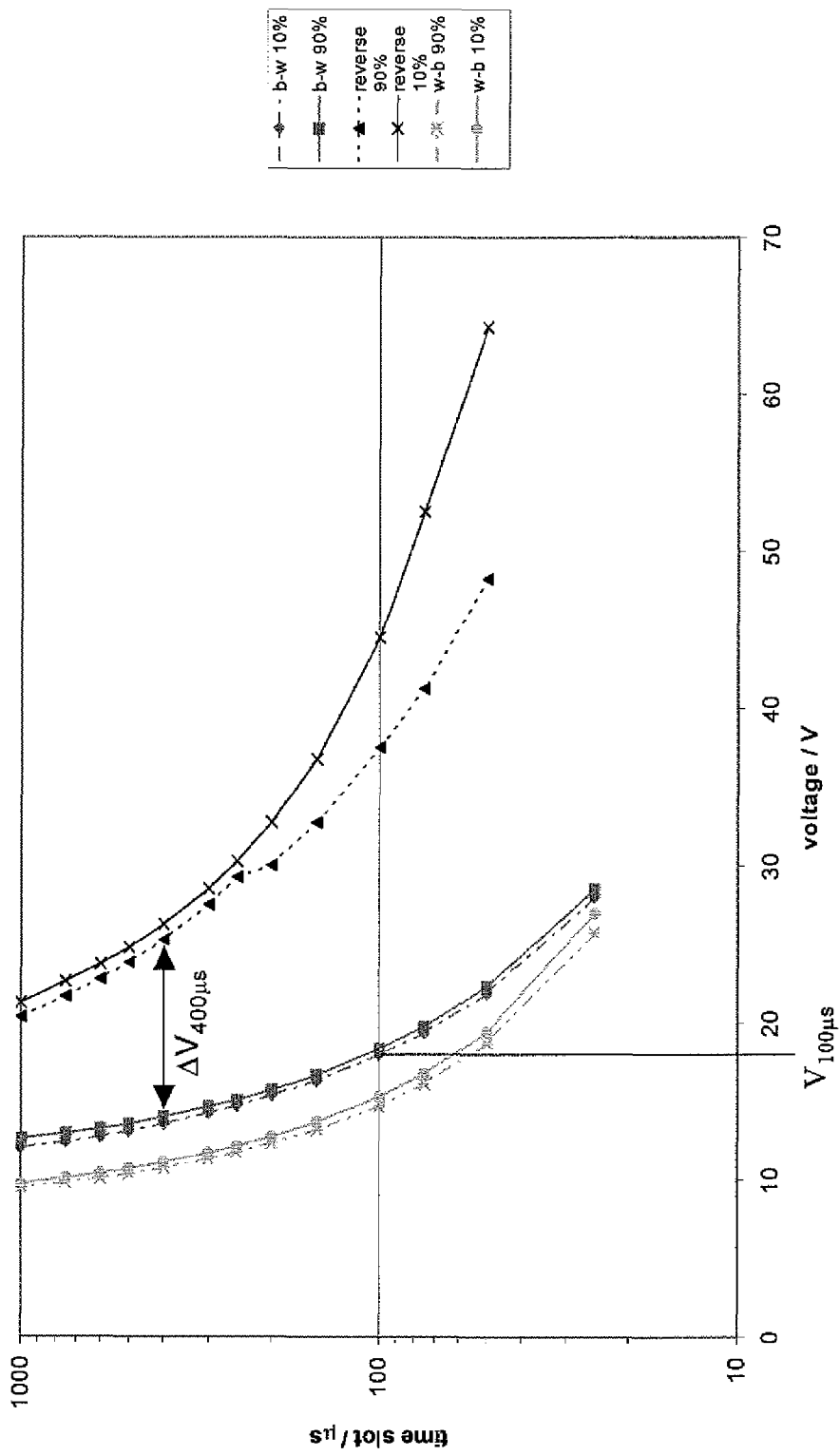
FIGURE 4 The τ-V curve for MLC-6204-000 at 25°C (pulse duration or time slot vs. voltage). The switching voltage ($V_{100\mu s}$) and operating window ($\Delta V_{400\mu s}$) used for comparisons are indicated.

LIQUID CRYSTAL COMPOSITION FOR USE IN BISTABLE LIQUID CRYSTAL DEVICES

The invention is directed to the use of a liquid crystal composition in a bistable liquid crystal device and especially in a single polariser reflective or transflective zenithal bistable nematic liquid crystal device as well as a bistable liquid crystal device comprising the liquid crystal composition.

Electrooptical devices utilizing liquid crystal media for displaying information are well known and used in a wide variety of technical applications (see, for a review, H. Kawamoto, Proc. IEEE, 90, 460 (2002)). Among these, nematic liquid crystal devices are the most prominent; there are, for instance, twisted nematic (TN) liquid crystal devices (M. Schadt and W. Helfrich, Appl. Phys. Lett., 18, 127 (1971)) and super-twisted nematic (STN) liquid crystal devices (see, inter alia, T. J. Scheffer and J. Nehring, Appl. Phys. Lett., 48, 1021 (1984)). These devices are monostable, i.e. the liquid crystal medium is switched to an ON state by application of a suitable voltage, and is allowed to switch to an OFF state when the voltage applied falls below a lower voltage level.

In order to display complex information, electrooptical devices need to comprise a number of picture elements that can be switched independently of each other. However, when direct or even multiplex addressing of pixels are used, the number of elements addressable in nematic liquid crystal displays is limited, in the first case by mere geometrical requirements of the electrical connections and in the second case by the steepness of the device's transmission versus the voltage curve.

This limitation can be overcome by incorporating thin film transistors (TFT) into each picture element. Such devices, also known as active matrix (AM) displays, enable addressing of a high number of picture elements and thus of large area, high resolution displays and with relatively low voltage requirements. Some of these devices are also mechanically rather stable and have a wide temperature range.

Although this allows the construction of small and portable battery powered displays, for certain applications the techniques have several drawbacks. Manufacturing AM displays is still a complicated process involving the building up of a complex assembly that contributes to rather high costs of production. Since the device has no intrinsic or internal memory, constant update of the display even for static images is required. This causes relatively high power consumption and, hence, rather poor battery life time. This is especially undesirable for portable devices displaying information that is changed only from time to time or in a limited part of the display such as mobile phones, personal digital assistants (PDAs), pagers, electronic shelf edge labels, and the like.

An approach to avoid the limitations and drawbacks of these nematic liquid crystal devices is to use displays with an internal memory effect, e.g. a bistable liquid crystal device. Bistability means that the molecules of the liquid crystal medium inside the device can adopt two different stable states. Consequently, by applying a suitable addressing scheme the liquid crystal molecules of the medium are switched into a first stable state that persists even after addressing; utilization of another addressing scheme causes the liquid crystal molecules to adopt a second stable state that likewise persists after addressing.

BRIEF DESCRIPTION OF THE DRAWINGS

FIG. 1: The illustration of zenithal bistability using grating alignment with the lines represent the local director of the liquid crystal molecules showing a) the high tilt (continuous) and b) the low tilt (defect) states.

FIG. 2: The a) homeotropic alignment of the liquid crystal director (VAN mod) and b) planar alignment of the director (twisted (TN) mode).

FIG. 3: The display geometries of a) the vertically aligned nematic (VAN) mode for a single polarizer device in the retardation mode and b) the twisted nematic (TN) mode two-polarizer device in the polarization mode.

FIG. 4: The illustration of the $\tau$-V curve for MLC-6204-000 at 25° C. (pulse duration $\tau$ or time slot vs. voltage for 10 and 90% switching levels with opposite polarities.

Ferroelectric liquid crystal displays using smectic liquid crystal materials can be made into bistable devices. They have, however, several disadvantages, e.g. lack of shock resistance, narrow operating temperature range, and low cell gap causing manufacturing difficulties. Therefore, these ferroelectric devices are unlikely to fulfill the requirements to displays for the portable devices mentioned above.

However, not only ferroelectric smectic liquid crystals are capable of being used in bistable devices but also nematic liquid crystals. Besides other approaches that utilize bistable bulk configurations adopted by nematic liquid crystals (see, for instance, I. Dozov et al., "Recent improvements of bistable nematic displays switched by anchoring breaking (BiNem®)", Proceedings SID 01 (2001), 16.1, 224 and references therewithin), a promising way of achieving bistability in a nematic liquid crystal display is to use a surface alignment which can support two or more stable states. As discussed in literature (see, for instance, J. C. Jones, G. Bryan-Brown, E. Wood, A. Graham, P. Brett and J. Hughes, "Novel bistable liquid crystal displays based on grating alignment", in "Liquid Crystal Materials, Devices, and Flat Panel Displays", R. Shashidhar, B. Gnade, Eds., Proceedings of SPIE Vol. 3955 (2000), 84 and references cited therein) two types, azimuthal and zenithal bistability, can be distinguished.

In the first instance (i.e. azimuthal bistability), the director of the liquid crystal molecules in the display having a grating alignment on the surface of one of the display cell's plates (or substrates) will lie parallel to said plate in both stable states; that means that switching between the stable states occurs within the plane of the display cell's plates (see, for instance, WO 92/00546 and WO 95/22077 which describes the use of a substrate having a bigrating alignment layer). However, reproducing selection of the stable states is found to be difficult and switching generally requires a high switching voltage.

On the other hand, zenithal bistability is observed when the zenithal bistable surface is used (see FIG. 1; the tiny lines represent the local director of the liquid crystal molecules that are oriented by interaction with the surface grating and appropriate alignment layer). With such a surface, the director of the liquid crystal molecules has two possible configurations with different pretilt angles in the same azimuthal plane (i.e. the plane perpendicular to the surface of the display cell's substrate). The first state is the continuous high tilt state (C) while the second state is the defect low tilt state (D). The grating of the zenithal bistable surface is defined by its amplitude a and its pitch L; typical values are for L of about 1 µm and for a of about 0.6 to 0.8 µm (see WO 97/14990 and, for more details, WO 02/08825; and J. C. Jones, G. Bryan-Brown, E. Wood, A. Graham, P. Brett and J. Hughes, "Novel bistable liquid crystal displays based on grating alignment", in "Liquid Crystal Materials, Devices, and Flat Panel Displays", R. Shashidhar, B. Gnade, eds., Proceedings of SPIE Vol. 3955 (2000), 84).

A homeotropic orientation can be induced, for example by coating the grating with a homeotropic alignment layer. This homeotropic alignment induced orientation ensures that the director of the liquid crystal molecules does not lie parallel to the grooves of the grating. Although the orientation of the director of the liquid crystal molecules is perpendicular to the (local) surface, i.e. varying with the location on the surface along a direction perpendicular to the grooves, the orientation in the "bulk" is very much influenced by the opposite surface alignment in both states. Switching from one stable state to the other may be achieved by applying a simple electrical pulse thereby causing a switch from a black display or picture element to a white one (or vice versa) with the appropriate polariser configuration and retardation. Switching back to the original state occurs upon application of a pulse of opposite polarity thereby causing a switch from white to black (or vice versa). Switching may also be induced by using pulses of same polarity but with much higher voltages (also referred to as "reverse switching"); however, reverse switching is a detrimental effect which limits the operation of a zenithal bistable nematic device in terms of the addressing and so a high a voltage as possible is desired for the reverse switching.

In general, for obtaining zenithal bistability only one of the two display cell substrates is provided with a surface grating. The opposite plate may have a surface providing a homeotropic alignment of the liquid crystal director (VAN mode, see FIG. 2a)) or a surface inducing planar alignment of the director (twisted (TN) mode, see FIG. 2b)) thereby causing the twisting of the liquid crystal director around the axis perpendicular to the substrates across the cell for the low tilt state. Exact details regarding cell geometry and configuration, exact cell parameters, addressing means, assembling of the entire zenithal bistable device (including use of polarisers) etc. are disclosed in WO 97/14990; E. L. Wood, G. P. Bryan-Brown, P. Brett, A. Graham, J. C. Jones, and J. R. Hughes, "Zenithal Bistable Device (ZBD™) Suitable for Portable Applications, SID 00 Digest (2000), 124; J. C. Jones, J. R. Hughes, A. Graham, P. Brett, G. P. Bryan-Brown, and E. L. Wood, "Zenithal Bistable Devices: Towards the electronic book with a simple LCD", IDW'00 (2000), 301; J. C. Jones, S. M. Beldon and E. L. Wood, "Greyscale in Zenithal Bistable LCD: The Route to Ultra-low Power Colour Displays", seminar talk on the ASID meeting 2002 of the Society for Information Display, Singapore, September 2002; and the detailed discussion given in J. C. Jones, G. Bryan-Brown, E. Wood, A. Graham, P. Brett and J. Hughes, "Novel bistable liquid crystal displays based on grating alignment", in "Liquid Crystal Materials, Devices, and Flat Panel Displays", R. Shashidhar, B. Gnade, eds., Proceedings of SPIE Vol. 3955 (2000), 84, and references cited therein.

Utilizing zenithal bistability in electrooptical devices offers attractive features:

Image retention on a display without continuous update combined with

High mechanical shock stability

Low power consumption since the display only needs addressing when the image changes Infinite multiplexility for unlimited resolution without the need for TFT elements Eminent suitability for use with plastic substrates Moreover, both transmissive and reflective modes are possible in displays utilizing zenithal bistability. A display using a transmissive mode requires a backlight on the display's rear side being permanently switched on. This contributes significantly to the overall power consumption of the display. Further, when using the transmissive display under conditions of high brightness, e.g. in direct sunlight, the contrast may become rather poor rendering the display almost unreadable. However, under poor illumination conditions, the transmissive display is well readable. To the contrary, a reflective display has no backlight but a reflector on its rear side thereby utilizing the surrounding light falling on the display for its illumination by reflection. Power consumption is lower compared to the transmissive display, and the contrast is good under conditions of high brightness making the reflective display especially useful for outdoor and daylight use. However, under poor illumination conditons, e.g. in the darkness, the reflective display becomes hardly readable. Therefore, so-called transflective displays have been suggested and disclosed (see, for instance, US 2003/0043323 A1) in order to overcome the disadvantages of both transmissive and reflective modes while still utilizing their advantages.

In general, a transflective display is utilizing the reflective mode using a partial reflector on the rear side of the display so that in the transmissive mode a backlight can be turned on in order to fit the lightning conditions.

Besides the transmissive mode both reflective and transflective modes may be applied to displays utilizing zenithal bistability. The display geometries that are favoured for these applications are the vertically aligned nematic (VAN) mode for a single polarizer device in the retardation mode (see FIG. 3a)) and the twisted nematic (TN) mode for single and two-polariser devices in the polarization mode (with the two-polariser device shown in FIG. 3b)). (However, other display geometries like, for instance, the Mixed mode of twisted nematic liquid crystal compositions (MTN mode; S.-T. Wu, C.-S. Wu, Appl. Phys. Lett. 68 (11) 1996, 1455) may also be used.) The two-polariser HAN-TN reflective device works in the TN $1^{st}$ minimum condition (C. H. Gooch and H. A. Tarry, "The Optical Properties of Twisted Nematic Liquid Crystal Structures with Twist Angles $\leq 90°$", J. Appl. Phys. D: Appl. Phys., Vol. 8, p. 1575-1584, 1975; with $d_{opt} = \lambda \sqrt{3}/(2\Delta n)$ assuming zero tilt) as for the standard transmission mode but for improvement of the viewing angles it preferably uses a lower defect state pretilt on the grating of the zenithal bistable surface, which in turn actually requires a lower $\Delta n$ for the same cell gap. The front polariser and back reflective polariser are parallel to each other but perpendicular to the grating direction, so that the twisted state is used to give the black state as the polarization is rotated by 90° and the hybrid state is then the white state as there is no effective retardation. For the single polariser reflective HAN-TN mode with a 63.5° twist again the twisted state is the black state and the hybrid state is the white state if the polariser is parallel or perpendicular to either the director in the defect state at the bistable surface or to the director at the monostable planar surface (it is preferably parallel to the director in the defect state though as there is then no retardation in the hybrid state).

For the single polariser reflective VAN-HAN mode (FIG. 3a)) the VAN state (high tilt C state in FIG. 3a)) does not cause any retardation and so appears white against a reflector. The hybrid aligned (HAN) state (low tilt D state in FIG. 3a)), however, will have some retardation and if this acts as a quarter-wave plate (i.e. with the two passes then equivalent to a half-wave plate causing a 90° rotation of the plane of polarized light) it appears black as there is no transmission of the reflected light at the polariser. The optical performance of such a device may be improved by using a quarter-wave plate between the polariser and liquid crystal cell, and in this case the optical states are reversed (i.e. the VAN state is black and the HAN state is white).

Besides the assembly and make up of the zenithal bistable display, another key issue to the zenithal bistable device technology is the nematic liquid crystal medium used inside the display cell.

The zenithal bistable device and hence the liquid crystal medium have to meet several requirements more or less depending on the specific use of the device. Since there is no consistent theory so far that might predict the physical variables to be optimized, it turned out to be helpful to use a set of (semi-)empirical parameters for evaluating liquid crystal media with respect to their usefulness in zenithal bistable nematic devices. These are illustrated in the so-called τ-V curve for switching voltages of pulse duration τ and for 10 and 90% switching levels with opposite polarities (see FIG. 4) for a liquid crystal mixture of the prior art, namely MLC-6204-000 of Merck KGBA, Darmstadt, Germany.

Firstly, in order to minimize power consumption, to allow more flexibility with the addressing of the device's picture elements and to remain within the limits of standard commercial electronic drivers and associated components (such as those commonly used to drive conventional STN devices), a low switching field and correspondingly a low operating voltage is desirable for switching from one bistable state to the other. The following applies to either the VAN (without a quarter-wave plate) or TN modes when viewed in transmission between crossed polarisers. For material comparison one can determine the switching field E for a pulse (usually a 100 µs pulse duration) from the switching voltage V that gives a transmission change from, e.g., 0 to 90% transmission (black-to-white; B-W or C-D) for a particular liquid crystal mixture in a given test cell providing zenithal bistability. (In general, one can also use the 100 to 10% transmission change transition of white-to-black, W-B or D-C, where the switching field of which may be higher or lower than the B-W transition depending on the grating's shape and dimensions.) For practical reasons, the average of both the black-to-white transition and the white-to-black transition may be used as hereinafter. In order to take into account the electric field effect of the grating (dependent on the relative permittivities of the liquid crystal and the grating, the grating shape and the cell gap) the value of E actually measured is corrected to distinguish the field just across the liquid crystal again for comparison purposes giving the corrected switching field $E_{LC@100\,\mu s}$ for a 100 µs pulse. Here, an additional estimated factor of 1.5 µm is added to the cell gap d when calculating the field just across the liquid crystal:

$$E_{100\,\mu s}=V_{100\,\mu s}/d \text{ and } E_{LC@100\,\mu s}=V_{100\,\mu s}/(d+1.5)$$
where $d$ is in µm.

Multiplying $E_{LC@100\,\mu s}$ with optimum cell gap $d_{opt}$ gives the operating voltage $V_{opt}$ corresponding to the optimum cell gap for a 100 µs pulse for just the liquid crystal. $E_{LC@100\,\mu s}$ and so $V_{opt}$ depend on the liquid crystal medium used. Here, the optimum cell gap is considered for the single polariser reflective VAN-HAN mode of FIG. 3a) but comparisons can also be made for the single polariser reflective HAN-TN mode. If the hybrid state is to act as a quarter-wave plate, the optimum cell gap can be approximated by $d_{opt}=(\lambda/2\Delta n)+0.4$ (in µm) with $\lambda=0.555$ µm and $\Delta n$ being the optical anisotropy of the liquid crystal medium, and the additional factor of 0.4 µm is included as this has been found to give the best optical performance for the gratings currently used. The modified 1$^{st}$ miminum condition for the two polariser HAN-TN mode is then $d_{opt}=(\lambda\sqrt{3}/2\Delta n)+0.4$. As mentioned earlier, the defect state pretilt can be increased to permit larger cell gaps without material improvements but the viewing angle is poorer (and the necessary cell gap may still be much less than 5 µm in some cases). It is desirable to have the defect state pretilt less than 20°.

The second empirical parameter that needs to be taken into account is the operating window $\Delta V_{opt}$ corresponding to the optimum cell gap. It describes the effect of reverse switching: When applying a pulse with a given time slot of, e.g. 400 µs, and a defined pulse polarity, e.g. B-W, one observes the desired switching at a specific value of the switching field and a further reverse switching (e.g. W-B in this case) which is not induced by a pulse of inverse polarity but by a pulse of the same polarity at an increased switching field. For technical purposes, obviously said operating window ought to be as wide as possible to permit more flexibility of the driving schemes used and particularly in relation to achieving good greyscale operation (see J. C. Jones, S. M. Beldon and E. L. Wood, "Greyscale in Zenithal Bistable LCD: The Route to Ultra-low Power Colour Displays", seminar talk on the ASID meeting 2002 of the Society for Information Display, Singapore, September 2002. In the example disclosed in this paper for a subdivided grating, the regions have pitches of 0.6 µm, 0.7 µm, 0.8 µm and 0.9 µm and the switching threshold variation across the bistable window was 6V. Therefore, to acheive the maximum number of such error-free greyscale levels the operating window has to be greater than 6V, meaning $\Delta E_{LC@400\,\mu s}$ should be greater than ~1.5V/µm but preferably greater than 5V/µm). The corresponding field can be represented by $\Delta E_{LC@400\,\mu s}$, that is the corrected difference between the 90% reverse switching field and the 90% B-W switching field for a 400 µs pulse:

$$\Delta E_{400\,\mu s}=\Delta V_{400\,\mu s}/d \text{ and } \Delta E_{LC@400\,\mu s}=\Delta V_{400\,\mu s}/(d+1.5) \text{ where } d \text{ is in µm.}$$

Taking into account the optimum cell gap $d_{opt}$ by multiplying with $\Delta E_{LC@400\,\mu s}$ eventually gives the operating window $\Delta V_{opt}(d_{opt}\Delta E_{LC@400\,\mu s}=\Delta V_{opt})$.

A further parameter of great importance is the clearing point $T_{NI}$ of the liquid crystal medium describing the temperature at which the nematic mixture becomes isotropic. For many technical purposes and for increasing the variability of electrooptical devices utilizing zenithal bistability (and so the possible applications), liquid crystal media having a high clearing point, preferably of at least 80° C. or more, are desired.

Still another parameter, the optical response time $\tau_{opt}$ corresponding to the optimum cell gap, describes how fast the liquid crystal medium changes between stable states upon application of an electric pulse. It can be determined by measuring the response time c for the 10-90% B-W transition, for example using a 100 µs pulse, in the actual test cell; then, in order to normalize the experimental values, T is multiplied by $(d_{opt}/d)^2$ giving $\tau_{opt}$ (with $d_{opt}$ being the optimum cell gap as calculated above for $V_{opt}$ and d being the actual cell gap of the test cell used). The W-B transition is much faster (less than 1 ms) and so indeed the B-W response time is of most importance when assessing the properties of the liquid crystal medium used. The smaller $\tau_{opt}$ the faster the optical response of the liquid crystal medium. A small $\tau_{opt}$ (of about 60 ms or, preferably, less than about 35 ms) may be desirable for certain electrooptical applications.

A further parameter being particularly relevant to reflective and transflective bistable nematic devices is the bireftngence $\Delta n$ of the liquid crystal mixture used. Due to the correlation between $\Delta n$ and the cell gap d, $\Delta n$ needs to meet specific requirements if displays having a practically useful cell gap of about 5 µm are employed. (A much smaller cell gap, for example of much less than 3 µm, is not desired due to pratical manufacturing reasons.) With regard to the two-polariser transmissive and reflective modes (see, e.g., FIG. 3b for the reflective type) and to the TN $1^{st}$ minimum condition as given previously, $\Delta n$ is desirably of about 0.105 or less for cell gaps of 5 µm or more, particularly when a lower defect state pretilt at the grating is favoured for improved optical performance. (To the contrary, for displays of the two polariser type $\Delta n$ might be even higher, up to about 0.185 for 3 µm devices which may result in lower operating voltages and response times, and similarly if operated in the $2^{nd}$ mininum condition $\Delta n$ should be 0.179 and above for cell gaps of 6 µm and below as $d_{opt}=(\lambda\sqrt{15}/2\Delta n)$.) The required $\Delta n$ values for the single polariser reflective HAN-TN mode are the lowest of all the possible geometries, being less than 0.067 for 3 µm devices and going as low as 0.040 for 5 µm devices (where $d_{opt}=0.2/\Delta n$ for standard pretilts). With regard to the single polariser reflective VAN-HAN mode (see, e.g., FIG. 3a)) the required $\Delta n$ for the hybrid state to act as a quarter-wave plate is approximately given by:

$$\Delta n \approx \frac{\lambda/2}{d-0.4}$$

where $\lambda$ is 0.555 µm, d is the cell gap (in µm) and 0.4 is an empirical correction factor. This in turn means that for a 5 µm cell gap, a $\Delta n$ of 0.060 is desirable for such devices utilizing the VAN-HAN mode without increasing the defect state pretilt and a $\Delta n$ less than 0.107 is necessary for a cell gap of more than 3 µm.

Those liquid crystal media the use of which in zenithal bistable devices have been described in the prior art do not meet all the parameter requirements outlined above. Even liquid crystal mixture MLC-6204-000 (available from Merck KGBA, Darmstadt, Germany) that has been used in zenithal bistable devices as the preferred medium (WO 01/40853, Example 6; J. C. Jones, G. Bryan-Brown, E. Wood, A. Graham, P. Brett and J. Hughes, "Novel bistable liquid crystal displays based on grating alignment", in "Liquid Crystal Materials, Devices, and Flat Panel Displays", R. Shashidhar, B. Gnade, Eds., Proceedings of SPIE Vol. 3955 (2000), 84) has a clearing point $T_{NI}$ of only 62.4° C. that is rather low for use in zenithal nematic bistable device for many possible applications, especially portable ones. Furthermore, it shows a birefringence $\Delta n$ of 0.1484 that is though suitable for two polariser transmissive and reflective bistable nematic displays described previously not particularly suitable for use in single-polariser reflective or transflective bistable nematic displays as the necessary cell gap is approaching 2 µm and in some cases is even below 2 µm (without increasing the defect state pretilt) which has undesired implications on the device manufacturing process.

The present invention therefore encounters the problem to provide a liquid crystal composition that is suitable for use in a bistable liquid crystal device. Furthermore, it is preferable that the liquid crystal composition to be provided would be suitable for use in a single polariser zenithal bistable nematic device, especially a single polariser reflective or transflective zenithal bistable nematic device and has an improved set of properties.

The problem is solved by the use of a liquid crystal composition in a bistable liquid crystal device, said device being preferably a zenithal nematic liquid crystal device, whereby said compostion comprises from 1 to 30 weight %, preferably from 1 to 25 weight % (based on the total weight of the composition) of a component ($\alpha\alpha$) containing one or more compounds having a dielectric anisotropy $\Delta\epsilon$ of at least 40; and a component ($\beta\beta$) said component comprising at least one compound of formula I and/or of formula II and/or of formula III and/or of formula IV

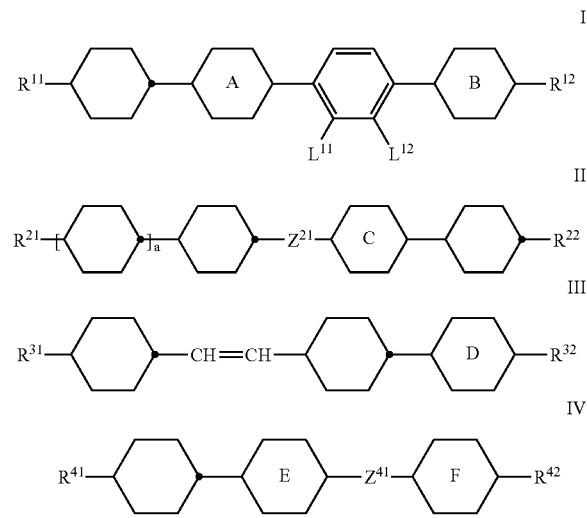

in which a is 0 or 1;

$R^{11}$, $R^{12}$, $R^{21}$, $R^{22}$, $R^{31}$, $R^{32}$, $R^{41}$ and $R^{42}$ are independently of each other $C_1$-$C_{15}$ alkyl which is unsubstituted or mono- or poly-substituted with CN or halogen and in which one or more of the $CH_2$ groups may be replaced independently of each other by —O—, —S—, —CH═CH—, —C≡C—, —CO—O—, —OC—O— such that there are no hetero atoms adjacent to each other, with the proviso that $R^{41}$ has no —CH═CH— moiety if $Z^{41}$ is a single bond;

$L^{11}$ and $L^{12}$ are independently of each other H or F;

$Z^{21}$ and $Z^{41}$ are independently of each other a single bond, —CO—O—, —$CH_2$O—, —O$CH_2$—, —$CF_2$O—, —OCF_2$—, —$CH_2CH_2$—, —$CF_2CF_2$—, —$CH_2CF_2$—, —$CF_2CH_2$—, —CH═CH— or —C≡C—;

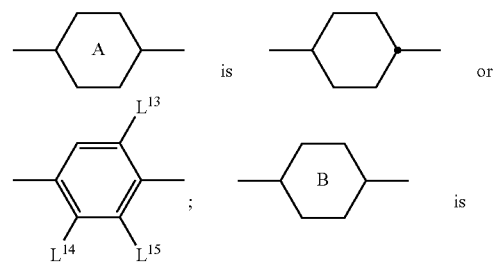

-continued

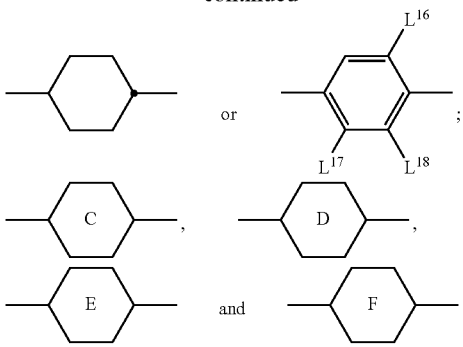

are independently of each other

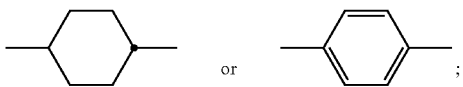

in which
$L^{13}$, $L^{14}$, $L^{15}$, $L^{16}$, $L^{17}$ and $L^{18}$ are independently of each other H or F.

(The dielectric anisotropy $\Delta\epsilon$ is determined according to the methods described in "Physical Properties of Liquid Crystals—Description of the measurement methods", ed. W. Becker, Merck KGBA, Darmstadt, 1998, whereby values foraingle compounds are extrapolated from those determined using a known concentration (usually 10 weight % of the single compound) in a standard host mixture, ZLI-4792, for which the initial mixture values are also known and measured at the same temperature, 20° C.)

A further subject matter of this invention is a bistable liquid crystal device comprising
two outer substrates which, together with a frame, form a cell;
a liquid crystal composition present in said cell;
electrode structures with alignment layers on the inside of said outer substrates whereby at least one alignment layer comprises an alignment grating that permits the liquid crystal composition to adopt at least two different stable states whereby the assembly of said electrode structures with said alignment layers being such that a switching between the said at least two different stable states is achieved by applying suitable electric signals to said electrode structures;
whereby said liquid crystal composition is said liquid crystal composition as described above and below and that comprises said components (αα) and (ββ).

In particular, said bistable liquid crystal device is a zenithal bistable nematic liquid crystal device in which said electrode structures with alignment layers on the inside of said outer substrates have at least one alignment layer that comprises an alignment grating that permits the compounds of said liquid crystal composition to adopt at least two different stable states with different pretilt angles in the same azimuthal plane whereby the assembly of said electrode structures with said alignment layers being such that a switching between the said at least two different stable states is achieved by applying suitable electric signals to said electrode structures.

It is particularity preferred that the bistable liquid crystal device according to the invention is a reflective or transflective device, even more preferably a reflective or transflective zenithal bistable nematic liquid crystal display and especially a single polariser reflective or transflective zenithal bistable nematic liquid crystal display. Nevertheless, the present invention also allows utilizing transmissive bistable nematic liquid crystal devices especially those having two (or more) polarisers.

It will be acknowledged that the invention is described hereinafter primarily with regard to the use of the liquid crystal composition above in a zenithal bistable nematic liquid crystal device although it may be used in other liquid crystal devices as well, for instance, in bistable liquid crystal devices like azimuthal bistable liquid crystal devices as disclosed, inter alia, in WO 92/00546 and WO 95/22077. Thus, details are given for the zenithal bistable nematic liquid crystal device but can easily be adapted to the requirements of other types of bistable liquid crystal devices.

The zenithal bistable nematic device and the liquid crystal composition for use in a zenithal bistable nematic device according to the invention show an improved set of parameters said parameters being, inter alia, operating voltage, operating window, birefringence, and, especially, clearing point. It should be noticed that, for instance, the clearing point of the liquid crystal compositions for use in the zenithal bistable nematic devices of the invention is significantly higher than the clearing point of liquid crystal mixtures previously used in zenithal bistable nematic devices. At the same time the liquid crystal compositions used in this invention can be selected such that the birefringence is low enough for using them in a zenithal bistable nematic single polariser device, especially a reflective or transflective zenithal bistable nematic single polariser display. However, liquid crystal compositions used in the present invention can be adapted such that their $\Delta n$ values are suitable for other zenital bistable nematic displays as well. Also the operating voltage and operating window are both in a range useful for operating of a zenithal bistable nematic device. Furthermore, in certain embodiments of the invention the optical response time $\tau_{opt}$ is decreased significantly, for instance below 35 ms and preferably below about 25 ms. The liquid crystal compositions for use in the present invention also exhibit a broad nematic phase range. Moreover, not only single specific parameters of said compositions for use in bistable nematic liquid crystal displays are improved when compared to compositions known in the art, but the specific combination of the set or sub-sets of said parameters are improved as well.

The cell that is part of the zenithal bistable nematic device according to the invention may be any conventional cell that allows the nematic liquid crystal composition to adopt at least two different zenithal bistable states. Two possible stable states are schematically depicted in FIG. 1. The two different zenithal bistable states are characterized by two different pretilt angles that are adopted by the liquid crystal molecules in the same azimuthal plane. The cell comprises a frame and two outer substrates or plates and has electrode structures with alignment layers on the inside of said substrates. At least one of these alignment layers has an zenithal alignment grating known to those skilled in the art and as described, for instance, in WO 97/14990, WO 01/40853, WO 02/08825, and J. C. Jones, et al., Proceedings of SPIE Vol. 3955 (2000), 84.

The electrode structures are assembled with the alignment layer(s) in such a way that (in the case of two stable states)

switching from one stable state to the other can be achieved by applying suitable electric signals to the electrode structures thereby applying said electric signals to the liquid crystal composition inside the cell. Commonly, single pulses can be used as such suitable electric signals. Details are known to the artisan and described in WO 97/14990, WO 01/40853, WO 02/08825, J. C. Jones, J. R. Hughes, A. Graham, P. Brett, G. P. Bryan-Brown, IDW'00 (2000), 301, J. C. Jones, et al., Proceedings of SPIE Vol. 3955 (2000), 84, and E. L. Wood, P. J. Brett, G. P. Bryan-Brown, A. Graham, R. M. Amos, S. Beldon, E. Cubero and J. C. Jones, "Large Area, High Resolution Portable ZBD Display", SID 02 Digest (2002), 22-25.

The substrate opposite to the substrate having the grating alignment layer may have a homeotropic alignment due to suitable surface treatment (see FIG. 2a)). Switching upon application of an electric pulse occurs from the high tilt or vertically aligned state to the low tilt or hybrid aligned state. This switch gives a black-to-white (B-W) change if the cell is placed between crossed polarizers (at 45° to the grating direction), with the brightest white state obtained when the vertically aligned state acts as a half-waveplate (d$\Delta$n=$\lambda$/2). This switching mode is called VAN mode. Zenithal bistable devices utilizing the VAN mode are very insensitive to cell gap variations. They require additional optical compensators to achieve wide viewing angles. A second switching mode of zenithal bistable devices is called TN mode (see FIG. 2b)): The substrate opposite to the substrate having the grating alignment layer has a alignment layer, usually of rubbed polyimide, causing planar alignment of the liquid crystal molecules on said substrate. This in turn causes the twisting of the liquid crystal director around their axis perpendicular to the substrates across the cell. Switching upon application of an electric pulse now occurs from the low tilt or twisted aligned state to the high tilt or hybrid aligned state. This switch gives a black-to-white (B-W) change if the cell is placed between parallel polarizers and using the TN $1^{st}$ minimum condition accounting for the influence of the ordinary refractive index of the hybrid state. Due to a high normal incidence contrast ratio additional optical compensators for achieving wide viewing angles are not required in a transmissive display.

Therefore the TN mode is preferred for some of the technical applications of zenithal bistable nematic devices.

It is also possible to build up zenithal bistable reflective (or transflective) displays that are preferred embodiments of the present invention. FIG. 3a)) depicts a reflective zenithal bistable nematic device in the VAN-HAN mode utilizing a single polariser (as explained above with regard to FIG. 3a)). FIG. 3b) depicts a reflective zenithal bistable device in the HAN-TN mode utilizing two polarisers one on each substrate of the cell (as explained above with regard to FIG. 3b)).

For details of the build-up of zenithal bistable devices, also with regard to the polarisers used, it is referred to WO 97/14990, E. L. Wood, G. P. Bryan-Brown, P. Brett, A. Graham, J. C. Jones, and J. R. Hughes, SID 00 (2000), 124, and E. L. Wood, P. J. Brett, G. P. Bryan-Brown, A. Graham, R. M. Amos, S. Beldon, E. Cubero and J. C. Jones, "Large Area, High Resolution Portable ZBD Display" SID 02 Digest (2002), 22-25.

Those single polariser devices and especially single polariser reflective (or even transflective) zenithal bistable devices having a practical cell gap of not less than 3 µm and usually of about 4 to about 5 µm require a liquid crystal medium exhibiting a $\Delta$n of preferably less than approximately 0.11 (or 0.08 if transflective). The liquid crystal composition for use in the zenithal bistable device according to the invention preferably have a birefringence of less than about 0.11.This allows their use in the two polariser HAN-TN mode cell type having a cell gap of about 5 µm (without increasing the defect state pretilt) and in the single polariser VAN-HAN mode cell type of about 3 µm (again, without increasing the defect state pretilt).

In the context of the present invention and with respect to the compounds contained in the liquid crystal composition for use in bistable liquid crystal devices and especially in zenithal bistable nematic devices of the invention the term "alkyl" means—as long as it is not defined in a different manner elsewhere in this description or the claims—straight-chain and branched hydrocarbon (aliphatic) radicals with 1 to 15 carbon atoms; the hydrocarbon radicals may be unsubstituted or substituted with one or more substituents being independently selected from the group consisting of F, Cl, Br, I and/or CN. The subclass of "alkyl" containing aliphatic saturated radicals may also be designated as "alkanyl". Furthermore, "alkyl" is also meant to comprise unsubstituted or likewise substituted hydrocarbon radicals in which one or more of the $CH_2$ groups are such replaced by —O— ("alkoxy", "oxaalkyl"), —S— ("thioalkyl"), —CH=CH— ("alkenyl"), —C≡C— ("alkinyl"), —CO—O— or —O—CO— that there are no adjacent hetero atoms (O, S). Preferably, alkyl is a straight-chain or branched saturated hydrocarbon having 1, 2, 3, 4, 5, 6, 7 or 8 carbon atoms and being unsubstituted or mono- or poly-substituted with F. More preferably, alkyl is meant to be methyl, ethyl, n-propyl, i-propyl, n-butyl, i-butyl, t-butyl, n-pentyl, neopentyl, n-hexyl, n-heptyl, n-octyl; $CF_3$, $CHF_2$, $CH_2F$; $CF_2CF_3$. Most preferably, alkyl is a straight-chain hydrocarbon of up to 8 carbon atoms.

Since one or more $CH_2$ groups of an alkyl radical may be replaced by —O— as described above, the term "alkyl" also comprises "alkoxy" and "oxaalkyl" moieties. "Alkoxy" means "O-alkyl" in which the oxygen atom is directly linked to the group or ring being substituted with alkoxy and alkyl is defined as above. In particular, "alkyl" in "O-alkyl" means methyl, ethyl, n-propyl, i-propyl, n-butyl, i-butyl, t-butyl, n-pentyl, neopentyl, n-hexyl, n-heptyl or n-octyl, whereby alkyl is optionally substituted with F. Most preferably, alkoxy is —$OCH_3$, —$OC_2H_5$, —O-n-$C_3H_7$, —O-n-$C_4H_9$, —O-t-$C_4H_9$, —$OCF_3$, —$OCHF_2$, —OCHF or —$OCHFCHF_2$. In the context of the present invention the term "oxaalkyl" comprises alkyl moieties in which at least one non-terminal $CH_2$ group is replaced by O in such a way that there are no adjacent oxygen atoms. Preferably, oxaalkyl comprises straight-chain radicals of the formula $C_tH_{2t+1}$—O—$(CH_2)_u$— in which t and u are independently of each other 1, 2, 3, 4, 5 or 6; especially t is 1 or 2 and u is an integer from 1 to 6.

If one or more of the $CH_2$ groups of alkyl are replaced by sulphur a "thioalkyl" radical is obtained. Thioalkyl comprises alkyl moieties in which at least one terminal or non-terminal $CH_2$ group is replaced by S (sulphur) in such a way that there are no adjacent sulphur atoms. Preferably, thioalkyl comprises straight-chain radicals of the formula $C_tH_{2t+1}$—S—$(CH_2)_u$— in which t is 1, 2, 3, 4, 5 or 6 and u is 0, 1, 2, 3, 4, 5 or 6; especiallyt is 1 or 2 and u is zero or an integer from 1 to 6.

In the context of the present invention the term "alkenyl" means an alkyl radical in which one or more —CH=CH— moieties are present. When two —CH=CH— moieties are present the radical may also be designated as "alkadienyl". An alkenyl radical may comprise 2 to 15 carbon atoms and may be straight-chain or branched. It can be unsubstituted or mono- or polysubstituted with F, Cl, Br, I or CN; one or more of its CH$_2$ groups may be replaced independently of each other by —O—, —S—, —C≡C—, —CO—O—, —OC—O— such that there are no hetero atoms adjacent to each other. If the alkenyl CH═CH moiety is not a terminal CH$_2$═CH— group it may exist in two configurations, namely the E-isomer and the Z-isomer. In general, the E-isomer (trans) is preferred. Preferably, alkenyl contains 2, 3, 4, 5, 6 or 7 carbon atoms and means vinyl, 1E-propenyl, 1E-butenyl, 1E-pentenyl, 1E-hexenyl, 1E-heptenyl, 2-propenyl, 2E-butenyl, 2E-pentenyl, 2E-hexenyl, 2E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. More preferred alkenyl is vinyl, 1E-propenyl, 3E-butenyl.

In the case one or more CH$_2$ alkyl groups are replaced by —C≡C— an alkinyl radical is obtained. Also the replacement of one or more CH$_2$ alkyl groups by —CO—O— or —O—CO— is possible. The following of these radicals are preferred: acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 2-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)-ethyl, 3-(methoxycarbonyl)-propyl, 3-(ethoxy-carbonyl)-propyl oder 4-(methoxycarbonyl)-butyl.

In the context of the present invention "halogen" means F, Cl, Br and/or I.

In the context of the present invention the term "mono-substituted" means—as long as it is not defined in a different manner elsewhere in the description or the claims—that one of the hydrogen atoms attached to a radical or moiety or ring, for instance an alkyl radical, has been replaced by a non-hydrogen susbtituent, for instance a halogen atom or —CN. Likewise the term "poly-substituted" means—as long as it is not defined in a different manner elsewhere in the description or the claims—that more than one hydrogen atom, i.e. at least two and optionally more than two hydrogen atoms, attached to a radical or moiety or ring, have been replaced by substituents different from hydrogen, for instance halogen atoms and/or —CN. If more than one substituents are present, they may be the same or different.

The liquid crystal composition for use in the (zenithal) bistable (nematic) liquid crystal device of the invention contains at least two different components, component (αα) and component (ββ).

It has been found by the inventors that the liquid crystal composition for use in a bistable liquid crystal device needs to comprise a component (αα). Said component (αα) contains one or more compounds having a dielectric anisotropy Δε of at least 40. This means that Δε is equal to 40.0 or higher. At least about 1 weight % (i.e. >1 weight %) and not more than 30 weight % (i.e. <30.0 weight %) and preferably not more than 25 weight % (i.e. ≦25.0 weight %) of said component are present in the liquid crystal composition in the zenithal bistable device according to the invention. Preferably, said liquid crystal composition comprises about 10 to 25 weight %, especially 15 to 22.5 weight % of component (αα). Although there is no wish to be bound to any theory, the presence of this very high polar component (αα) appears to be required for achieving a reasonably low switching field. However, exceeding the upper limit of component (αα) may increase Δn of the composition undesirably with respect to a single polariser bistable display. Component (αα) preferably comprises one or more compounds of formula V:

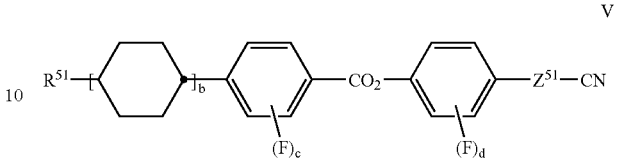

V in which
b is 0 or 1;
c and d are independently of each other 0, 1, 2, 3 or 4;
R$^{51}$ is C$_1$-C$_{15}$ alkyl which is unsubstituted or mono- or poly-substituted with CN or halogen and in which one or more of the CH$_2$ groups may be replaced independently of each other by —O—, —S—, —CH═CH—, —C≡C—, —CO—O—, —OC—O— such that there are no hetero atoms adjacent to each other;
Z$^{51}$ is a single bond or —C≡C—;

whereby d is 1, 2, 3 or 4, if b is 1; and R$^{51}$ is C$_1$-C$_3$ alkyl, if both b and d are 1.

With regard to compounds of formula V c and d may be independently of each other 0, 1, 2, 3 or 4, preferably 0, 1 or 2; that means that preferably each of the phenyl rings of formula V may be unsubstituted or mono- or di-substituted with fluorine. However, if b is 1, i.e. a cyclohexyl ring is present in the compound of formula V, d must not be zero, i.e. the right-hand phenyl ring of the compound bears at least one F atom and preferably 2 fluorine atoms. If present the F substituent(s) may be in any position of the phenyl ring substituted. Preferably, the fluorine substituents on the left-hand phenyl ring are in ortho postions to the CO$_2$ group while the fluorine substituents on the right-hand phenyl ring are in ortho positions to the -Z$^{51}$-CN moiety. Furthermore, Z$^{51}$ can be either a single bond (so that the CN group is directly linked to the phenyl ring) or a C—C triple bond thereby forming a —C≡C—CN substituent of the phenyl ring. It is preferred that Z$^{51}$ is a single bond.

Preferred compounds of formula V are selected from the group consisting of the following compounds:

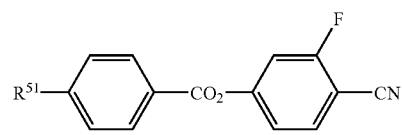

VA

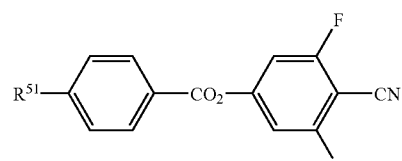

VB

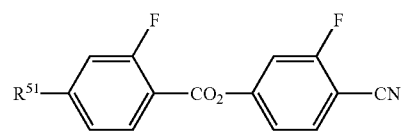

VC

-continued

VD 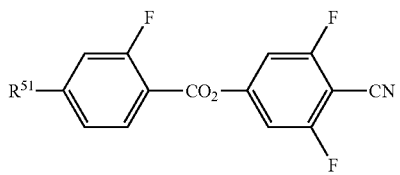

VE 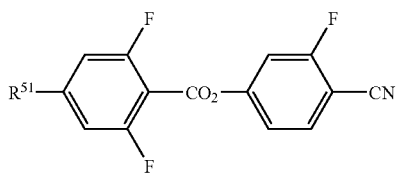

VF 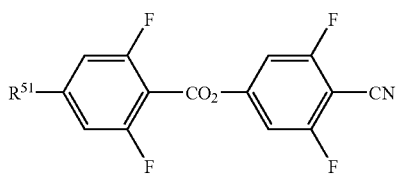

VG 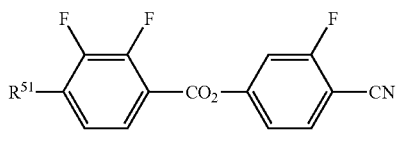

VH 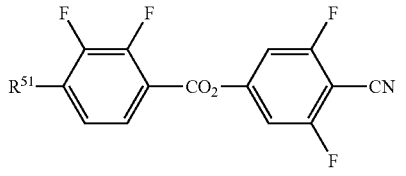

VJ 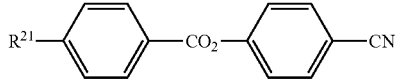

VK 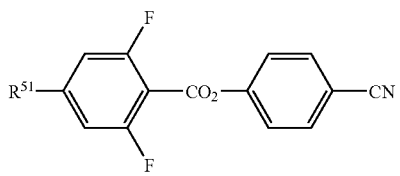

VL 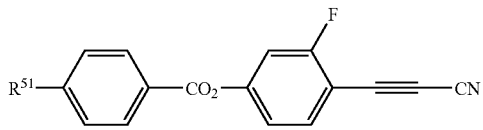

VM 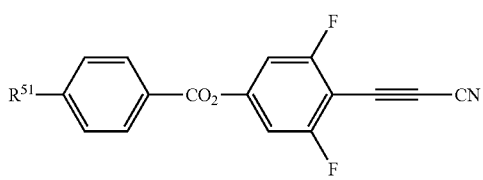

-continued

VN 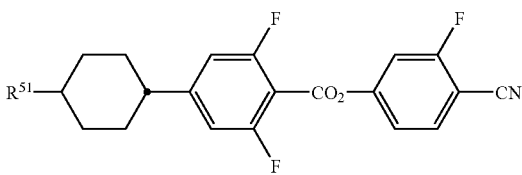

VO 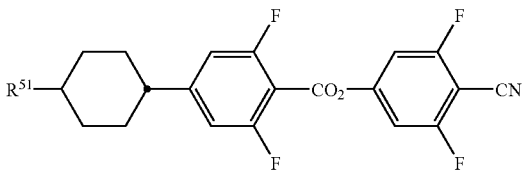

VP-1a 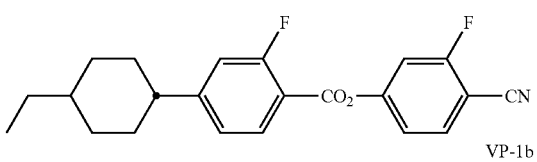

VP-1b 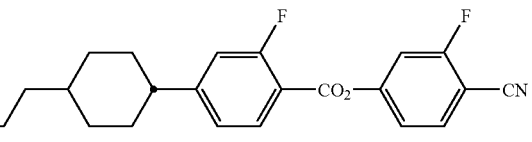

with $R^{51}$ being as defined above and preferably being a straight-chain alkanyl or alkenyl radical with up to 8 carbon atoms.

More preferred compounds of formula V are compounds of formulas VA-1 or VB-1:

VA-1 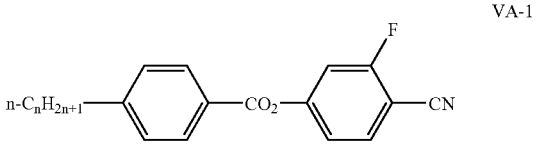

VB-1 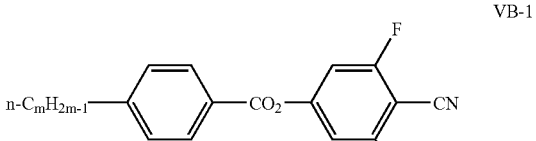

in which n is an integer from 1 to 8, preferably 2, 3, 4, 5, 6 or 7; and m is an integer from 2 to 8, preferably 2, 3, 4, 5 or 6, especially with a terminal carbon-carbon double-bond.

If compounds of formula VA-1 are used in component (αα), it is preferred though not required to use two ore more of them. For instance, compound of formula VA-1 with n=2 exhibits a Δε of 53.7 while compound of formula VA-1 with n=5 exhibits a Δε of 43.0. Compounds of formula VA-1 may be used alone or in combination with one or more compounds of formula VB-1.

If compounds of formula VB-1 are used, it is preferred though not required to use a single compound of formula VB-1. Preferred examples are of formulas VB-1a to VB-1d:

VB-1a
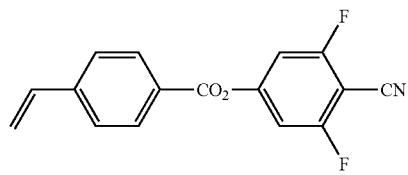

VB-1b
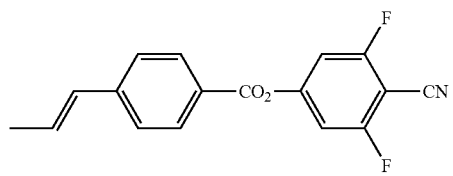

VB-1c
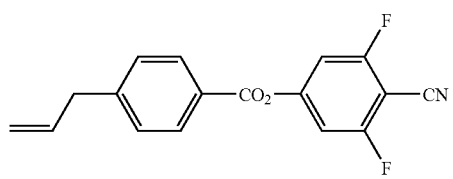

VB-1d
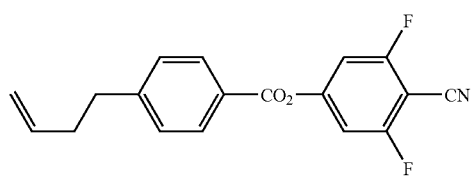

Highly preferred are compounds of formula VB-1 having a terminal C=C double-bond (e.g., VB-1c and VB-1d). Compound of formula VB-1d shows a Δε of 59.5 and is especially preferred as the single compound constituting component (αα).

Another group of compounds of component (αα) comprises compounds of formula XIV:

XIV
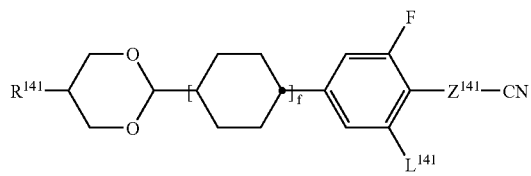

wherein
f is 0 or 1;
$R^{141}$ is $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;
$L^{141}$ is H or F; and
$Z^{141}$ is a single bond or —C≡C—.

Preferred compounds of formula XIV are of the following formulas:

XIVA
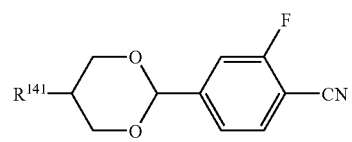

XIVB
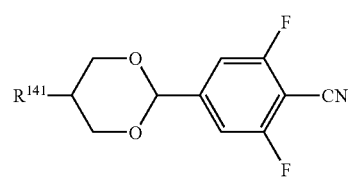

XIVC
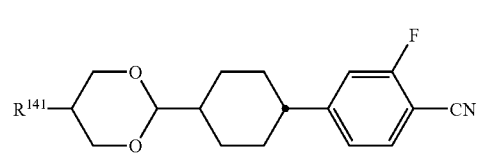

XIVD
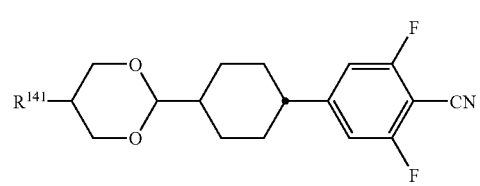

with $R^{141}$ being as defined above. More preferred compounds are of the following formulas:

XIVB-1
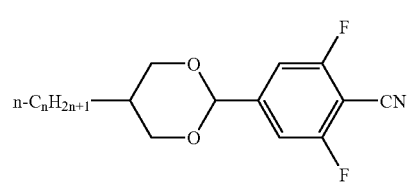

XIVD-1
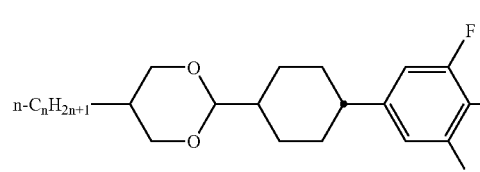

wherein n is an integer from 1 to 8, preferably 2, 3, 4 or 5.

For instance, compound XIVB-1 with n=3 has a Δε of 48.0 while compound XIVB-1 with n=5 has a Δε of 43.6. Compound XIVD-1 with n=2 has a Δε of 50.0 while compound XIVD-1 with n=5 has a Δε of 43.6.

Furthermore, the compounds of the following formula are suitable as

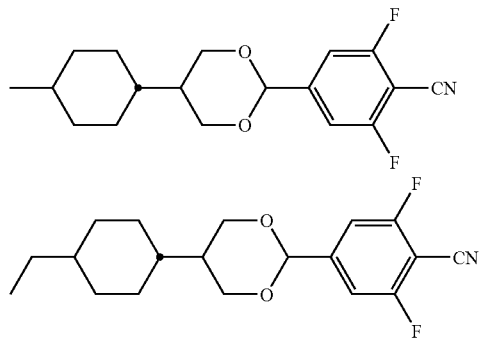

It will be acknowledged that other compounds than those of formula V may be present as component (αα) as long as they have a sufficiently high dielectrical anisotropy Δε and are not detrimental to the set of parameters as outlined above.

Furthermore, it has been found by the inventors that a second component besides component (αα), namely component (ββ), has to be present in the liquid crystal composition for use in a bistable liquid crystal device according to the invention. Component (ββ) may be present in any suitable amount, however it is preferred that it is present in an amount of at least 5 weight % and up to about 50 weight %. However, if component (ββ) contains compounds of formula I and/or of formula II with a being 1, the upper limit preferably may be of about 30 weight %. Component (ββ) appears to be required for achieving a sufficiently high clearing point of the liquid crystal mixtures used in the zenithal bistable nematic devices of the invention. It comprises compounds of formula I and/or formula II and/or formula III and/or formula IV:

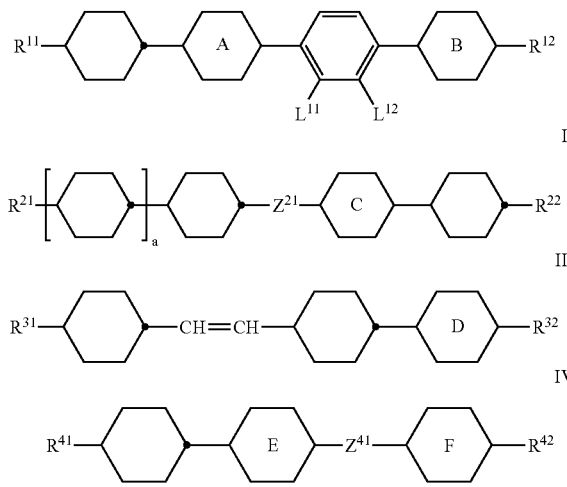

in which
a, $R^{11}$, $R^{12}$, $R^{21}$, $R^{22}$, $R^{31}$, $R^{32}$, $R^{41}$, $R^{42}$, $L^{11}$, $L^{12}$, $Z^{21}$, $Z^{41}$,

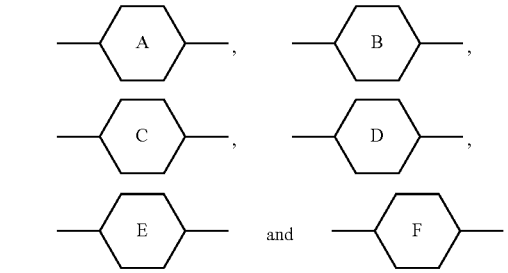

are defined as above. Preferably, the rings A and B are not 1,4-phenylene rings at the same time. These compounds also show rather low Δn values, usually below about 0.12.

Preferred compounds of formula I are of the following formulas:

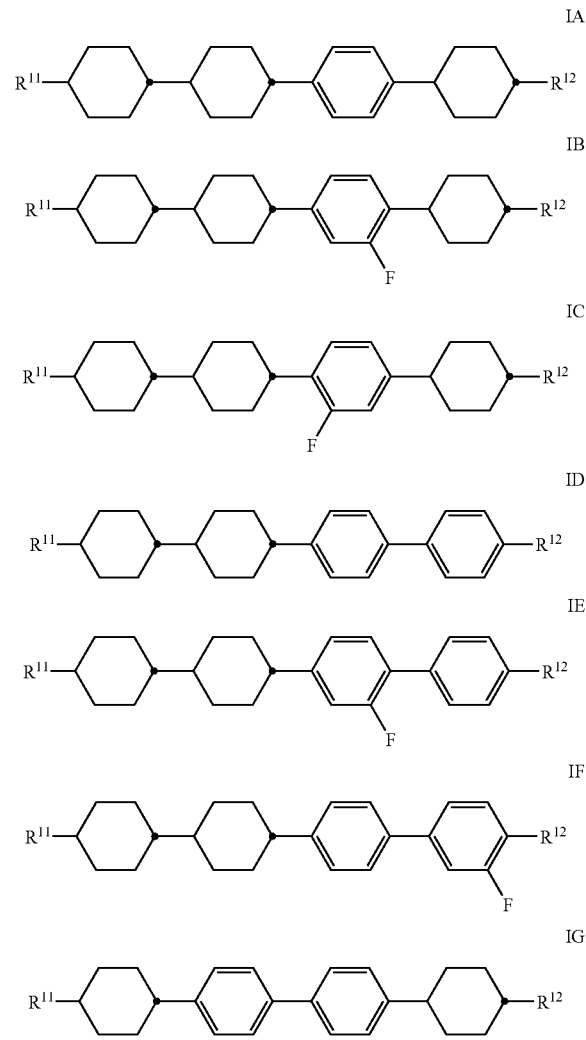

-continued

IH

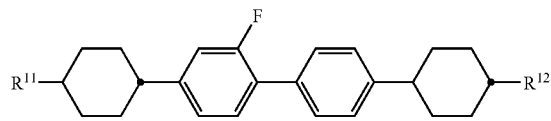

with $R^{12}$ and $R^{12}$ being as defined above. Preferably, in formulas I and IA to IH $R^{11}$ and $R^{12}$ are both independently of each other straight-chain alkyl, more preferred straight-chain alkanyl or alkenyl having 2, 3, 4, 5 or 6 carbon atoms, especially straight-chain alkanyl with 2 to 6 carbon atoms.

Preferred compounds are of formulas IA, IB, IC, IG and IH, with IG and IH being most preferred. Especially preferred compounds are of formulas IG-1 and IH-1:

IG-1

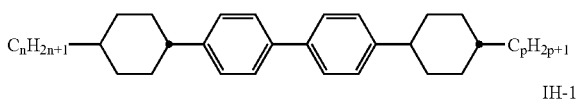

IH-1

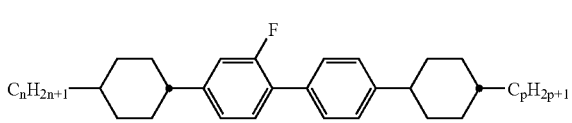

with n being an integer from 1 to 8, preferably 2, 3, 4, 5 or 6; and p being an integer from 1 to 8, preferably 2, 3, 4, 5 or 6. Especially preferred examples of formulas IG-1 and IH-1 are as follows:

Preferred compounds of formula II are of the following formulas:

IIA

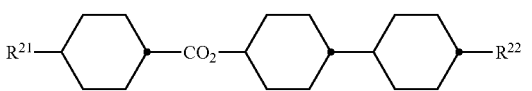

IIB

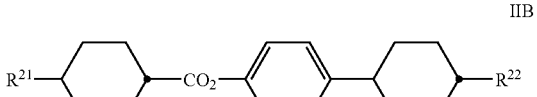

IIC

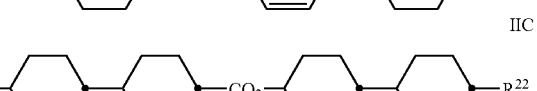

IID

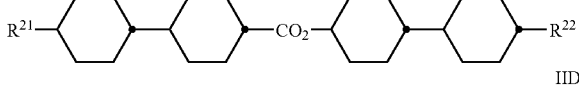

IIE

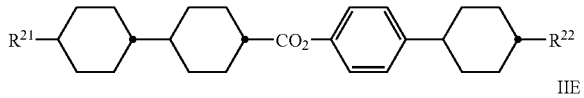

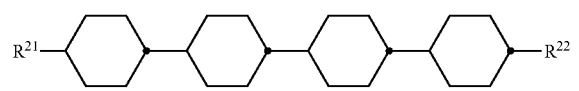

with $R^{21}$ and $R^{22}$ being as defined above. Preferably, $R^{21}$ and $R^{22}$ are both independently of each other straight-chain alkyl, more preferred straight-chain alkanyl or alkenyl having 2, 3, 4, 5, 6, 7 or 8 carbon atoms, especially straight-chain alkanyl with up to 8 carbon atoms. Especially preferred compounds are of compounds of formulas IIA-1, IIB-1, IIC-1 and IID-1:

IG-1a

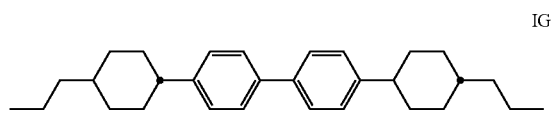

IH-1a

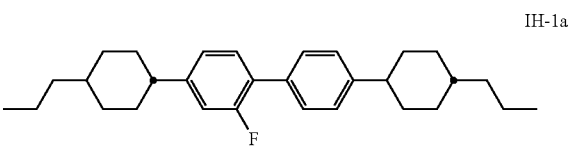

IG-1b

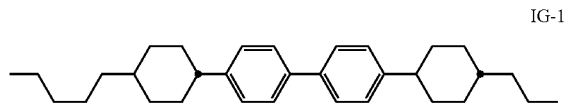

IH-1b

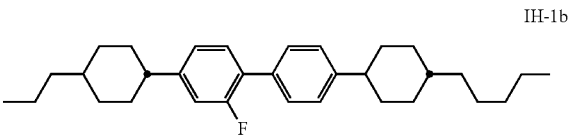

IG-1c

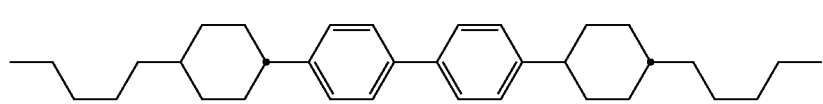

IH-1c

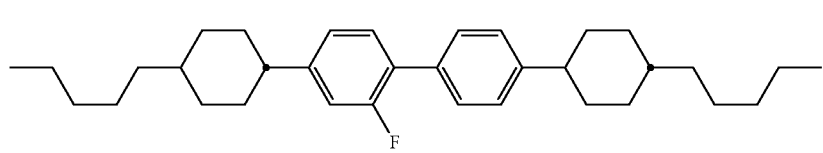

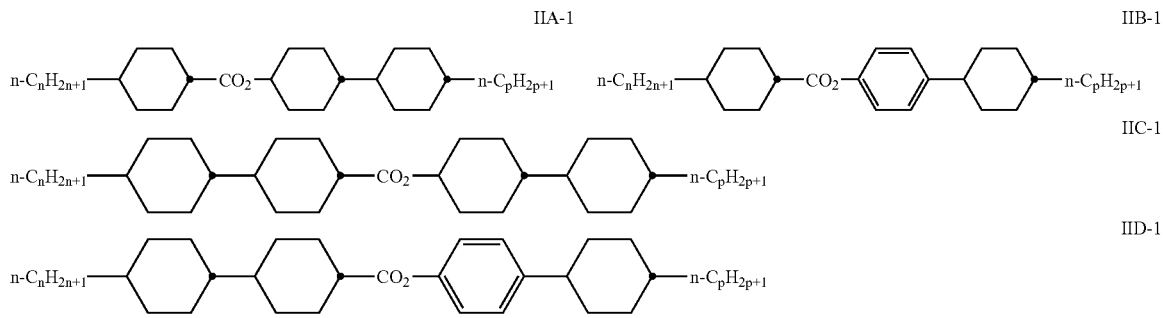

with n and p being independently of each other 1, 2, 3, 4, 5, 6, 7 or 8, preferably 2, 3, 4 or 5. The most preferred examples of formula II are of formula IID-1a to IID-1c:

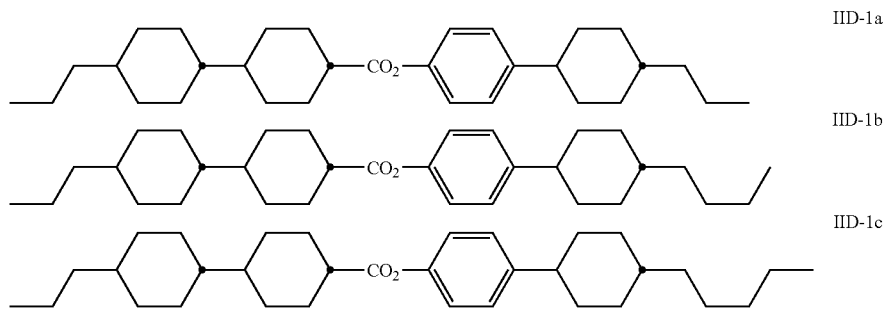

Preferred compounds of formula III are of formula IIIA and IIIB:

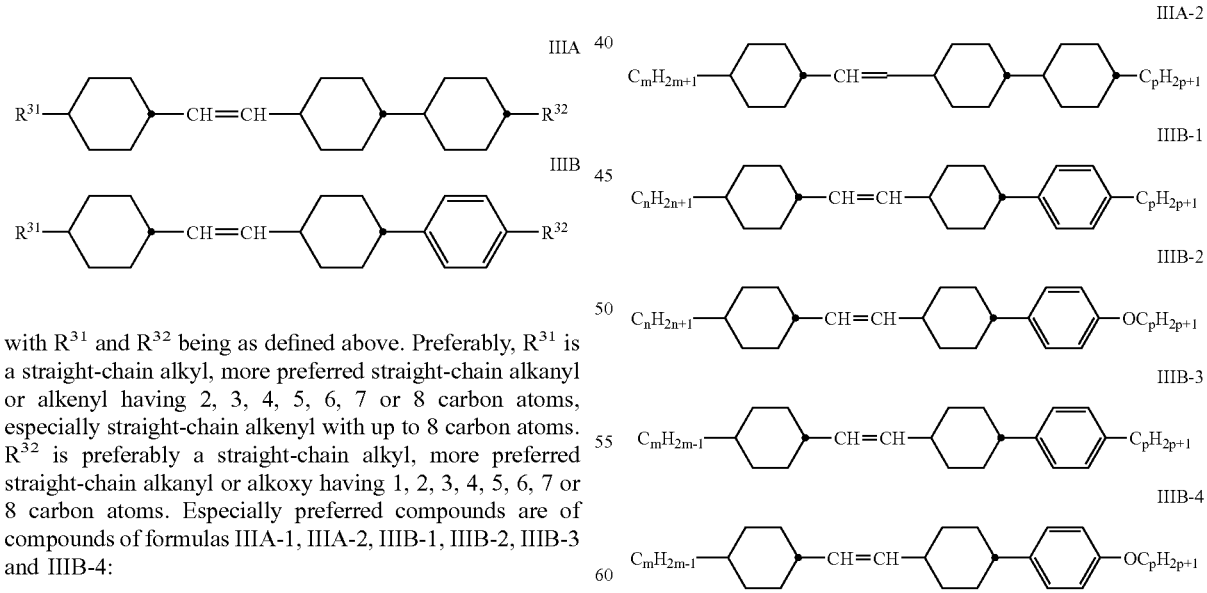

with $R^{31}$ and $R^{32}$ being as defined above. Preferably, $R^{31}$ is a straight-chain alkyl, more preferred straight-chain alkanyl or alkenyl having 2, 3, 4, 5, 6, 7 or 8 carbon atoms, especially straight-chain alkenyl with up to 8 carbon atoms. $R^{32}$ is preferably a straight-chain alkyl, more preferred straight-chain alkanyl or alkoxy having 1, 2, 3, 4, 5, 6, 7 or 8 carbon atoms. Especially preferred compounds are of compounds of formulas IIIA-1, IIIA-2, IIIB-1, IIIB-2, IIIB-3 and IIIB-4:

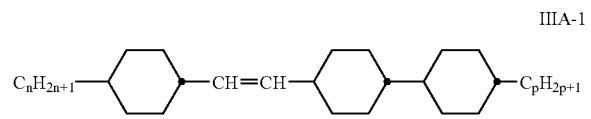

with n being 2, 3, 4 or 5; m being 2, 3 or 4; and p being 1, 2, 3, 4 or 5.

Highly preferred examples of formula III are compounds of the following formulas:

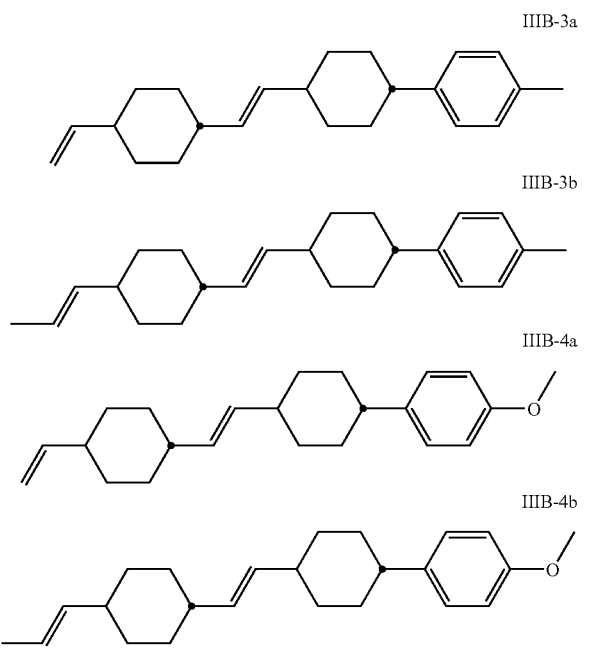

Especially preferred are compounds of formula IIIB-3a, IIIB-4a and IIIB-4b. They may be used alone or, more preferred, as a mixture of two or three compounds.

Preferred compounds of formula IV are selected from the group consisting of compounds of the following formulas:

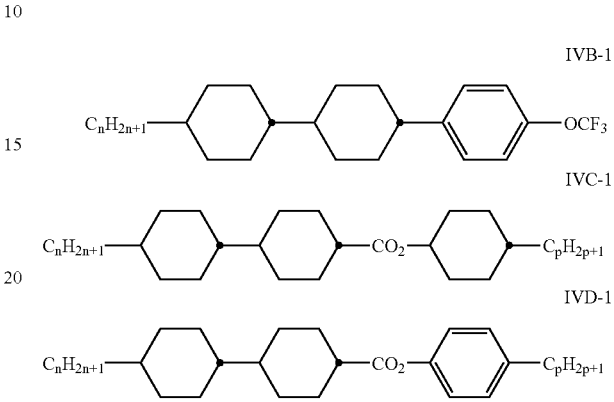

with $R^{41}$ and $R^{42}$ being defined as above. Preferably, $R^{41}$ and $R^{42}$ are straight-chain alkyl, especially alkanyl, with 1, 2, 3, 4, 5 or 6 carbon atoms; in formula IVB $R^{42}$ is preferably also an optionally fluorinated alkoxy radical, especially —$OCF_3$; while in formula IVG $R^{42}$ is preferably an unsubstituted and straight-chain alkoxy radical, especially with 1, 2, 3, 4, 5 or 6 carbon atoms. Highly preferred compounds of formula IV are of formulas IVB-1, IVC-1 and IVD-1:

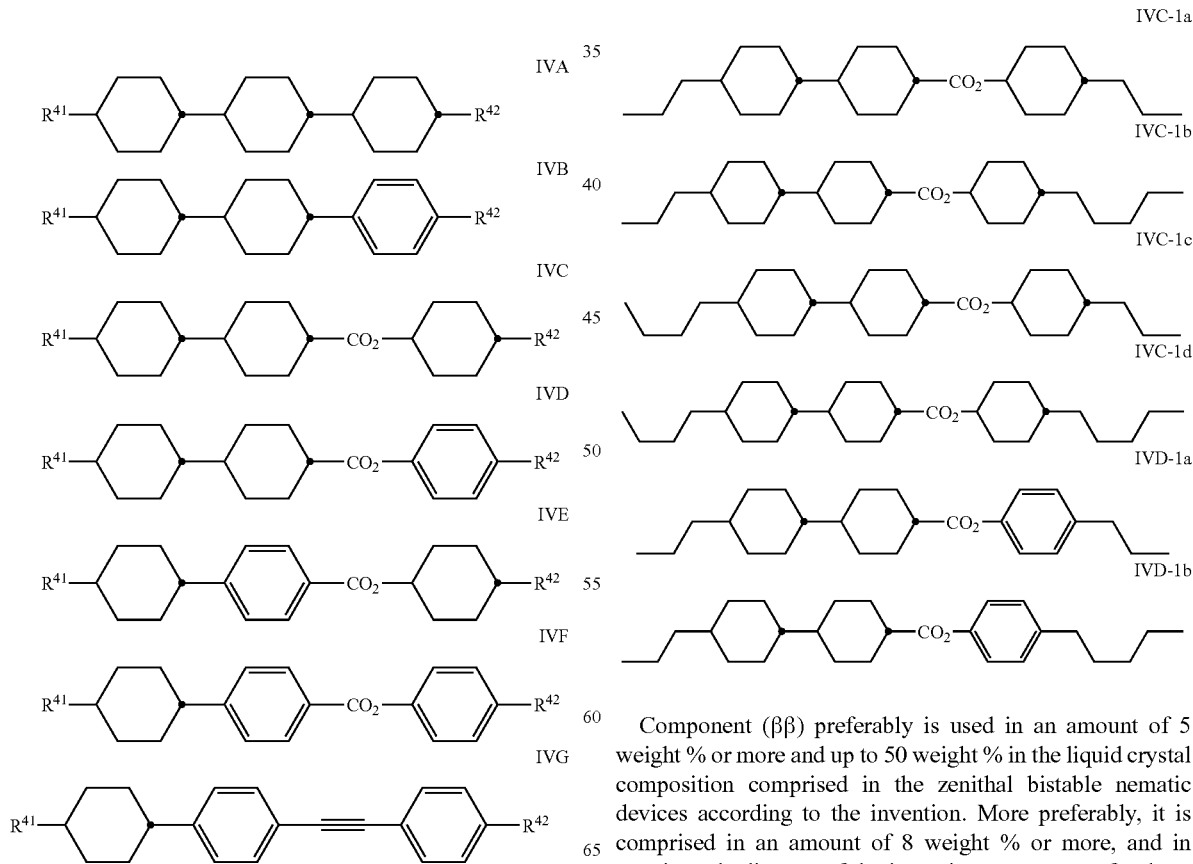

with n being an integer from 1 to 8, preferably 2, 3, 4 or 5; and p being an integer from 1 to 8, preferably 2, 3, 4 or 5. Especially preferred examples of compounds of formulas IVC-1 and IVD-1 are as follows:

Component (ββ) preferably is used in an amount of 5 weight % or more and up to 50 weight % in the liquid crystal composition comprised in the zenithal bistable nematic devices according to the invention. More preferably, it is comprised in an amount of 8 weight % or more, and in certain embodiments of the invention an amount of at least 10 weight % of component (ββ) is still even more preferred.

In certain other embodiments of the invention a total amount of 15 or 20 weight % or more of component (ββ) is highly preferred.

In an actual embodiment of the invention component (ββ) may contain one or more compounds of only one of the formulas I or II or III or IV. It is also possible that it contains one or more compounds of two, three or more of the formulas I to IV. It may contain an equal or a different amount of compounds of each formula used. It is preferred that component (ββ) contains one or more compounds of one or two of the formulas I, II, III or IV. If compounds of two of the formulas I to IV are contained, any combination is possible, i.e. I+II or I+III or I+IV or II+III or II+IV or III+IV; both types of compounds may be used in an equal amount, or one of the types may be used in an excess with regard to the other one, for instance, in a ratio of 2:1. It is especially preferred that the liquid crystal composition for use in the bistable nematic devices according to the invention comprises at least one compound selected from the group consisting of compounds of formulas IG-1, IH-1, II-D1, IVC-1 and IVD-1.

In a preferred embodiment of the invention the liquid crystal composition for use in a bistable liquid crystal device according to the invention further comprises a component (ωω) containing one or more compounds having a dielectric anisotropy Δε ranging from 5 to 40; this means that Δε is at least 5.0 and less than 40.0. It is preferred that component (ωω) is comprised in an amount from about 1 to about 90 weight %, more preferred in an amount of about 1 to about 80 weight % and especially of up to about 60 weight %. It is even more preferred that component (ωω) is present in an amount of about 10 to 60 weight %.

Preferably, component (ωω) comprises at least at least one compound of formula VI and/or of formula VII and/or of formula VII and/or of formula IX and/or of formula X

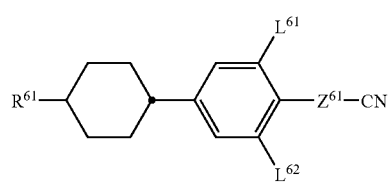

VI

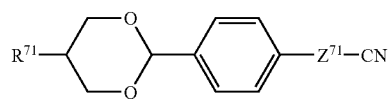

VII

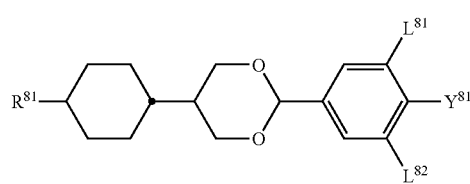

VIII

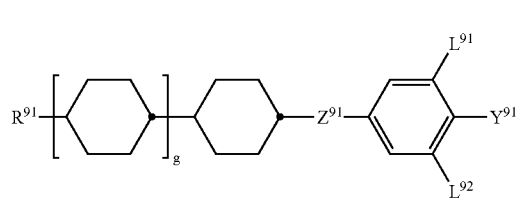

IX

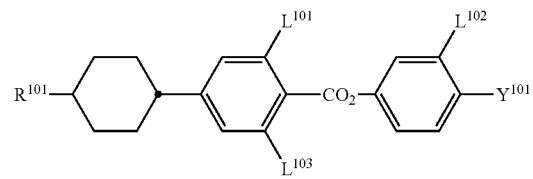

X wherein
g is 0 or 1;
$R^{61}$, $R^{71}$, $R^{81}$, $R^{91}$, $R^{101}$ are independently of each other $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other; whereby $R^{81}$ is $C_3$-$C_{15}$ alkyl, if $Y^{81}$ is CN; $R^{91}$ has no —CH=CH— moiety, if, at the same time, g is 1, $Z^{91}$ is a single bond, $L^{91}$ is F and $L^{92}$ is H; and $R^{101}$ is $C_4$-$C_{15}$ alkyl, if, at the same time, $L^{101}$ and $L^{102}$ are F and $Y^{101}$ is CN;
$L^{61}$, $L^{62}$, $L^{81}$, $L^{82}$, $L^{91}$, $L^{92}$, $L^{101}$, $L^{102}$ and $L^{103}$ are independently of each other H or F;
$Y^{81}$ is F, Cl, CN, NCS, $SF_5$, or $C_{1-15}$ alkanyl or alkoxy which are mono- or poly-substituted with F and/or Cl;
$Y^{91}$ is F, Cl, CN, NCS, $SF_5$, $C_{1-15}$ alkanyl or alkoxy which are mono- or poly-substituted with F and/or Cl, whereby $Y^{91}$ is F, Cl, CN, NCS or $SF_5$, if both $L^{91}$ and $L^{92}$ are H;
$Y^{101}$ is F, Cl, CN, NCS, $SF_5$, $C_{1-15}$ alkanyl or alkoxy which are mono- or poly-substituted with F and/or Cl, whereby $Y^{101}$ is F, Cl, CN, NCS or $SF_5$, if $L^{101}$, $L^{102}$ and $L^{103}$ are H at the same time;
$Z^{61}$ and $Z^{71}$ are independently of each other a single bond or —C≡C—; and
$Z^{91}$ is a single bond, —CO—O— or —$CF_2$O—, whereby $Z^{91}$ is not a single bond, if g is 0.

Preferably, $Y^{81}$ is F, Cl, CN, $CF_3$, $OCF_3$, $OCHF_2$, especially F or Cl. $Y^{91}$ is preferably F, Cl, CN, especially F or CN. Preferably, $Y^{101}$ is F, Cl, CN, $CF_3$, $OCF_3$, especially CN or $OCF_3$.

Compounds of formulas VI to X are especially preferred as constituents of component (ωω) with respect to liquid crystal compositions with relatively low Δn values for use in bistable nematic liquid crystal devices having either a single polariser reflective or transflective mode.

Preferred compounds of formula VI are of the following formulas:

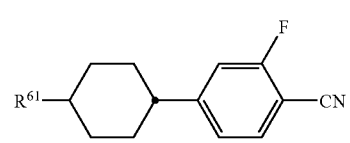

VIA

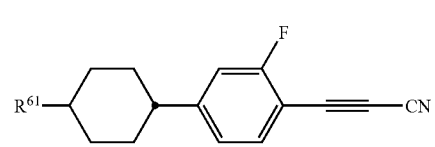

VIB

-continued

VIC

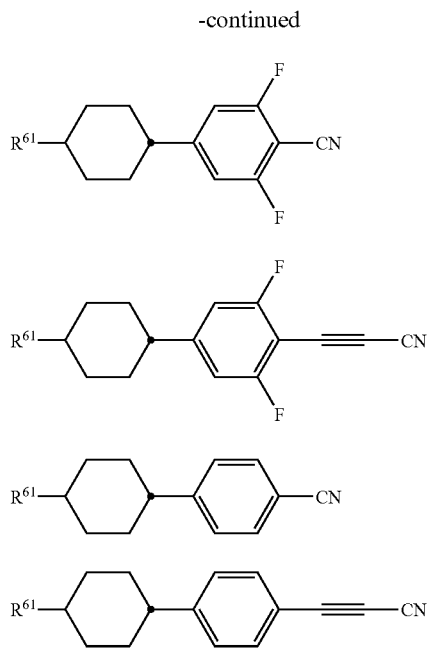

VID

VIE

VIF wherein $R^{61}$ is as defined above. It is preferred that $R^{61}$ is a straight-chain alkyl radical, more preferred a straight-chain alkanyl redical with 1, 2, 3, 4, 5, 6, 7 or 8 carbon atoms. Highly preferred compounds are of formula VIA-1 and VIC-1:

VIA-1

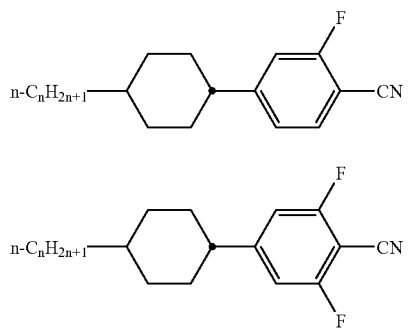

VIC-1 with n being an integer from 1 to 8 and preferably being 2, 3, 4 or 5.

Especially preferred examples of formula VIC are compounds of formula VIC-1a having a $\Delta\epsilon$ of 32.6 and of formula VIC-1b having a $\Delta\epsilon$ of 30.8:

VIC-1a

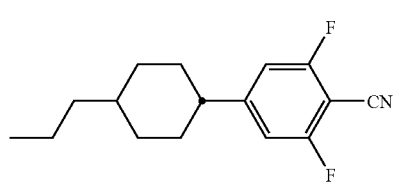

-continued

VIC-1b

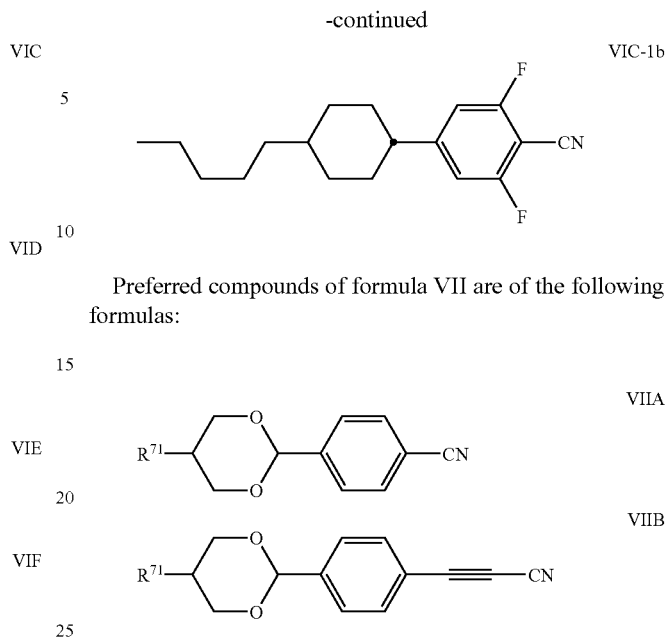

Preferred compounds of formula VII are of the following formulas:

VIIA

VIIB with $R^{71}$ being defined as above. Preferably, $R^{71}$ is a straight-chain alkyl radical, more preferably a straight-chain alkanyl radical with 1 to 8 carbon atoms. Compounds of formula VIIA-1 with n being 1, 2, 3, 4, 5, 6, 7 or 8 are preferred, whereby compounds of formulas VIIA-1a ($\Delta\epsilon=29.4$), VIIA-1b ($\Delta\epsilon=25.6$) and VIIA-1c ($\Delta\epsilon=23.8$) are especially preferred examples:

VIIA-1

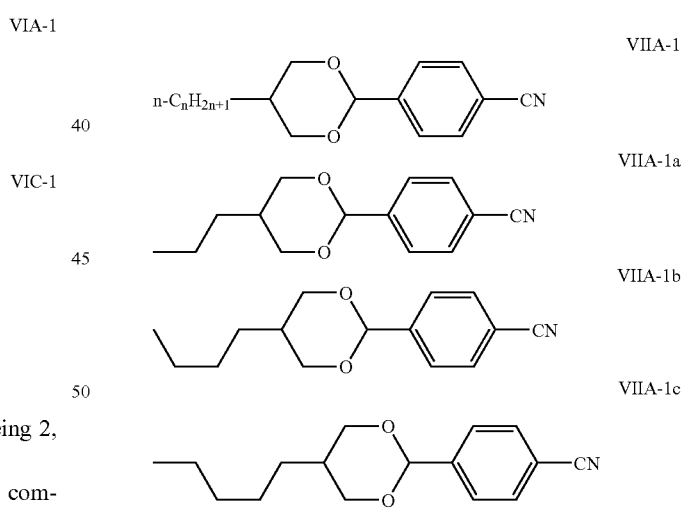

VIIA-1a

VIIA-1b

VIIA-1c

Preferred compounds of formula VIII are of the following formulas:

VIIIA

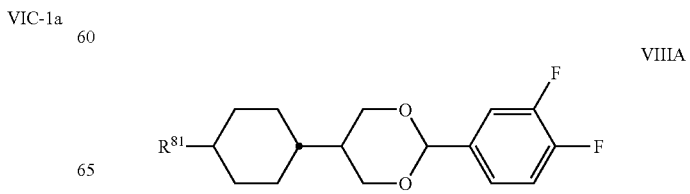

-continued

VIIIB
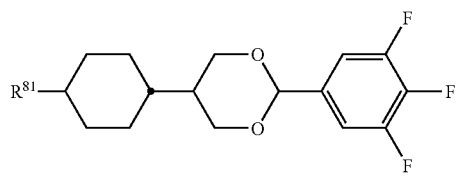

VIIIC
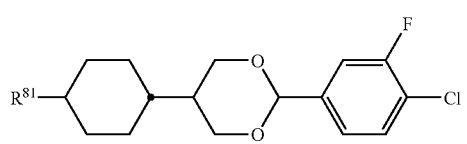

VIIID
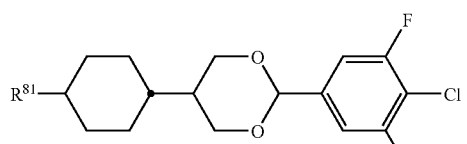

VIIIE
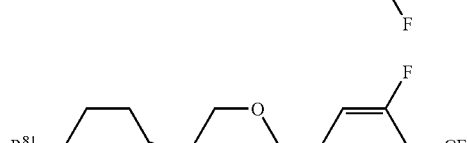

VIIIF
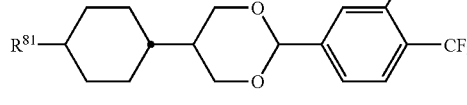

VIIIG
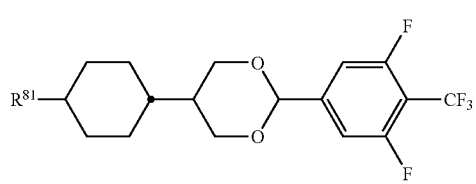

VIIIH
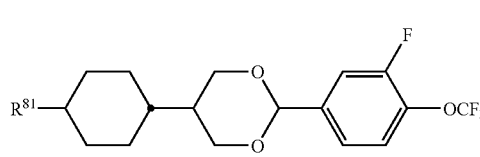

VIIIJ
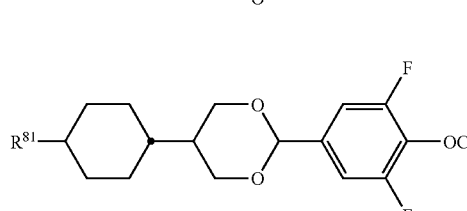

VIIIK
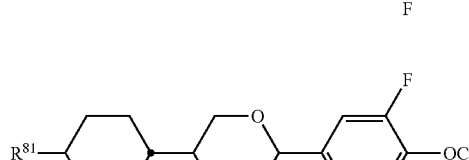

-continued

VIIIL
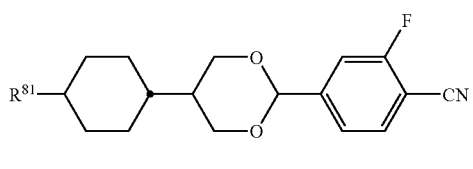

VIIIM
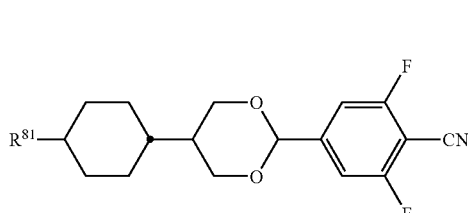

VIIIN
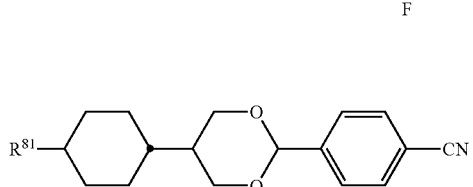

with $R^{81}$ being defined as above. Preferably, $R^{81}$ is a straight-chain alkyl radical, more preferably a straight-chain alkanyl radical with 1 to 8 carbon atoms with the exception of formula VIIIM wherein $R^{81}$ is preferably a straight-chain alkanyl radical with 3 to 8 carbon atoms. Compounds of formula VIIIB-1 with n being 1, 2, 3, 4, 5, 6, 7 or 8, especially 2, 3, 4 or 5, are preferred:

VIIIB-1
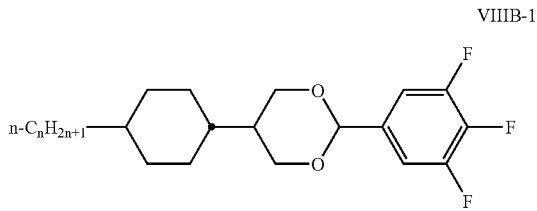

Especially preferred examples are of formulas VIIIB-1a ($\Delta\epsilon$=17.4), VIIIB-1b ($\Delta\epsilon$=17.0) and VIIIB-1c ($\Delta\epsilon$=15.7):

VIIIB-1a
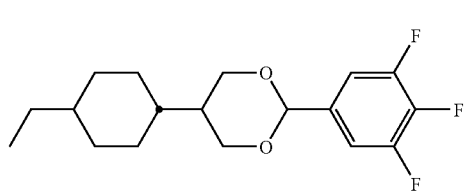

VIIIB-1b
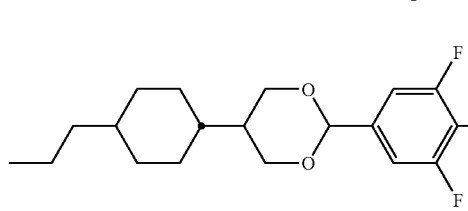

VIIIB-1c
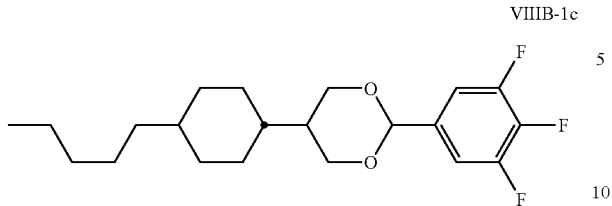
Preferred compounds of formula IX are of the following formulas:
IXA
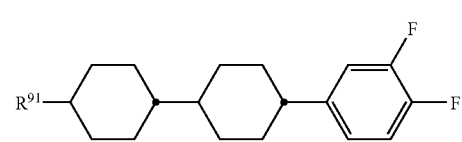
IXB
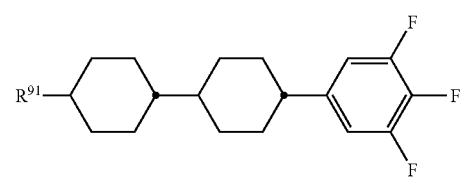
IXC
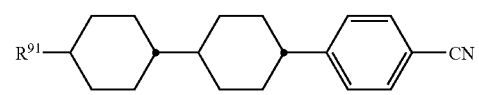
IXD
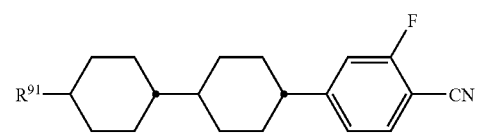
IXE
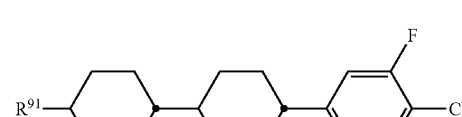
IXF
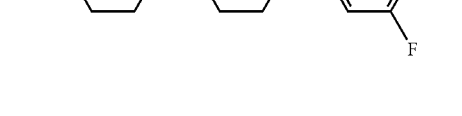
IXG
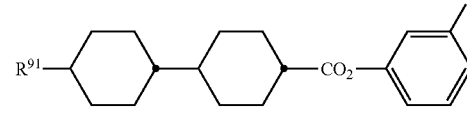
IXH
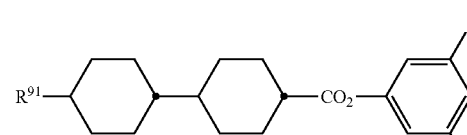
IXI
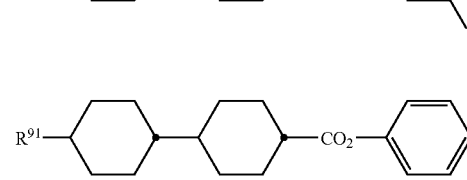
IXJ
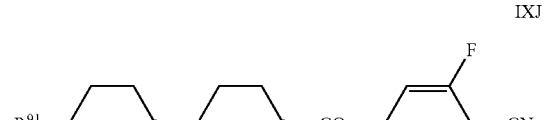
IXK
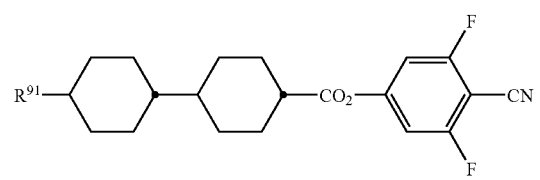
IXL
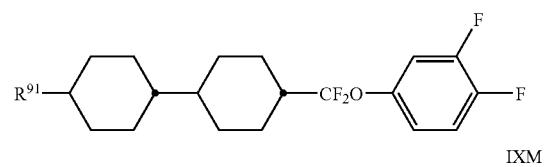
IXM
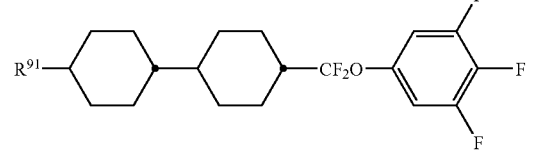
IXN
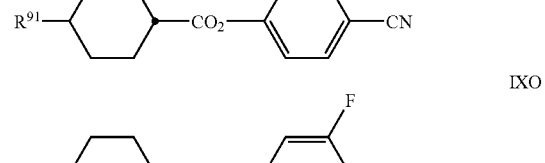
IXO
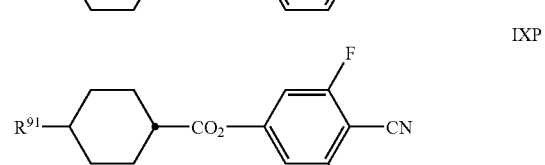
IXP
with $R^{91}$ being defined as above. Preferably, $R^{91}$ is a straight-chain alkyl radical, more preferably a straight-chain alkanyl radical with 1 to 8 carbon atoms. Compounds of formulas IXB-1, IXG-1 and IXM-1 with n being 1, 2, 3, 4, 5, 6, 7 or 8 are preferred:
IXB
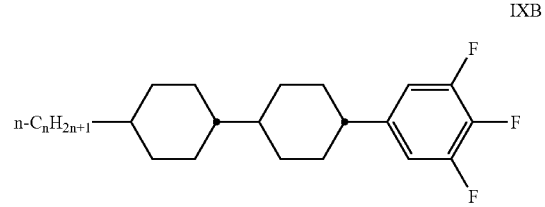

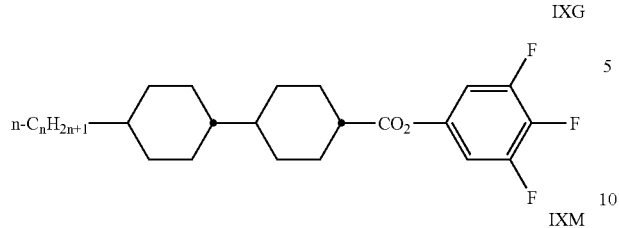
IXG
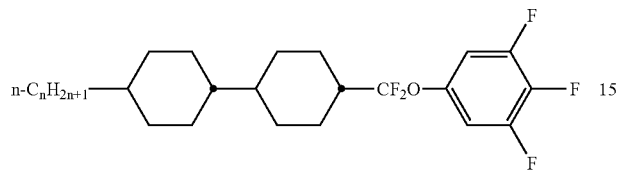
IXM
Especially preferred examples are compounds of the formulas IXB-1a (Δε=10.3), IXB-1b (Δε=9.7), IXB-1c (Δε=8.4), IXG-1a (Δε=11.2), IXG-1b (Δε=11.1), IXG-1c (Δε=10.3), IXM-1a (Δε=10.3), IXM-1b (Δε=10.5) and IXM-1c (Δε=9.5):
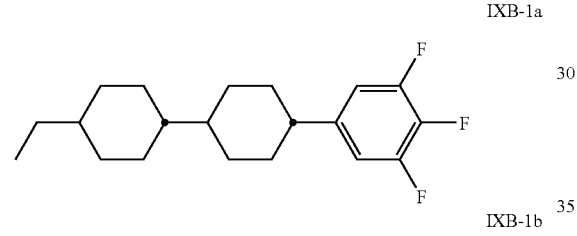
IXB-1a
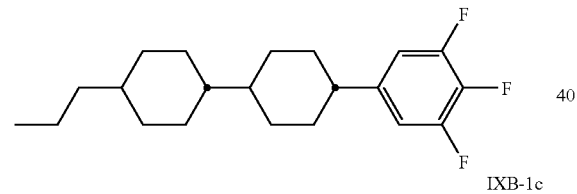
IXB-1b
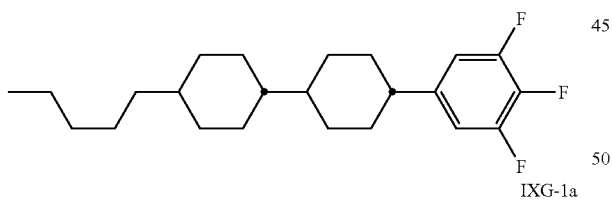
IXB-1c
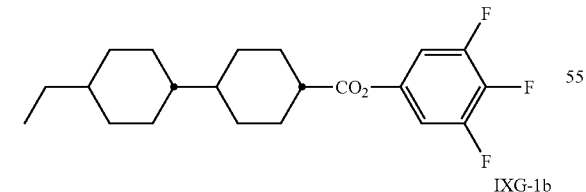
IXG-1a
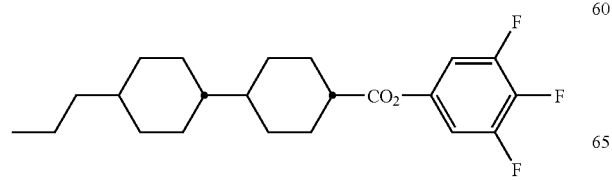
IXG-1b
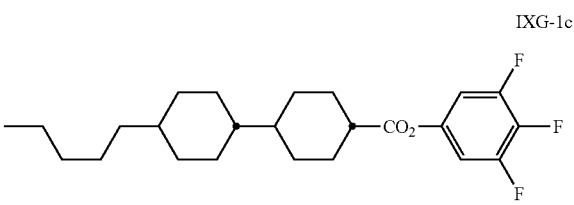
IXG-1c
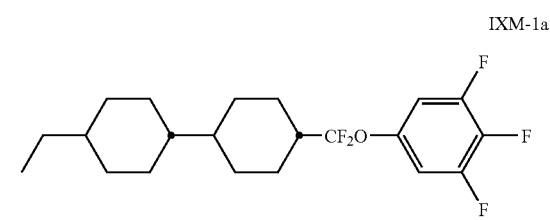
IXM-1a
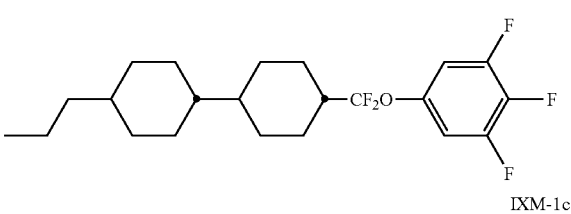
IXM-1b
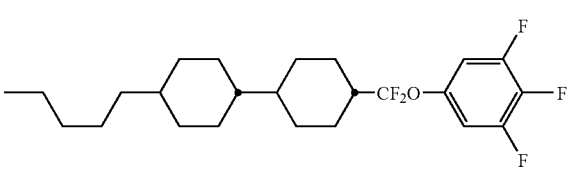
IXM-1c
Preferred compounds of formula X are of the following formulas:
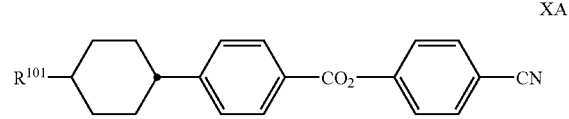
XA
XB
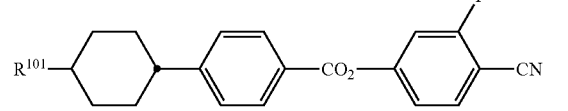
XC
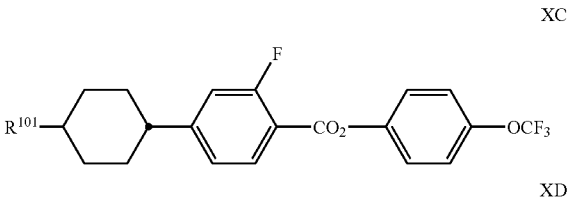
XD
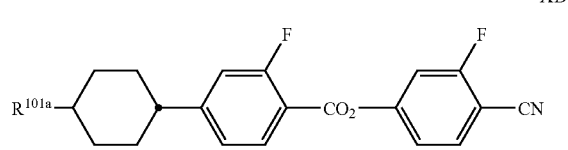

-continued

XE
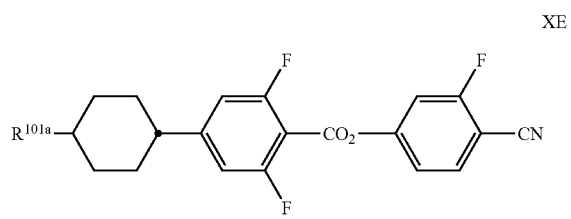

with $R^{101}$ being defined as above and $R^{101a}$ being $C_4$-$C_{15}$ alkyl. Preferably, $R^{101}$ is a straight-chain alkyl radical, more preferably a straight-chain alkanyl radical with 1 to 8 carbon atoms, while $R^{101a}$ is preferably a straight-chain alkanyl radical with 4 to 8 carbon atoms. Compounds of formulas XB-1 and XC-1 are especially preferred:

XB-1

XC-1
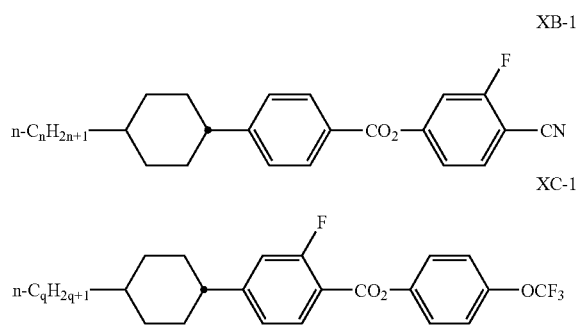

with n being an integer from 1 to 8. especially 2, 3, 4, 5 or 6; and q being an integer from 1 to 8. especially 2, 3 or 4. Preferred examples are compounds of formula XB-1a ($\Delta\epsilon$=37.5), XB-1b ($\Delta\epsilon$=35.8), XB-1c ($\Delta\epsilon$=36.0), XC-1a ($\Delta\epsilon$=16.1) and XC-1b ($\Delta\epsilon$=15.4):

XB-1a

XB-1b

XB-1c

XC-1a
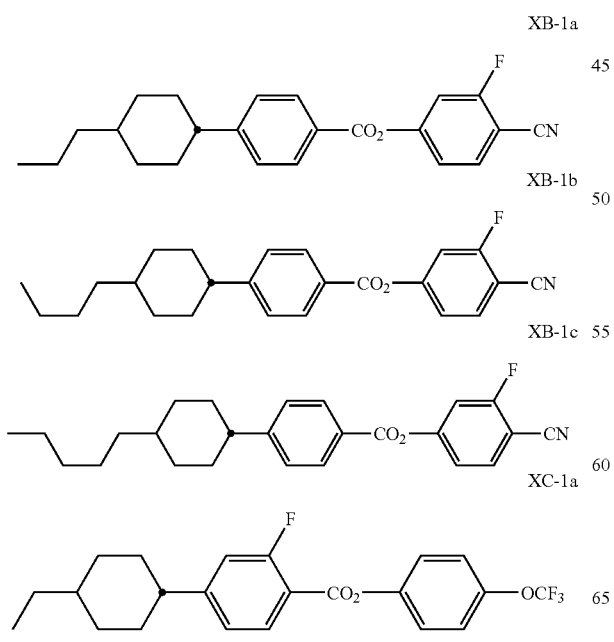

XC-1b
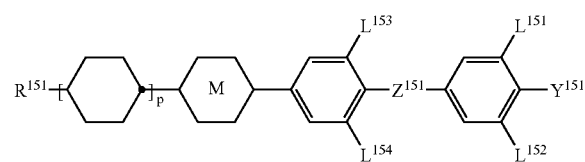

Component (ωω) may comprise compounds of one or more of the formulas VI, VII, VII I, IX and X. It may comprise compounds of one of these formulas or of two of these formulas or even of three or more of them at the same time. If compounds of two or three of these formulas are used in component (ωω), any of the combinations of said compounds is possible. It is preferred that component (ωω) contains at least one compound of formula VIC-1 and/or of formula VII-B1 as defined above.

Those compounds of formulas VI to X are preferred as constituents of component (ωω) especially with respect to liquid crystal compositions for use in bistable nematic liquid crystal devices having a relatively low Δn suitable for single polarizer devices, especially single polariser reflective or transflective displays. Besides these preferred compounds further compounds having a different structure may be useful as constituents of component (ωω). One specific class of compounds that may be comprised by component (ωω) and may be used additionally or alternatively to compounds of formulas VI to X above are compounds of formula XV below. Those compounds of formula XV are especially useful and preferred for liquid crystal compositions for the use in the present invention exhibiting a rather high Δn value and being suitable for liquid crystal displays in the two polariser reflective and transmissive mode. However, they may be used also together with compounds of formulas VI to X.

Compounds of formula XV are defined as follows:

XV
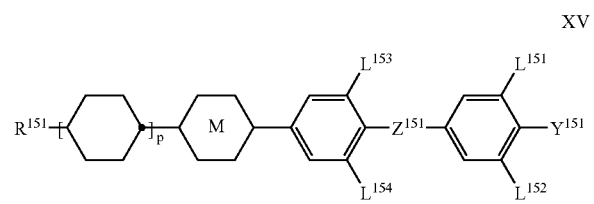

wherein
$R^{151}$ is $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other, and preferably is a straight-chain $C_1$ to $C_7$ alkanyl radical optionally substituted;

$Y^{151}$ is F, Cl, CN, NCS, $SF_5$, or $C_{1-15}$ alkanyl, alkenyl or alkoxy wherein said alkanyl, alkenyl or alkoxy radical is mono- or poly-substituted with F and/or Cl, and preferably is F, Cl or an alkanyl or alkoxy radical poly-substituted with F;

$Z^{151}$ is a single bond, —$CO_2$— or —$CF_2O$—;
$L^{151}$, $L^{152}$, $L^{153}$ and $L^{154}$ are independently of each other H or F, and preferably at least two of them are F;
p is 0 or 1; and

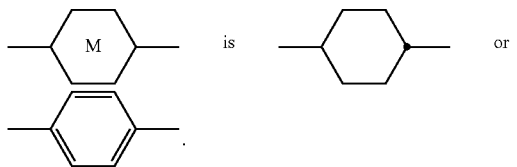

Preferred compounds of formula XV are

XVA

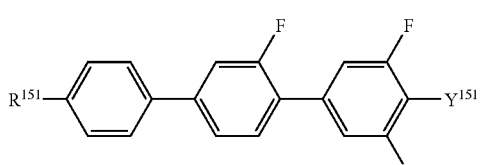

XVB

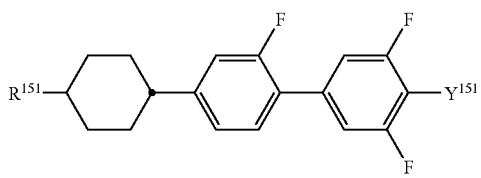

XVC

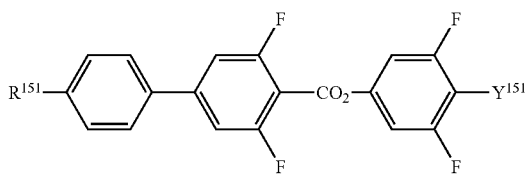

XVD

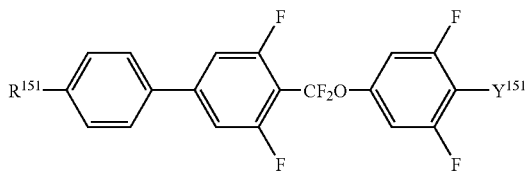

XVE

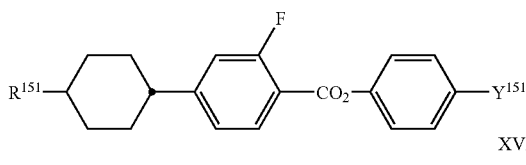

XVF

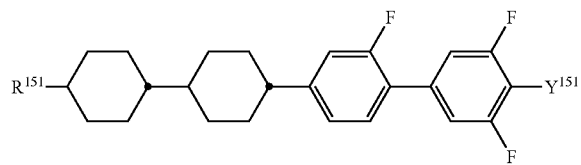

wherein $R^{151}$ and $Y^{151}$ are both defined as above for formula XV. $R^{151}$ preferably is an unbranched alkanyl radical with 1, 2, 3, 4, 5, 6 or 7 carbon atoms, especially with 2, 3, 4 or 5 carbon atoms. With respect to compounds of formula XVE, $Y^{151}$ preferably means an alkanyl or alkoxy radical substituted with halogen, more preferably fluorine atoms, and especially is $OCF_3$. With respect to the compounds of formulas XVA, XVB, XVC, XVD and XVF $Y^{151}$ is preferably a halogen atom, more preferably Cl or F and especially F.

Preferred examples of compounds according to formula XVA are compounds of formula XVA-1

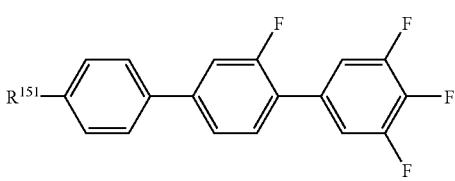

XVA-1 with $R^{151}$ being $C_nH_{2n+1}$ with n from 1 to 7, especially of formula XVA-1a ($R^{151}$=ethyl; Δε=19.4), XVA-1b ($R^{151}$=n-propyl) and XVA-1c ($R^{151}$=n-pentyl; Δε=16.7).

Preferred examples of compounds according to formula XVB are compounds of formula XVB-1

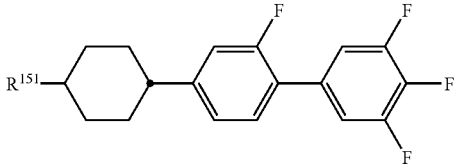

XVB-1 with $R^{151}$ being $C_nH_{2n+1}$ with n from 1 to 7, especially of formula XVB-1a ($R^{151}$=ethyl; Δε=15.0), XVB-1b ($R^{151}$=n-propyl) and XVB-1c ($R^{151}$=n-pentyl; Δε=13.8).

Preferred examples of compounds according to formula XVC are compounds of formula XVC-1

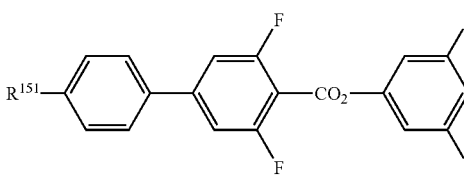

XVC-1 with $R^{151}$ being $C_nH_{2n+1}$ with n from 1 to 7, especially of formula XVC-1a ($R^{151}$=ethyl; Δε=31.5), XVC-1b ($R^{151}$=n-propyl) and XVC-1c ($R^{151}$=n-pentyl; Δε=29.2).

Preferred examples of compounds according to formula XVD are compounds of formula XVD-1

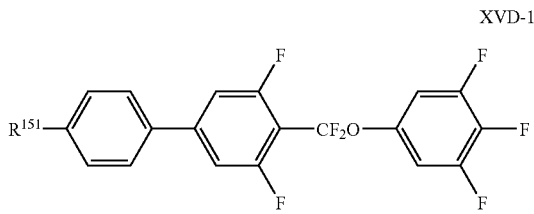

XVD-1 with $R^{151}$ being $C_nH_{2n+1}$ with n from 1 to 7, especially of formula XVD-1a ($R^{151}$=ethyl; $\Delta\epsilon$=23.3), XVD-1b ($R^{151}$=n-propyl; ; $\Delta\epsilon$=23.0) and XVD-1c ($R^{151}$=n-pentyl).

Preferred examples of compounds according to formula XVE are compounds of formula XVE-1

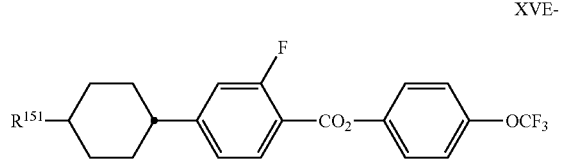

XVE-1 with $R^{151}$ being $C_nH_{2n+1}$ with n from 1 to 7, especially of formula XVE-1a ($R^{151}$=ethyl; $\Delta\epsilon$=16.4), XVE-1b ($R^{151}$=n-propyl; ; $\Delta\epsilon$=16.0) and XVE-1c ($R^{151}$=n-pentyl).

Preferred examples of compounds according to formula XVF are compounds of formula XVF-1

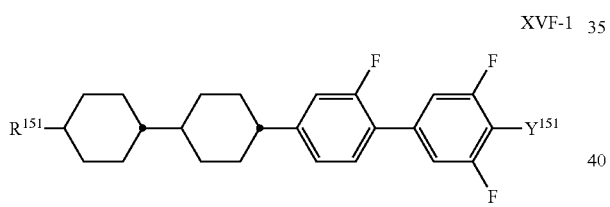

XVF-1 with $R^{151}$ being $C_nH_{2n+1}$ with n from 1 to 7, especially of formula XVF-1a ($R^{151}$=ethyl; $\Delta\epsilon$=15.2), XVF-1b ($R^{151}$=n-propyl) and XVF-1c ($R^{151}$=n-pentyl; $\Delta\epsilon$=13.4).

The liquid crystal composition for use in the bistable liquid crystal device according to the invention may comprise further mesogenic or liquid crystalline compounds known in the art. They may, for instance, be present in order to improve the composition's viscosity. These compounds are not specifically limited as long as they do not impair the composition's properties with respect to its use in the bistable liquid crystal device.

In a preferred embodiment of the present invention the liquid crystal composition for use in a bistable liquid crystal device comprises one or more compounds selected from the group consisting of compounds of formula XI and XII:

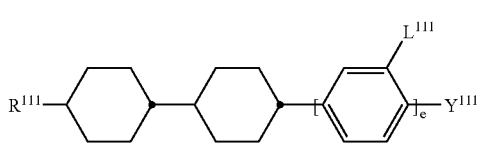

XI

-continued

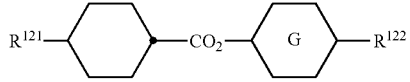

XII wherein e is 0 or 1;

$R^{111}$ is $C_2$-$C_{15}$ alkenyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;

$R^{121}$ and $R^{122}$ are independently of each other $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;

$L^{111}$ is H or F;

$Y^{111}$ is F, Cl, CN, $CF_3$, $OCF_3$, $OCHF_2$ or $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other; and

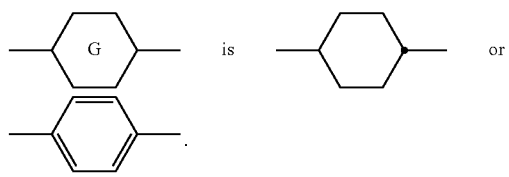

Preferred compounds of formula XI are of the following formulas:

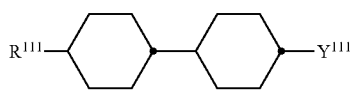

XIA

XIB

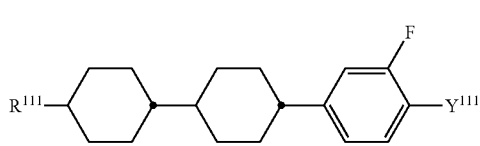

XIC with $R^{111}$ and $Y^{111}$ being defined as above. Preferably, $R^{111}$ is a straight-chain alkenyl radical with 2, 3, 4, 5, 6 or 7 carbon atoms. In formulas XIA and XIB, $Y^{111}$ preferably means a straight-chain alkanyl or alkoxy radical with up to 8 carbon atoms, especially 1, 2, 3, 4 or 5 carbon atoms, while in formula XIC, $Y^{111}$ preferably means F or Cl.

Especially preferred compounds of formula XIA are of formula XIA-1:

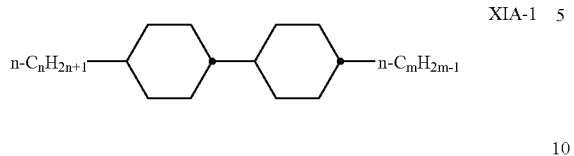
XIA-1 with n being 1, 2, 3, 4, 5, 6, 7 or 8 and m being 2, 3, 4, 5 or 6. It is highly preferred that the —CH=CH— moiety of the n-$C_mH_{2m-1}$ group is directly attached to the cyclohexyl ring substituted with said group. Specific examples are the following compounds:

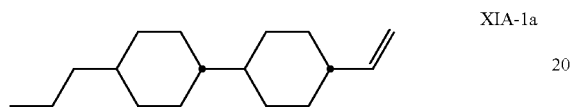
XIA-1a

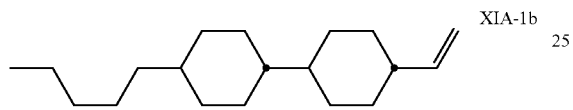
XIA-1b

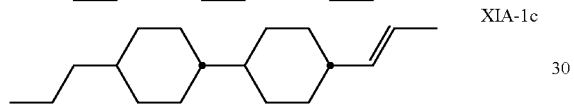
XIA-1c

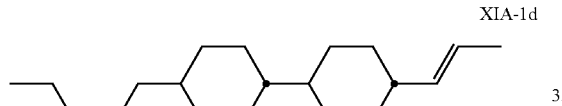
XIA-1d

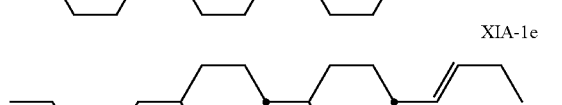
XIA-1e

Especially preferred compounds of formula XIB are of formula XIB-1:

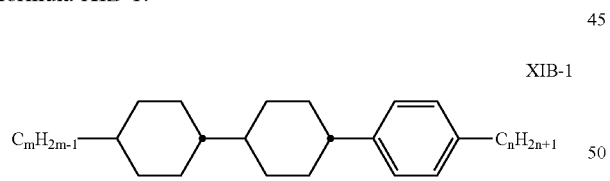
XIB-1 with n being 1, 2, 3, 4, 5, 6, 7 or 8 and m being 2, 3, 4, 5 or 6. It is highly preferred that the —CH=CH— moiety of the n-$C_mH_{2m-1}$ group is directly attached to the cyclohexyl ring substituted with said group. One specific example of compounds of formula XIB-1 is of formula XIB-1a:

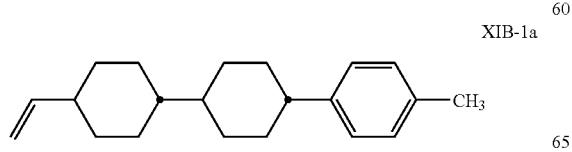
XIB-1a

Especially preferred compounds of formula XIC are of formulas XIC-1 and XIC-2:

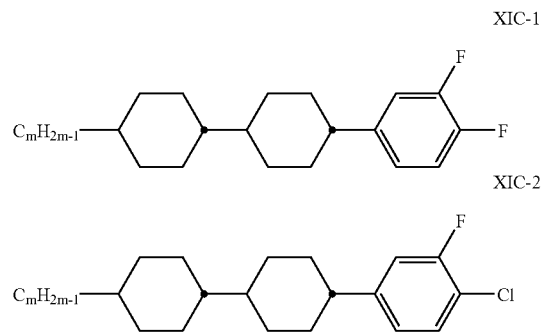
XIC-1

XIC-2 with n being 1, 2, 3, 4, 5, 6, 7 or 8 and m being 2, 3, 4, 5 or 6. Specific examples are the following compounds:

XIC-1a

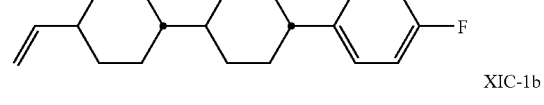
XIC-1b

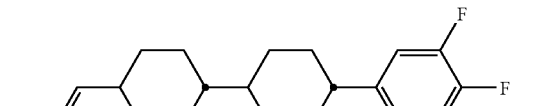
XIC-1c

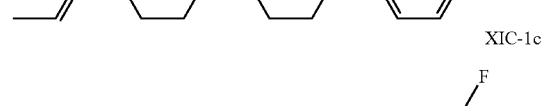
XIC-2a with the compound of formula XIC-La being most preferred.

Preferred compounds of formula XII are of formulas XIIA and XIIB:

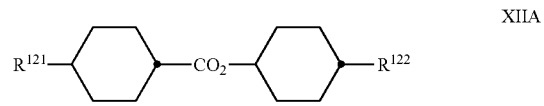
XIIA

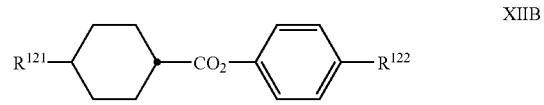
XIIB wherein $R^{121}$ and $R^{122}$ are defined as above. Preferably, $R^{121}$ is a straight-chain alkyl radical, more preferably a straight-chain alkanyl radical having 1 to 8 carbon atoms. In formula XIIA, $R^{122}$ preferably means a straight-chain alkyl radical, more preferably a straight-chain alkanyl radical with up to 8 carbon atoms. In formula XIIB, $R^{122}$ preferably means a straight-chain alkanyl or alkoxy radical with up to 8 carbon atoms.

Especially preferred compounds of formula XIIA are of formula XIIA-1

XIIA-1

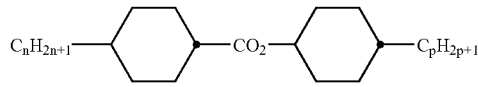

with n and p being independently of each other 1, 2, 3, 4, 5, 6, 7 or 8, preferably 3, 4 or 5. Specific examples of compounds of formula XIIA-1 are:

XIIA-1a

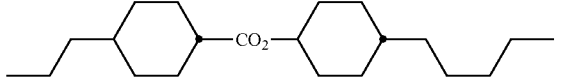

XIIA-1b

XIIA-1c

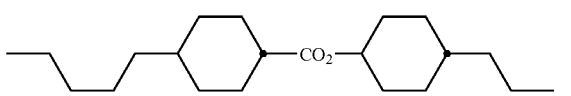

Especially preferred compounds of formula XIIB are of formula XIIB-1:

XIIB-1

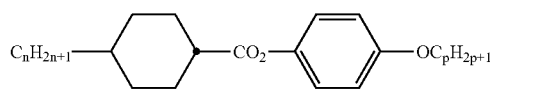

with n being 1, 2, 3, 4, 5, 6, 7 or 8, preferably 3, 4 or 5; and p being 1, 2, 3, 4, 5 or 6, preferably 1, 2 or 3. Specific examples are of formulas XIIB-1a to XIIB-1d:

XIIB-1a

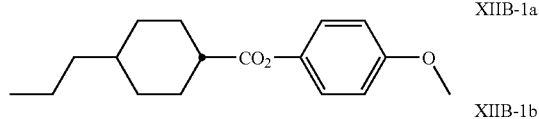

XIIB-1b

XIIB-1c

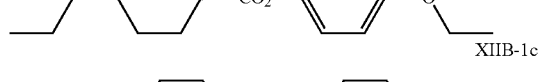

XIIB-1d

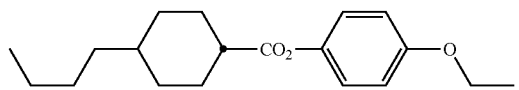

The liquid crystal composition for use in a bistable liquid crystal device according to the invention may also comprise one or more compounds of

XIII

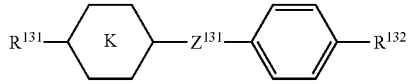

wherein $R^{131}$ and $R^{132}$ are independently of each other $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;

$Z^{131}$ is a single bond or a C≡C-moiety; and

K is 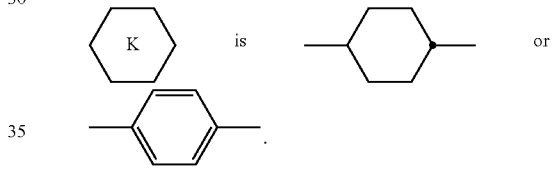

Preferred compounds of formula XIII are of formulas XIIIA, XIIIB and XIIIC:

XIIIA

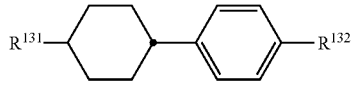

XIIIB

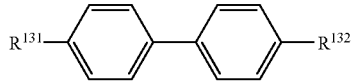

XIIIC

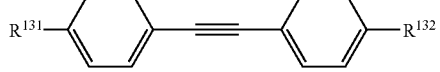

wherein $R^{131}$ and $R^{132}$ are both as defined for formula XIII above.

Preferably, for formulas XIIIA and XIIIB both $R^{131}$ and $R^{132}$ are independently of each other straight-chain alkyl, more preferably straight-chain alkanyl with 1, 2, 3, 4, 5, 6, 7 or 8 carbon atoms. For compounds of formula XIIIC, preferably $R^{131}$ is straight-chain alkyl, more preferably straight-chain alkanyl with 1, 2, 3, 4, 5, 6, 7 or 8 carbon atoms, while $R^{132}$ is straight-chain alkoxy with 1, 2, 3, 4, 5, 6, 7 or 8 carbon atoms.

The liquid crystal composition for use in a bistable liquid crystal device according to the invention preferably has:

clearing points of above about 80° C., more preferably of above about 85° C. and still more preferably of aove about 90° C.;

values of Δε of above about 12.0, more preferably of above about 16.0 and still more preferably of above about 20.0;

values of $\tau_{opt}$ of below about 45 ms, more preferably of below about 40 ms and still more preferably of below about 35 ms.

The liquid crystal composition for use in a bistable liquid crystal device according to the invention may optionally contain one or more further additives known to the skilled person and described in literature. Examples of those further additives are stabilizers, chiral dopants and pleochromatic dyes. If used, they are contained in usual concentrations. The total concentration of said further additives is in the range from 0 to 15 weight %, preferably in the range from 0.1 to 10 weight %, especially preferred not more than 6 weight %, based on the total weight of the composition. The concentration of each single additive is usually in the range from 0.1 to 3 weight %, if present. The concentration of said further additives and likewise constituents of the liquid crystal composition are not taken into account for the specification of the concentration of the other compounds comprised in the liquid crystal composition. As chiral dopants for example cholesteryinonanoate (CN), R/S-811, R/S-1011 and R/S-2011 or CB15 (Merck KGBA, Darmstadt, Germany) may be used.

It will be acknowledged by those skilled in the art that the liquid crystal composition for the use according to the invention may also comprise further (mesogenic) compounds besides those disclosed in more detail in this specification. A wide variety of mesogenic compounds may be used as long as they are not detrimental to the set of parameters important for the use of the bistable liquid crystal composition according to the invention.

All the compounds used in the liquid crystal composition of the bistable liquid crystal devices are either commercially available or can be readily prepared by methods known to those skilled in the art and as described in the standard text books of organic synthesis, for instance, in Houben-Weyl, *Methoden der Organischen Chemie*, Georg-Thieme-Verlag, Stuttgart. The liquid crystal composition will be prepared by applying standard protocols and techniques. In general, the desired amount of the minor component(s) will be dissolved in the major component, usually under elevated temperature. Alternatively, solutions of components in organic solvents like acetone, chloroform or methanol, can be mixed and afterwards the solvent(s) can be removed, e.g., by distillation. Likewise, manufacturing of the bistable devices according to the invention will follow standard techniques known to the artisan.

In the present description and the following examples the structures of the mesogenic compounds disclosed are described by using acronyms. Said acronyms can be transformed into chemical formulas according to Tables A and B. In these tables, radicals $C_nH_{2n+1}$ and $C_mH_{2m+1}$ are straight-chain alkyl radicals having n and m carbon atoms, respectively. Alkenyl radicals have the trans configuration. The codes according to Table B are self-evident. In Table A, only the acronym for the parent structure is given. In individual cases, the acronym for the parent structure is followed, usually separated by a hyphen, by a code for the substituents $R^1$, $R^2$, $L^1$ and $L^2$ as given below:

TABLE A

| Code of $R^1$, $R^2$, $L^1$, $L^2$ | $R^1$ | $R^2$ | $L^1$ | $L^2$ |
|---|---|---|---|---|
| n | $C_nH_{2n+1}$ | CN | H | H |
| nm | $C_nH_{2n+1}$ | $C_mH_{2m+1}$ | H | H |
| nOm | $C_nH_{2n+1}$ | $OC_mH_{2m+1}$ | H | H |
| nF | $C_nH_{2n+1}$ | F | H | H |
| nN.F | $C_nH_{2n+1}$ | CN | F | H |
| nN.F.F | $C_nH_{2n+1}$ | CN | F | F |

OS

HP

CCPC

PCH

D

TABLE B

| Structure | Name |
|---|---|
| $C_nH_{2n+1}$—H—H—CH₂O—H—$C_mH_{2m+1}$ | CCOC-n-m |
| CH₂=CH—H—H—⌬(F,F) | CCG-V-F |
| $C_nH_{2n+1}$—H—⌬(F)—⌬(F,F,F) | CGU-n-F |
| $C_nH_{2n+1}$—⌬—⌬(F,F)—CF₂O—⌬(F,F,F) | PUQU-n-F |
| $C_nH_{2n+1}$—H—H—⌬(F)—⌬(F,F,F) | CCGU-n-F |
| $C_nH_{2n+1}$—H—⌬—⌬—H—$C_mH_{2m+1}$ | CBC-nm |
| $C_nH_{2n+1}$—H—⌬—⌬(F)—H—$C_mH_{2m+1}$ | CBC-nmF |
| $C_nH_{2n+1}$—H—H—COO—⌬—$C_mH_{2m+1}$ | CP-nm |
| $C_nH_{2n+1}$—H—H—COO—⌬(F,F,F) | CCZU-n-F |
| $C_nH_{2n+1}$—H—H—CH=CH₂ | CC-n-V |

TABLE B-continued

| Structure | Name |
|---|---|
| $C_nH_{2n+1}$—⌬—⌬—CN | K3·n |
| $C_nH_{2n+1}$—H—H—CH=CH—$C_mH_{2m+1}$ | CC-n-Vm |
| $C_nH_{2n+1}$—H—H—⌬—OCF₃ | CCP-nOCF3 |
| CH₂=CHCH₂CH₂—⌬—COO—⌬(F,F)—CN | PZU-V2-N |
| $C_nH_{2n+1}$—H—[dioxane]—⌬(F,F,F) | CDU-n-F |
| $C_nH_{2n+1}$—H—H—CF₂O—⌬(F,F,F) | CCQU-n-F |
| $C_nH_{2n+1}$—H—⌬(F)—COO—⌬—OCF₃ | CGZP-n-OT |
| $C_nH_{2n+1}$—H—H—CF₂O—⌬(F,F) | CCQG-n-F |
| $C_nH_{2n+1}$—[dioxane]—⌬(F,F)—CN | DU-n-N |

TABLE B-continued
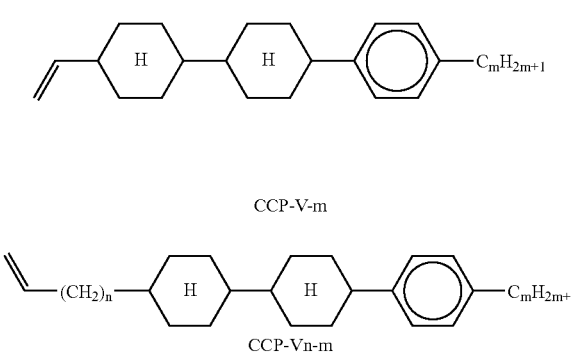
CCP-V-m
CCP-Vn-m
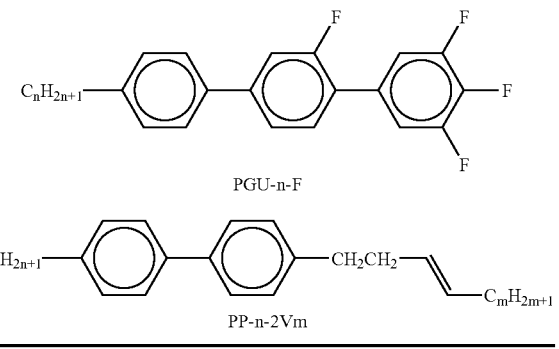
PGU-n-F
PP-n-2Vm
TABLE C
Table C shows dopants optionally present in the liquid crystal compositions for use in the zenithal bistable nematic devices of the invention.
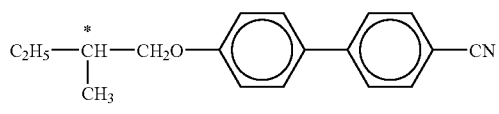
C 15
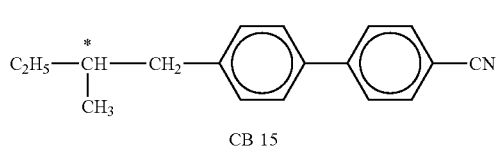
CB 15
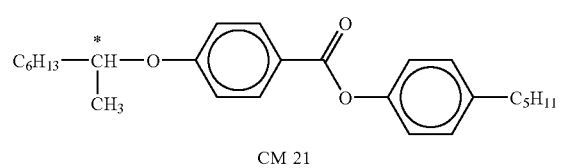
CM 21
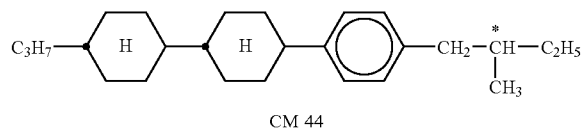
CM 44
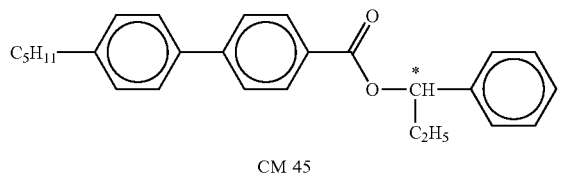
CM 45
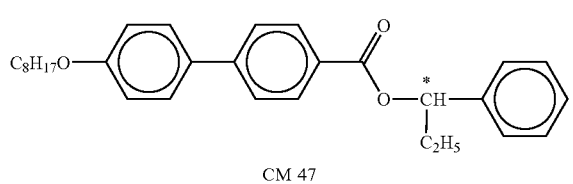
CM 47

TABLE C-continued
Table C shows dopants optionally present in the liquid crystal compositions for use in the zenithal bistable nematic devices of the invention.
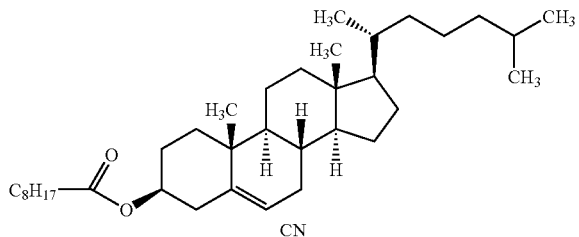
CN
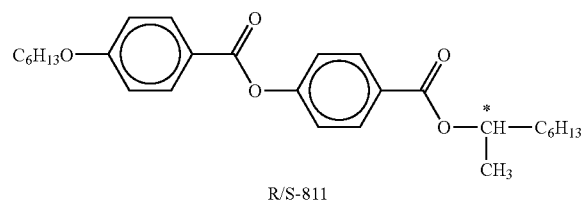
R/S-811
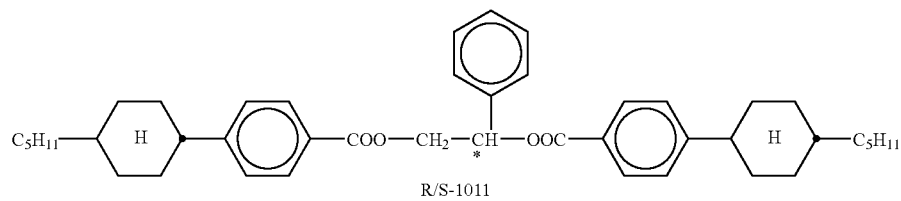
R/S-1011
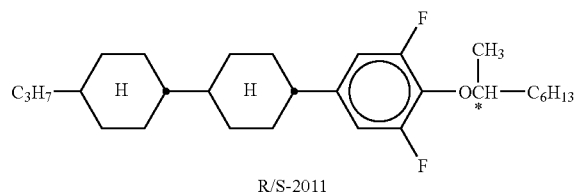
R/S-2011
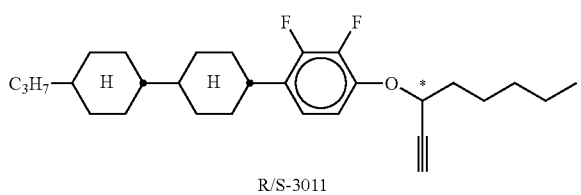
R/S-3011
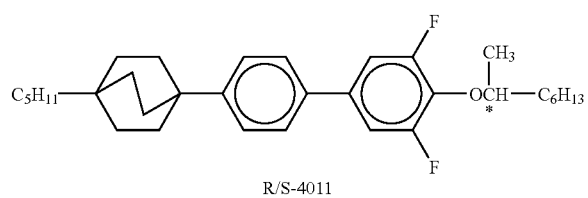
R/S-4011
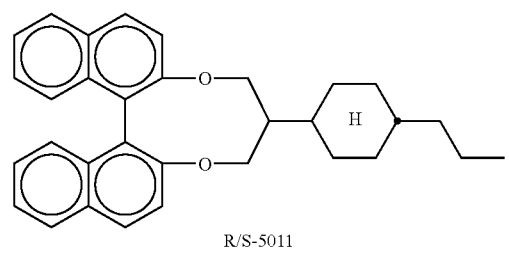
R/S-5011

TABLE D
Table D shows stabilizers optionally present in the liquid crystal compositions for use in the zenithal bistable nematic devices of the invention.
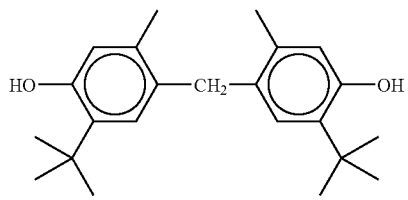
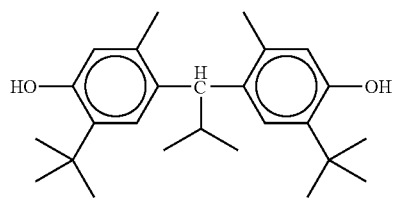
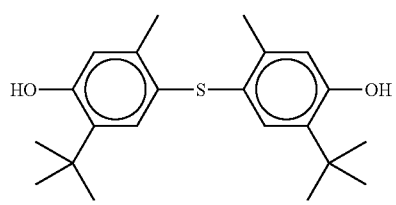
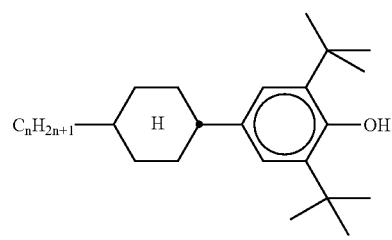
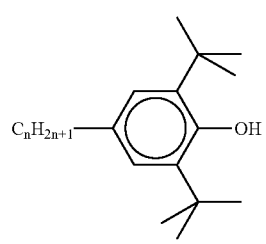
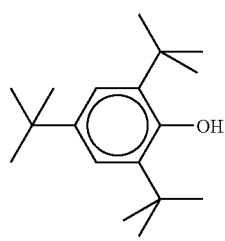

TABLE D-continued
Table D shows stabilizers optionally present in the liquid crystal compositions for use in the zenithal bistable nematic devices of the invention.
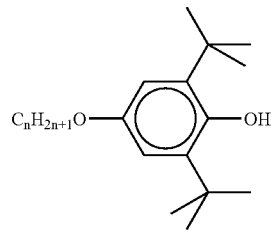
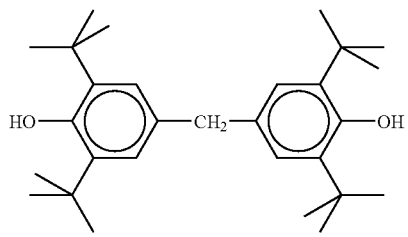
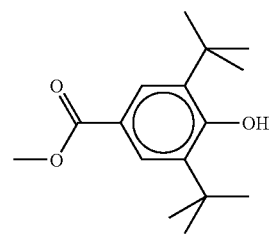
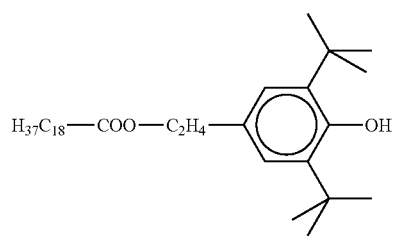
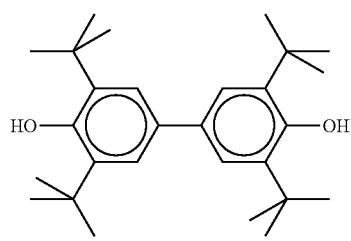

TABLE D-continued
Table D shows stabilizers optionally present in the liquid crystal compositions for use in the zenithal bistable nematic devices of the invention.
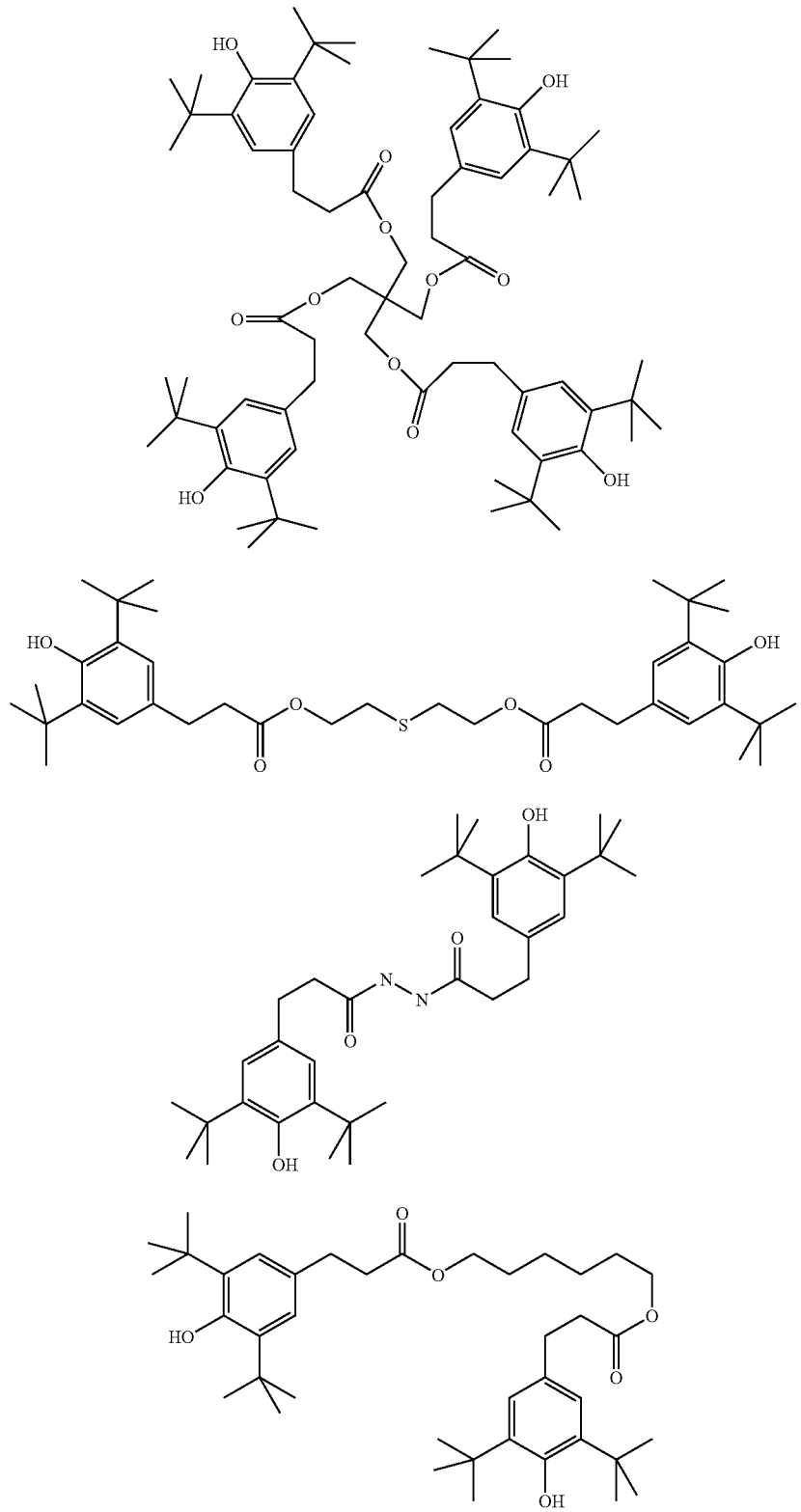

TABLE D-continued
Table D shows stabilizers optionally present in the liquid crystal compositions for use in the zenithal bistable nematic devices of the invention.
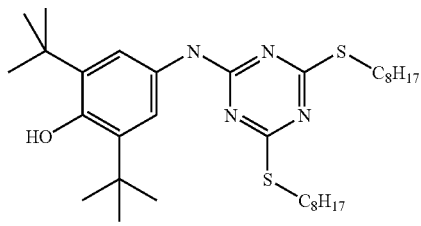
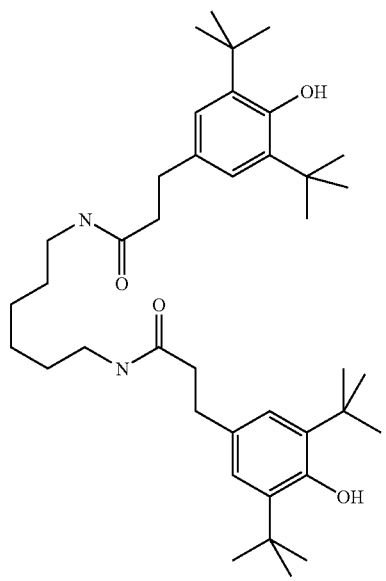
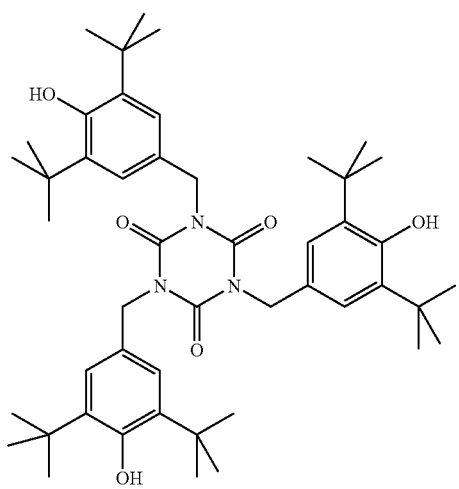

TABLE D-continued
Table D shows stabilizers optionally present in the liquid crystal compositions for use in the zenithal bistable nematic devices of the invention.
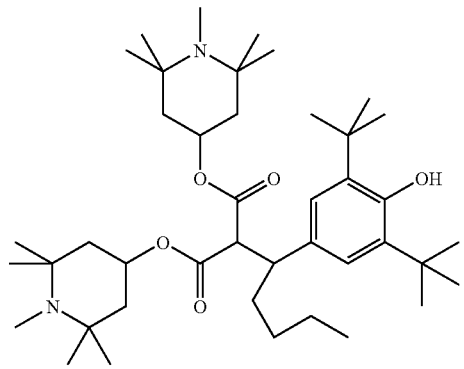
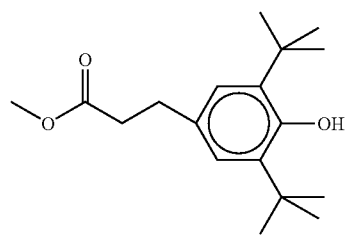
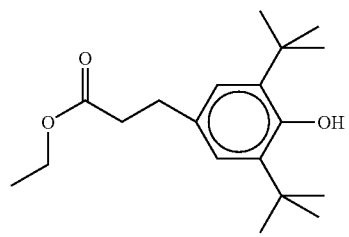
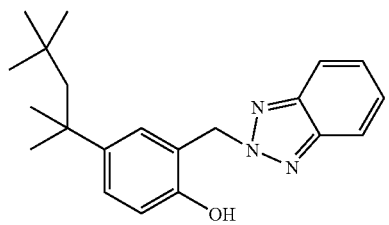
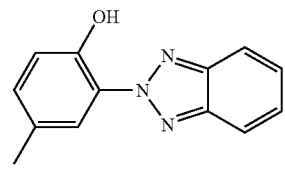
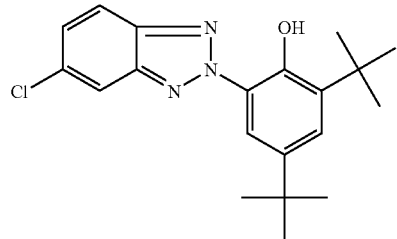

TABLE D-continued
Table D shows stabilizers optionally present in the liquid crystal compositions for use in the zenithal bistable nematic devices of the invention.
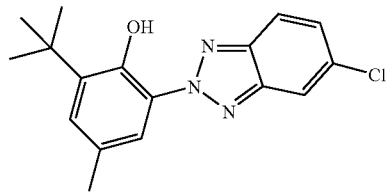
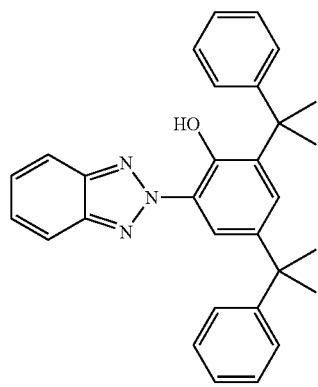
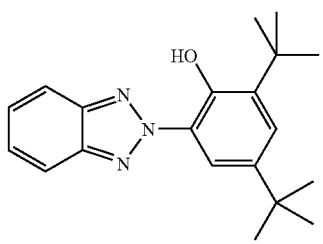
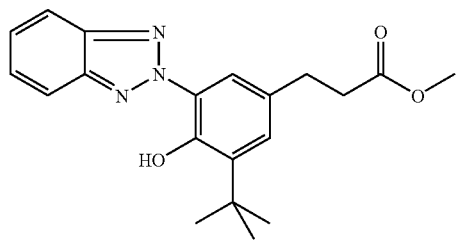
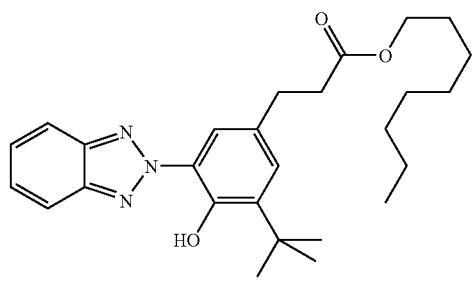

TABLE D-continued
Table D shows stabilizers optionally present in the liquid crystal compositions for use in the zenithal bistable nematic devices of the invention.
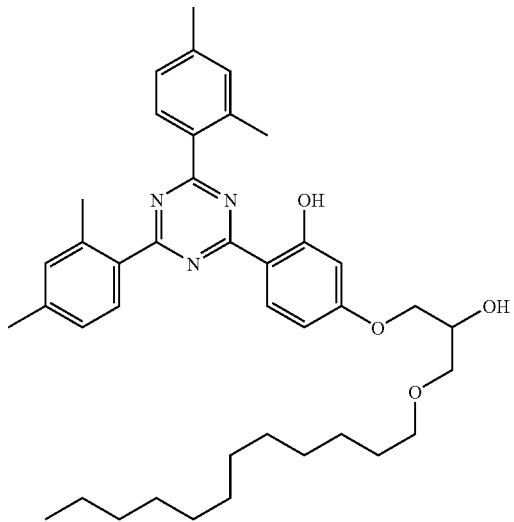
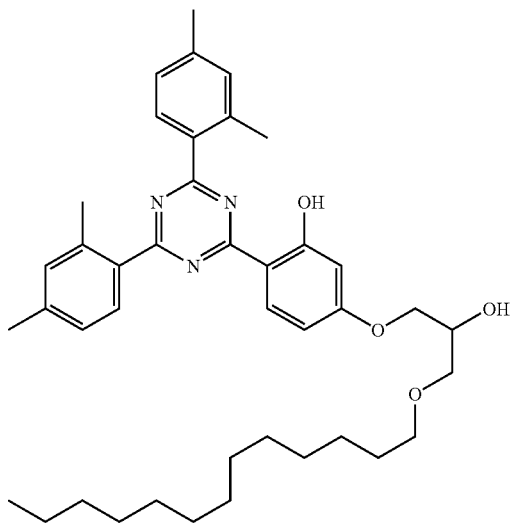
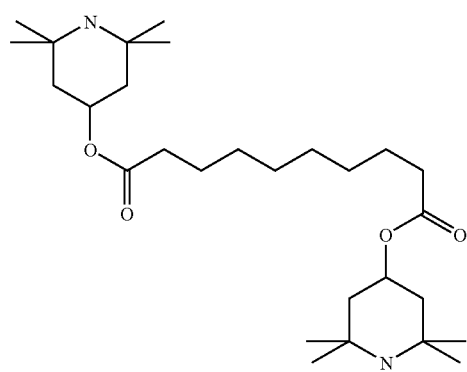

TABLE D-continued

Table D shows stabilizers optionally present in the liquid crystal compositions for use in the zenithal bistable nematic devices of the invention.

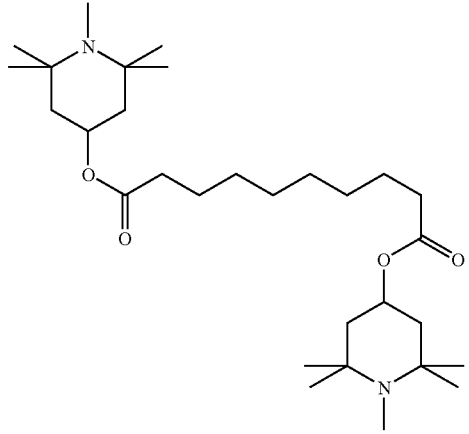

Percentages given herein are weight % and generally related to the total amount of a composition or mixture except stated otherwise. Temperatures are given in degree Celsius (° C.) unless stated otherwise. $T_{NI}$ means the clearing point at which a nematic medium becomes isotropic. $\Delta n$ is the optical anisotropy (birefringence) (at 589 nm, 20° C.). $\Delta \epsilon$ means the dielectric anisotropy (at 1 kHz, 20° C.). $K_1$ is the splay elastic constant, and $K_3$ is the bend elastic constant both given in pN. Electrooptical data has been determined in a twisted zenithal bistable nematic cell. Except stated otherwise the measurements have been performed at 20° C. $V_{opt}$ is the corrected operating voltage (in V) derived from the corrected switching field $E_{LC@100 \mu s}$ (at 25° C.; in zenithal bistable test cells with the actual cell gap d of about 2.8 to about 5 μm; 100 μs pulse) by $V_{opt} = E_{LC@100 \mu s} \cdot d_{opt}$. In case $\Delta n < 0.11$, $d_{opt}$ (in μm) is $\lambda/(2\Delta n)+0.4$ (with $\lambda = 0.555$ μm, and the 0.4 factor being an empirical correction factor) for the single polariser reflective VAN-HAN mode. If $\Delta n > 0.11$, $d_{opt}$ (in μm) is given by the modified $1^{st}$ minimum condition for the two polariser HAN-TN mode as being $\lambda \sqrt{3}/(2\Delta n)+0.4$ (with $\lambda = 0.555$ μm, and the 0.4 factor being an empirical correction factor). $\Delta V_{opt}$ is the corrected operating window at a 400 μs pulse for B-W-switching and reverse switching (in V); it is calculated from the experimental switching field window $\Delta E_{LC@400 \mu s}$ (at 25° C.; 400 μs pulse) multiplied with $d_{opt}$ defined as given above. Optical response time $\tau_{opt}$ (in ms) is calculated from $\tau_{opt} = \tau \cdot d^2_{opt}/d^2$ with $\tau$ being the experimental response time, $d_{opt}$ being as defined above and d being the experimental cell gap.

The following Examples should further illustrate the present invention as described above and in the claims but not meant to restrict its scope.

EXAMPLES

Test samples were prepared by weighing out the appropriate weight amounts (percentage weight/weight) of the individual components. The sample was then homogenised by heating into the isotropic phase and thoroughly mixing. The mixture was then stirred with a given concentration of alumina and then filtered (0.2 μm) to just leave the liquid crystal mixture. The nematic to isotropic transition temperature (or clearing point, $T_{NI}$), dielectric anisotropy ($\Delta \epsilon$), birefringence ($\Delta n$), splay and bend elastic constants ($K_1$ and $K_3$), and rotational viscosities ($\gamma_1$) were determined as described in the Merck brochure "Physical Properties of Liquid Crystals—Description of the measurement methods", ed. W. Becker (1998). Values for single compounds are extrapolated from those determined using a known concentration (usually 10 weight % of the single compound) in a standard host mixture ZLI-4792 (Merck KGBA, Darmstadt, Germany) for which the initial mixture values are also known. The electrooptical performance of each mixture in a zentihal bistable nematic device was measured using a simple experimental set-up and the twisted type test cells. This required a transmissive mode micrscope with a mounted photo-detector connected to an oscilloscope. This allowed the transmission through crossed polarisers to be monitored. The test cell was mounted on a heating stage under the microscope to permit measurements at 25° C. Bipolar electrical pulses (of varying duration and voltage) were used to ensure that there was no net d.c. voltage applied to the cell. The trailing edge (and so polarity) of each pulse therefore determined the final switched state (depending on the duration and voltage). Two signal generators were necessary to ensure that the correct initial state is first selected, with the first signal triggering the second (with an appropriate phase difference). Both signals were amplified by passing the output of the signal generators through an amplifier before being connected to the test cell. For the B-W transition, the voltages required for 10 and 90% transmission changes and reverse 90 and 10% transmission changes were measured for various pulse durations. For the W-B transition, the voltages required for 90 and 10% transmission changes only were measured for various pulse durations. These levels were set on the oscilloscope once the 0 and 100% transmission levels were known (i.e. black and white), and they could also be used to determine the optical response time of the transition (for 10 to 90% transmission changes). $E_{LC@100 \mu s}$ was determined from the average switching field of both the W-B and B-W transitions in these examples.

Twisted type test cells were used with cell gaps typically 3-5 μm, in transmissive mode and with crossed polarisers.

Due to the varying cell gaps and different mixture Δn values, the retardation was not optimised but this is not crucial as it only decreases the contrast.

Example 1

| Compound | Amount (wt %) |
|---|---|
| PZU-V2-N | 20 |
| CDU-2-F | 10 |
| CDU-3-F | 10 |
| CDU-5-F | 10 |
| CCZU-2-F | 6 |
| CCZU-3-F | 13 |
| CCZU-5-F | 6 |
| CC-5-V | 10 |
| CCPC-33 | 5 |
| CCPC-34 | 5 |
| CCPC-35 | 5 |
| Total | 100 |
| $T_{NI}$ (° C.) | 94.6 |
| $\Delta\epsilon$ | 29.7 |
| $\Delta n$ | 0.0927 |
| $K_1$ (pN) | 7.4 |
| $K_3$ (pN) | 13.8 |
| $V_{opt}$ (V) | 8.2 |
| $\Delta V_{opt}$ (V) | * |
| $\tau_{opt}$ (ms) | 27 |
| d (μm) | 4.1 |
| $d_{opt}$ (μm) | 3.4 |

*: $\Delta V_{opt}$ was too wide to be determined

Example 2

| Compound | Amount (wt %) |
|---|---|
| PZU-V2-N | 20 |
| PCH-3N.F.F | 10 |
| PCH-5N.F.F | 10 |
| CC-5-V | 19 |
| CH-33 | 4 |
| CH-35 | 4 |
| CH-43 | 4 |
| CH-45 | 4 |
| CP-33 | 5 |
| CP-35 | 5 |
| CCPC-33 | 5 |
| CCPC-34 | 5 |
| CCPC-35 | 5 |
| Total | 100 |
| $T_{NI}$ (° C.) | 95.0 |
| $\Delta\epsilon$ | 23.4 |
| $\Delta n$ | 0.0959 |
| $K_1$ (pN) | 9.5 |
| $K_3$ (pN) | 12.6 |
| $V_{opt}$ (V) | 8.6 |
| $\Delta V_{opt}$ (V) | 17.4 |
| $\tau_{opt}$ (ms) | 12 |
| d (μm) | 4.4 |
| $d_{opt}$ (μm) | 3.3 |

Example 3

| Compound | Amount (wt %) |
|---|---|
| PZU-V2-N | 20 |
| HP-3N.F | 5 |
| HP-4N.F | 5 |
| HP-5N.F | 5 |
| OS-33 | 10 |
| OS-35 | 10 |
| OS-53 | 10 |
| CC-5-V | 20 |
| CCPC-33 | 5 |
| CCPC-34 | 5 |
| CCPC-35 | 5 |
| Total | 100 |
| $T_{NI}$ (° C.) | 92.8 |
| $\Delta\epsilon$ | 23.6 |
| $\Delta n$ | 0.0975 |
| $K_1$ (pN) | 10.9 |
| $K_3$ (pN) | 12.5 |
| $V_{opt}$ (V) | 9.5 |
| $\Delta V_{opt}$ (V) | 5.5 |
| $\tau_{opt}$ (ms) | 19 |
| d (μm) | 4.1 |
| $d_{opt}$ (μm) | 3.2 |

Example 4

| Compound | Amount (wt %) |
|---|---|
| PZU-V2-N | 20 |
| CDU-2-F | 10 |
| CDU-3-F | 10 |
| CDU-5-F | 10 |
| CCQU-2-F | 9 |
| CCQU-3-F | 9 |
| CCQU-5-F | 9 |
| CGZP-2-OT | 4 |
| CGZP-3-OT | 4 |
| CCPC-33 | 5 |
| CCPC-34 | 5 |
| CCPC-35 | 5 |
| Total | 100 |
| $T_{NI}$ (° C.) | 96.7 |
| $\Delta\epsilon$ | 33.4 |
| $\Delta n$ | 0.0992 |
| $K_1$ (pN) | 7.2 |
| $K_3$ (pN) | 16.0 |
| $V_{opt}$ (V) | 7.7 |
| $\Delta V_{opt}$ (V) | * |
| $\tau_{opt}$ (ms) | 18 |
| d (μm) | 4.1 |
| $d_{opt}$ (μm) | 3.2 |

*: $\Delta V_{opt}$ was too wide to be determined

Example 5

| Compound | Amount (wt %) |
| --- | --- |
| PZU-V2-N | 21 |
| CCP-2OCF3 | 6 |
| CCP-3OCF3 | 6 |
| CCP-4OCF3 | 6 |
| CCP-5OCF3 | 6 |
| CC-3-V | 10 |
| CC-3-V1 | 10 |
| CC-5-V | 20 |
| CCPC-33 | 5 |
| CCPC-34 | 5 |
| CCPC-35 | 5 |
| Total | 100 |
| $T_{NI}$ (° C.) | 99.0 |
| $\Delta\epsilon$ | 16.4 |
| $\Delta n$ | 0.0913 |
| $K_1$ (pN) | 13.1 |
| $K_3$ (pN) | 18.7 |
| $V_{opt}$ (V) | 9.4 |
| $\Delta V_{opt}$ (V) | 3.8 |
| $\tau_{opt}$ (ms) | 11 |
| d (μm) | 4.2 |
| $d_{opt}$ (μm) | 3.4 |

Example 6

| Compound | Amount (wt %) |
| --- | --- |
| PZU-V2-N | 20 |
| CDU-2-F | 10 |
| CDU-3-F | 10 |
| CDU-5-F | 10 |
| CCZU-2-F | 6 |
| CCZU-3-F | 13 |
| CCZU-5-F | 6 |
| CC-5-V | 5 |
| CCP-V-1 | 5 |
| CBC-33F | 5 |
| CBC-35F | 5 |
| CBC-55F | 5 |
| Total | 100 |
| $T_{NI}$ (° C.) | 92.7 |
| $\Delta\epsilon$ | 30.1 |
| $\Delta n$ | 0.1048 |
| $K_1$ (pN) | 7.6 |
| $K_3$ (pN) | 13.7 |
| $V_{opt}$ (V) | 9.1 |
| $\Delta V_{opt}$ (V) | 12.3 |
| $\tau_{opt}$ (ms) | 31 |
| d (μm) | 4.1 |
| $d_{opt}$ (μm) | 3.0 |

Example 7

| Compound | Amount (wt %) |
| --- | --- |
| PZU-V2-N | 20 |
| PCH-3N.F.F | 10 |
| CDU-2-F | 5 |
| CDU-3-F | 5 |
| CDU-5-F | 5 |
| D-301 | 6 |
| D-302 | 6 |
| D-401 | 6 |
| D-402 | 6 |
| CH-33 | 4 |
| CH-35 | 4 |
| CH-43 | 4 |
| CH-45 | 4 |
| CCPC-33 | 5 |
| CCPC-34 | 5 |
| CCPC-35 | 5 |
| Total | 100 |
| $T_{NI}$ (° C.) | 92.6 |
| $\Delta\epsilon$ | 22.9 |
| $\Delta n$ | 0.0984 |
| $K_1$ (pN) | 10.5 |
| $K_3$ (pN) | 13.4 |
| $V_{opt}$ (V) | 19.6 |
| $\Delta V_{opt}$ (V) | 30.1 |
| $\tau_{opt}$ (ms) | 22 |
| d (μm) | 4.3 |
| $d_{opt}$ (μm) | 3.2 |

Example 8

| Compound | Amount (wt %) |
| --- | --- |
| DU-3-N | 10 |
| DU-5-N | 10 |
| CDU-2-F | 10 |
| CDU-3-F | 10 |
| CDU-5-F | 10 |
| CCZU-2-F | 5 |
| CCZU-3-F | 10 |
| CCZU-5-F | 5 |
| CCP-V-1 | 10 |
| CC-5-V | 5 |
| CCPC-33 | 5 |
| CCPC-34 | 5 |
| CCPC-35 | 5 |
| Total | 100 |
| $T_{NI}$ (° C.) | 91.8 |
| $\Delta\epsilon$ | 18.8 |
| $\Delta n$ | 0.0817 |
| $K_1$ (pN) | 9.0 |
| $K_3$ (pN) | 14.7 |
| $V_{opt}$ (V) | 13.6 |
| $\Delta V_{opt}$ | * |
| $\tau_{opt}$ (ms) | 34 |
| d (μm) | 4.8 |
| $d_{opt}$ (μm) | 3.8 |

*: $\Delta V_{opt}$ was too wide to be determined

Example 9

| Compound | Amount (wt %) |
| --- | --- |
| PZU-V2-N | 10 |
| PUQU-2-F | 5 |
| PUQU-3-F | 5 |
| CDU-2-F | 10 |

-continued

| Compound | Amount (wt %) |
|---|---|
| CDU-3-F | 10 |
| CDU-5-F | 10 |
| CCZU-2-F | 6 |
| CCZU-3-F | 13 |
| CCZU-5-F | 6 |
| CC-5-V | 10 |
| CCPC-33 | 5 |
| CCPC-34 | 5 |
| CCPC-35 | 5 |
| Total | 100 |
| $T_{NI}$ (° C.) | 96.8 |
| $\Delta\epsilon$ | 22.0 |
| $\Delta n$ | 0.0909 |
| $K_1$ (pN) | 9.0 |
| $K_3$ (pN) | 15.2 |
| $V_{opt}$ (V) | 8.1 |
| $\Delta V_{opt}$ | * |
| $\tau_{opt}$ (ms) | 18 |
| d (μm) | 4.8 |
| $d_{opt}$ (μm) | 3.4 |

*: $\Delta V_{opt}$ was too wide to be determined

Example 10

| Compound | Amount (wt %) |
|---|---|
| PZU-V2-N | 10 |
| CGU-2-F | 8 |
| CGU-3-F | 8 |
| CGU-5-F | 8 |
| CCZU-2-F | 5 |
| CCZU-3-F | 11 |
| CCZU-5-F | 5 |
| CCQU-2-F | 5 |
| CCQU-3-F | 5 |
| CCQU-5-F | 5 |
| CCQG-2-F | 10 |
| CCQG-3-F | 10 |
| CCPC-33 | 3.5 |
| CCPC-34 | 3.5 |
| CCPC-35 | 3 |
| Total | 100 |
| $T_{NI}$ (° C.) | 100.0 |
| $\Delta\epsilon$ | 20.4 |
| $\Delta n$ | 0.0973 |
| $K_1$ (pN) | 7.4 |
| $K_3$ (pN) | 16.2 |
| $V_{opt}$ (V) | 5.4 |
| $\Delta V_{opt}$ | * |
| $\tau_{opt}$ (ms) | 37 |
| d (μm) | 4.7 |
| $d_{opt}$ (μm) | 3.3 |

*: $\Delta V_{opt}$ was too wide to be determined

Example 11

| Compound | Amount (wt %) |
|---|---|
| PZU-V2-N | 20 |
| K6 | 10 |
| K9 | 10 |
| K12 | 10 |
| PP-1-2V1 | 5 |
| CCP-V-1 | 15 |
| CCP-V2-1 | 15 |
| CCPC-33 | 5 |
| CCPC-34 | 5 |
| CCPC-35 | 5 |
| Total | 100 |
| $T_{NI}$ (° C.) | 92.0 |
| $\Delta\epsilon$ | 23.9 |
| $\Delta n$ | 0.1630 |
| $K_1$ (pN) | 10.6 |
| $K_3$ (pN) | 17.1 |
| $V_{opt}$ (V) | 21.0 |
| $\Delta V_{opt}$ (V) | 6.2 |
| $\tau_{opt}$ (ms) | 13 |
| d (μm) | 4.2 |
| $d_{opt}$ (μm) | 3.3 |

Example 12

| Compound | Amount (wt %) |
|---|---|
| PZU-V2-N | 10 |
| CDU-2-F | 8 |
| CDU-3-F | 8 |
| CDU-5-F | 8 |
| CCGU-3-F | 4 |
| CCZU-2-F | 7 |
| CCZU-3-F | 15 |
| CCZU-5-F | 7 |
| CCQU-2-F | 6 |
| CCQU-3-F | 6 |
| CCQU-5-F | 6 |
| CCOC-3-3 | 5 |
| CCOC-4-3 | 5 |
| CCOC-3-5 | 5 |
| Total | 100 |
| $T_{NI}$ (° C.) | 93.7 |
| $\Delta\epsilon$ | 21.8 |
| $\Delta n$ | 0.0810 |
| $K_1$ (pN) | 8.0 |
| $K_3$ (pN) | 16.1 |
| $V_{opt}$ (V) | 6.1 |
| $\Delta V_{opt}$ (V) | * |
| $\tau_{opt}$ (ms) | 47 |
| d (μm) | 4.6 |
| $d_{opt}$ (μm) | 3.8 |

*: $\Delta V_{opt}$ was too wide to be determined

Example 13

| Compound | Amount (wt %) |
|---|---|
| PZU-V2-N | 15 |
| CDU-2-F | 5 |
| CDU-3-F | 5 |
| CDU-5-F | 5 |
| CCGU-3-F | 5 |
| CCZU-3-F | 6 |
| CCZU-3-F | 13 |
| CCZU-5-F | 6 |
| CCQU-2-F | 5 |
| CCQU-3-F | 5 |

-continued

| Compound | Amount (wt %) |
|---|---|
| CCQU-5-F | 5 |
| CCQG-2-F | 10 |
| CCQG-3-F | 10 |
| CCPC-33 | 2.5 |
| CCPC-34 | 2.5 |
| Total | 100 |

| | |
|---|---|
| $T_{NI}$ (° C.) | 97.2 |
| $\Delta\epsilon$ | 27.3 |
| $\Delta n$ | 0.0914 |
| $K_1$ (pN) | 6.4 |
| $K_3$ (pN) | 13.8 |
| $V_{opt}$ (V) | 6.9 |
| $\Delta V_{opt}$ (V) | * |
| $\tau_{opt}$ (ms) | 39 |
| d (µm) | 4.4 |
| $d_{opt}$ (µm) | 3.4 |

*: $\Delta V_{opt}$ was too wide to be determined

Example 14

| Compound | Amount (wt %) |
|---|---|
| PZU-V2-N | 20 |
| PUQU-2-F | 10 |
| PUQU-3-F | 10 |
| PGU-2-F | 10 |
| PGU-3-F | 10 |
| PGU-5-F | 10 |
| CCPC-33 | 5 |
| CCPC-34 | 5 |
| CCPC-35 | 5 |
| CBC-33F | 5 |
| CBC-53F | 5 |
| CBC-55F | 5 |
| Total | 100 |

| | |
|---|---|
| $T_{NI}$ (° C.) | 87.8 |
| $\Delta\epsilon$ | 47.0 |
| $\Delta n$ | 0.1641 |
| $K_1$ (pN) | 10.0 |
| $K_3$ (pN) | 13.0 |
| $V_{opt}$ (V) | 18.7 |
| $\Delta V_{opt}$ (V) | * |
| d (µm) | 4.5 |
| $d_{opt}$ (µm) | 3.3 |

*: $\Delta V_{opt}$ was too wide to be determined

Example 15

| Compound | Amount (wt %) |
|---|---|
| PZU-V2-N | 20 |
| PCH-3N.F.F | 9 |
| PGU-2-F | 10 |
| PGU-3-F | 10 |
| PGU-5-F | 10 |
| CCP-V-1 | 13 |
| CCP-V2-1 | 13 |
| CCPC-33 | 5 |
| CCPC-34 | 5 |
| CCPC-35 | 5 |
| Total | 100 |

| | |
|---|---|
| $T_{NI}$ (° C.) | 87.9 |
| $\Delta\epsilon$ | 34.1 |
| $\Delta n$ | 0.1495 |
| $K_1$ (pN) | 10.1 |
| $K_3$ (pN) | 14.9 |
| $V_{opt}$ (V) | 10.7 |
| $\Delta V_{opt}$ (V) | * |
| $\tau_{opt}$ (ms) | 27 |
| d (µm) | 4.2 |
| $d_{opt}$ (µm) | 3.6 |

Example 16

| Compound | Amount (wt %) |
|---|---|
| PZU-V2-N | 20 |
| PGU-2-F | 10 |
| PGU-3-F | 10 |
| PGU-5-F | 10 |
| PP-1-2V | 5 |
| PP-1-2V1 | 9.5 |
| CCP-V-1 | 10.5 |
| CCP-V2-1 | 10 |
| CCPC-33 | 5 |
| CCPC-34 | 5 |
| CCPC-35 | 5 |
| Total | 100 |

| | |
|---|---|
| $T_{NI}$ (° C.) | 89.2 |
| $\Delta\epsilon$ | 30.6 |
| $\Delta n$ | 0.1769 |
| $K_1$ (pN) | 13.1 |
| $K_3$ (pN) | 14.5 |
| d (µm) | 4.7 |
| $d_{opt}$ (µm) | 3.3 |

Example 17

| Compound | Amount (wt %) |
|---|---|
| PZU-V2-N | 10 |
| PGU-2-F | 10 |
| PGU-3-F | 10 |
| PGU-5-F | 10 |
| CGU-2-F | 10 |
| CGU-3-F | 10 |
| CGU-5-F | 10 |
| CCGU-3-F | 5 |
| CCP-V-1 | 5 |
| CCP-V2-1 | 5 |
| CCPC-33 | 5 |
| CCPC-34 | 5 |
| CCPC-35 | 5 |
| Total | 100 |

| | |
|---|---|
| $T_{NI}$ (° C.) | 97.8 |
| $\Delta\epsilon$ | 24.5 |
| $\Delta n$ | 0.1506 |
| $K_1$ (pN) | 9.1 |
| $K_3$ (pN) | 13.5 |
| $d_{opt}$ (µm) | 3.6 |

Example 18

| Compound | Amount (wt %) |
| --- | --- |
| PZU-V2-N | 21 |
| PCH-3N.F.F | 9 |
| CGU-2-F | 9 |
| CGU-3-F | 9 |
| CGU-5-F | 9 |
| CCGU-3-F | 6 |
| CCP-V-1 | 11 |
| CCP-V2-1 | 11 |
| CCPC-33 | 5 |
| CCPC-34 | 5 |
| CCPC-35 | 5 |
| Total | 100 |
| $T_{NI}$ (° C.) | 96.6 |
| $\Delta\epsilon$ | 32.0 |
| $\Delta n$ | 0.1255 |
| $K_1$ (pN) | 8.9 |
| $K_3$ (pN) | 17.2 |
| $d_{opt}$ (μm) | 4.2 |

Examples 1 to 15 and 16 to 18 show mixtures useful in zenithal bistable nematic liquid crystal displays.

Comparative Example

MLC-6204 (Merck KGBA, Darmstadt) was tested under similar conditions as the Examples according to the invention:

| | |
| --- | --- |
| $T_{NI}$ (° C.) | 62.4 |
| $\Delta\epsilon$ | 35.2 |
| $\Delta n$ | 0.1484 |
| $K_1$ (pN) | 7.5 |
| $K_3$ (pN) | 14.8 |
| $V_{opt}$ (V) | 11.8 |
| $\Delta V_{opt}$ (V) | 7.3 |
| $\tau_{opt}$ (ms) | 41 |
| $\gamma 1$ (mPa · s) | 358 |

The invention claimed is:

1. In a method of achieving an electrooptical effect comprising applying a voltage to a bistable liquid crystal device containing a liquid crystal composition, the improvement wherein said composition comprises:

from 1 to 30 weight %, based on the total weight of the composition, of a component (αα) containing one or more compounds having a dielectric anisotropy Δε of at least 40; and a component (ββ) comprising at least one compound of formula I and/or of formula II and/or of formula III and/or of formula IV

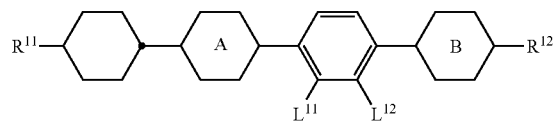

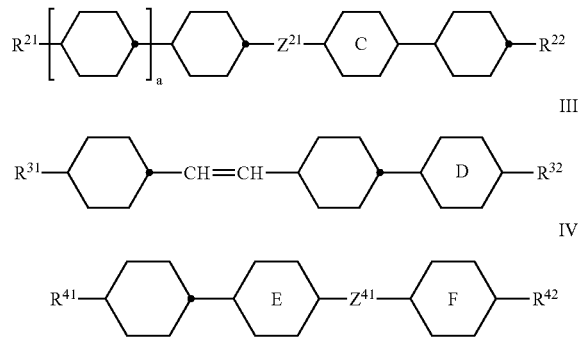

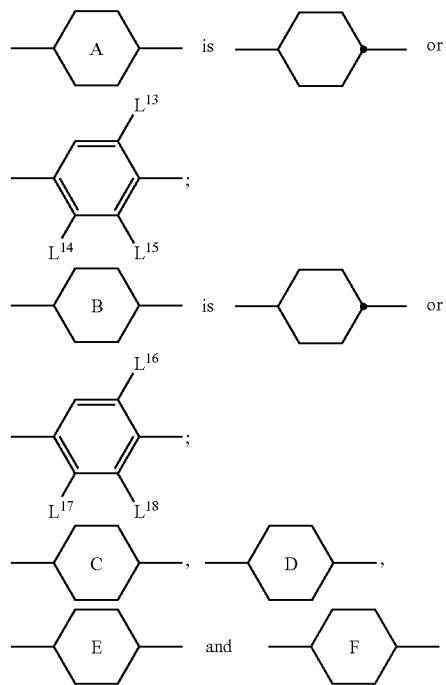

in which a is 0 or 1;

$R^{11}$, $R^{12}$, $R^{21}$, $R^{22}$, $R^{31}$, $R^{32}$, $R^{41}$ and $R^{42}$ are independently of each other $C_1$-$C_{15}$ alkyl which is unsubstituted or mono- or poly-substituted with CN or halogen and in which one or more of the $CH_2$ groups may be replaced independently of each other by —O—, —S—, —CH═CH—, —C≡C—, —CO—O—, —OC—O— such that there are no hetero atoms adjacent to each other, with the proviso that $R^{41}$ has no —CH═CH— moiety if $Z^{41}$ is a single bond;

$L^{11}$ and $L^{12}$ are independently of each other H or F;

$Z^{21}$ and $Z^{41}$ are independently of each other a single bond, —CO—O—, —CH$_2$O—, —OCH$_2$— —CF$_2$O—, —OCF$_2$— —CH$_2$CH$_2$—, —CF$_2$CF$_2$—, —CH$_2$CF$_2$—, —CF$_2$CH$_2$—, —CH═CH— or —C≡C—;

are independently of each other

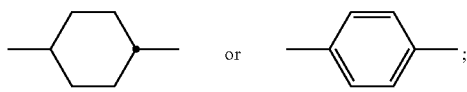 or and $L^{13}, L^{14}, L^{15}, L^{16}, L^{17}$ and $L^{18}$ are independently of each other H or F.

2. A method according to claim 1, wherein said liquid crystal device is a zenithal bistable nematic liquid crystal device.

3. A method according to claim 1, wherein said composition comprises at least 5 weight %, based on the total weight of the composition, of component (ββ).

4. A method according to claim 1, wherein said composition further comprises a component (ωω) containing one or more compounds having a dielectric anisotropy Δε ranging from 5 to 40.

5. A method according to claim 4, wherein said composition comprises from 1 to 90 weight % and.

6. A method according to claim 1, wherein said component (αα) comprises at least one compound of formula V

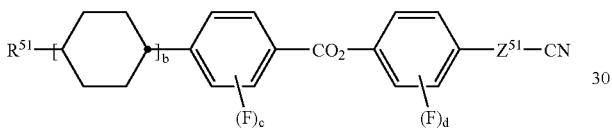

V in which
b is 0 or 1;
c and d are independently of each other 0, 1, 2, 3 or 4;
$R^{51}$ is $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;
$Z^{51}$ is a single bond or —C≡C—;
with the provisos that d is 1, 2, 3 or 4, if b is 1; and $R^{51}$ is $C_1$-$C_3$ alkyl, if both b and d are 1.

7. A method according to claim 6, wherein said at least one compound of formula V is a compound of formula VA-1 and/or formula VB-1

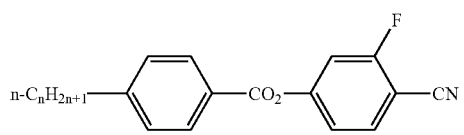

VA-1

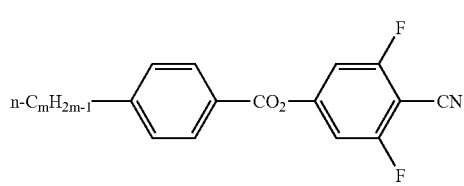

VB-1 in which
n is an integer from 1 to 8; and
m is an integer from 2 to 8.

8. A method according to claim 4, wherein said component (ωω) comprises at least one compound of formula VI and/or of formula VII and/or of formula VIII and/or of formula IX and/or of formula X

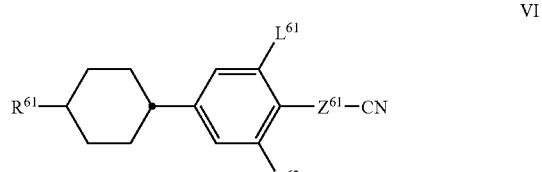

VI

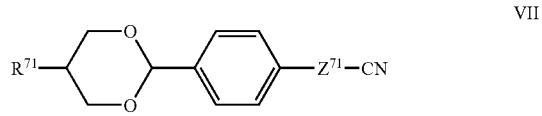

VII

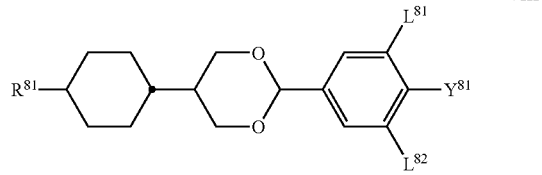

VIII

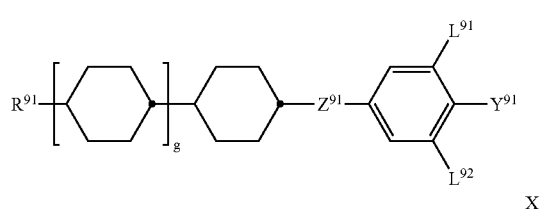

IX

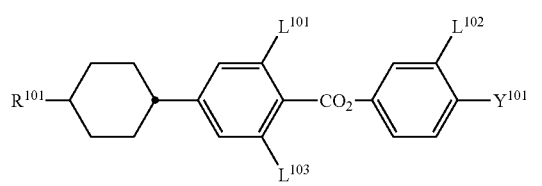

X wherein
g is 0 or 1;
$R^{61}, R^{71}, R^{81}$,
$R^{91}, R^{101}$ are independently of each other $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other,
whereby $R^{81}$ is $C_3$-$C_{15}$ alkyl, if $Y^{81}$ is CN,
$R^{91}$ has no —CH=CH— moiety, if, at the same time, g is 1, $Z^{91}$ is a single bond, $L^{91}$ is F and $L^{92}$ is H or $L^{91}$ is H and $L^{92}$ is F, and
$R^{101}$ is $C_4$-$C_{15}$ alkyl, if, at the same time, $L^{101}$ and $L^{102}$ are F and $Y^{101}$ is CN;
$L^{61}, L^{62}, L^{81}, L^{82}, L^{91}, L^{92}, L^{101}, L^{102}$ and $L^{103}$ are independently of each other H or F;
$Y^{81}$ is F, Cl, CN, NCS, $SF_5$, or $C_{1-15}$ alkanyl or alkoxy which are mono- or poly-substituted with F and/or Cl;

$Y^{81}$ is F, Cl, CN, NCS, SF$_5$, C$_{1-15}$ alkanyl or alkoxy which are mono- or poly-substituted with F and/or Cl, whereby $Y^{91}$ is F, Cl, CN, NCS or SF$_5$, if both $L^{91}$ and $L^{92}$ are H;

$Y^{101}$ is F, Cl, CN, NCS, SF$_5$, C$_{1-15}$ alkanyl or alkoxy which are mono- or poly-substituted with F and/or Cl, whereby $Y^{101}$ is F, Cl, CN, NCS or SF$_5$, if $L^{101}$, $L^{102}$ and $L^{103}$ are H at the same time;

$Z^{61}$ and $Z^{71}$ are independently of each other a single bond or —C≡C—; and $Z^{91}$ is a single bond, —CO—O— or —CF$_2$O—, whereby $Z^{91}$ is not a single bond, if g is 0.

9. A method according to claim 4, wherein said component (ωω) comprises at least one compound of formula VIC-1 and/or of formula VIII-B1:

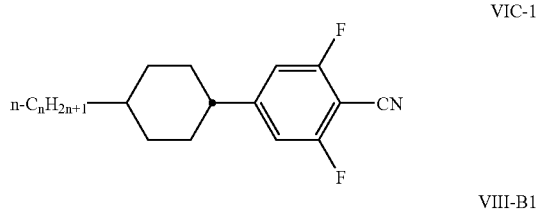

in which n is an integer from 1 to 8.

10. A method according to claim 4, wherein said component (ωω) comprises at least one compound of formula XV

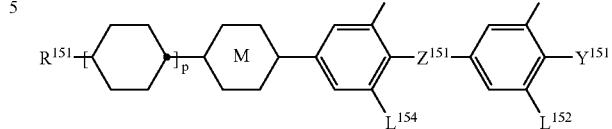

wherein $R^{151}$ is C$_1$-C$_{15}$ alkyl which is unsubstituted or mono- or poly-substituted with CN or halogen and in which one or more of the CH$_2$ groups may be replaced independently of each other by —O—, —S—, —CH═CH—, —C≡C—, —CO—O—, —OC—O— such that there are no hetero atoms adjacent to each other;

$Y^{151}$ is F, Cl, CN, NCS, SF$_5$, or C$_{1-15}$ alkanyl, alkenyl or alkoxy wherein said alkanyl, alkenyl or alkoxy radical is mono- or poly-substituted with F and/or Cl;

$Z^{151}$ is a single bond, —CO$_2$— or —CF$_2$O—;

$L^{151}$, $L^{152}$, $L^{153}$ and $L^{154}$ are independently of each other H or F;

p is 0 or 1; and

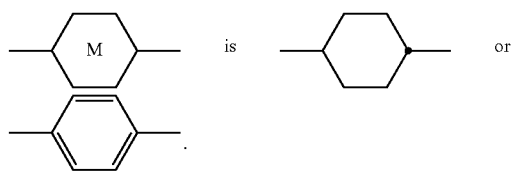

11. A method according to claim 1, wherein characteiized in that said component (ββ) comprises at least one compound of formula IG-1 and/or of formula IH-1 and/or of formula IID-1 and/or of formula IVC-1 and/or of formula IVD-1:

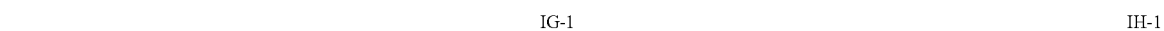

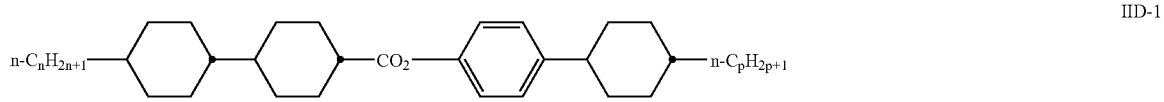

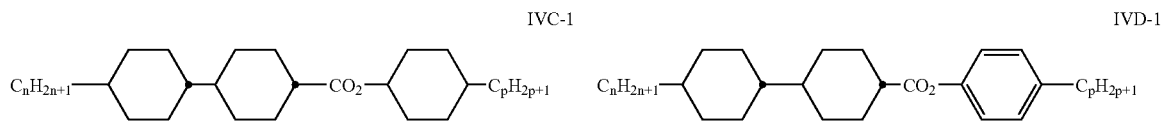

wherein n and p are independently of each other an integer from 1 to 8.

12. A method according to claim 1, wherein said component (αα) is comprised in said composition in an amount of 1 to 25 weight %.

13. A method according to claim 4, wherein said component (ωω) is comprised in said composition in an amount of 1 to 60 weight %.

14. A method according to claim 1, wherein said composition further comprises one or more compounds selected from formula XI and XII:

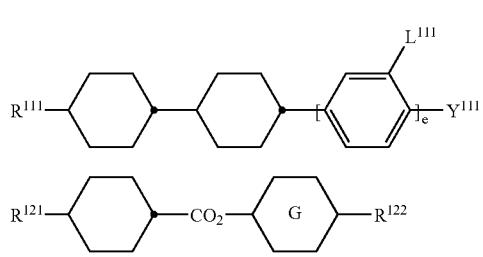

wherein
  e is 0 or 1;
  $R^{111}$ is $C_2$-$C_{15}$ alkenyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;
  $R^{121}$ and $R^{122}$ are independently of each other $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;
  $L^{111}$ is H or F;
  $Y^{111}$ is F, Cl, CN, $CF_3$, $OCF_3$, $OCHF_2$ or $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other; and

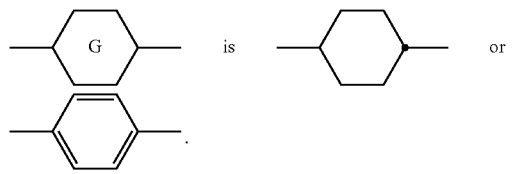

15. A bistable liquid crystal device comprising
  two outer substrates which, together with a frame, form a cell;
  a liquid crystal composition present in said cell;
  electrode structures with alignment layers on the inside of said outer substrates whereby at least one alignment layer comprises an alignment grating that permits the compounds of said liquid crystal composition to adopt at least two different stable states whereby the assembly of said electrode structures with said alignment layers being such that a switching between the said at least two different stable states is achieved by applying suitable electric signals to said electrode structures;
  said liquid crystal composition comprising
    from 1 to 30 weight %, based on the total weight of the composition, of a component (αα) containing one or more compounds having a dielectric anisotropy Δε of at least 40; and
    a component (ββ) said component comprising at least one compound of formula I and/or of formula II and/or of formula III and/or of formula IV

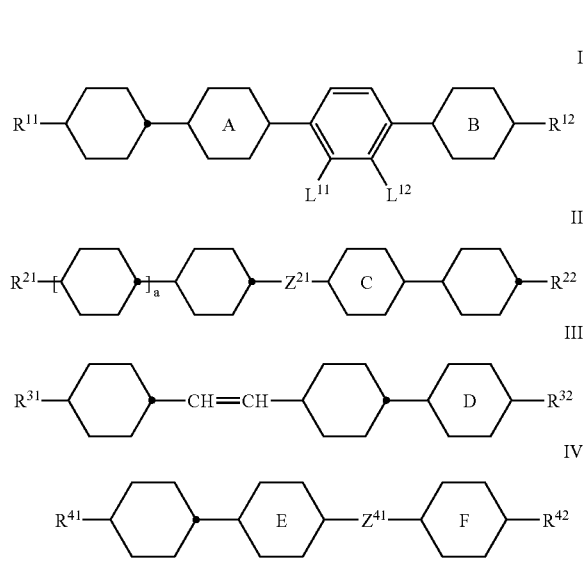

in which
  a is 0 or 1;
  $R^{11}$, $R^{12}$, $R^{21}$, $R^{22}$, $R^{31}$, $R^{32}$, $R^{41}$ and $R^{42}$ are independently of each other $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other, with the proviso that $R^4$ has no —CH=CH— moiety if $Z^{41}$ is a single bond;
  $L^{11}$ and $L^{12}$ are independently of each other H or F;
  $Z^{21}$ and $Z^{41}$ are independently of each other a single bond, —CO—O—, —$CH_2O$—, —$OCH_2$—, —$CF_2O$—, —$OCF_2$—, —$CH_2CH_2$—, —$CF_2CF_2$—, —$CH_2CF_2$—, —$CF_2CH_2$—, —CH=CH— or —C≡C—;

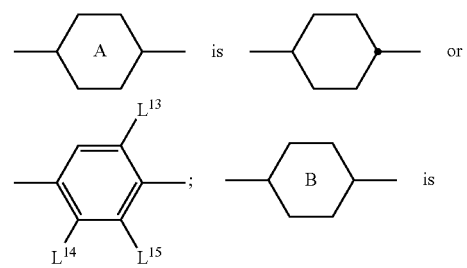

-continued

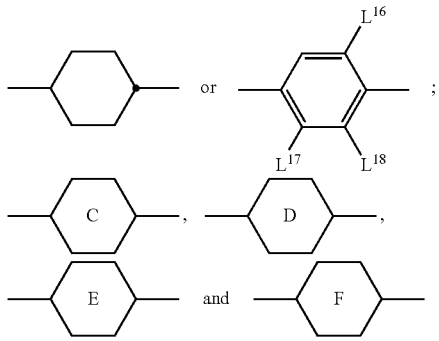

are independently of each other

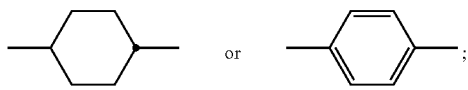

and $L^{13}$, $L^{14}$, $L^{15}$, $L^{16}$, $L^{17}$ and $L^{18}$ are independently of each other H or F.

16. A bistable liquid crystal device according to claim 15, wherein
said device is a zenithal bistable nematic liquid crystal device; and
said electrode structures with alignment layers on the inside of said outer substrates have at least one alignment layer that comprises an alignment grating that permits the compounds of said liquid crystal composition to adopt at least two different stable states with different pretilt angles in the same azimuthal plane.

17. A bistable liquid crystal device according to claim 15, wherein said liquid crystal composition comprises at least 5 weight % of said component (ββ).

18. A bistable liquid crystal device according to claim 15, wherein said liquid crystal composition further comprises a component (ωω) containing one or more compounds having a dielectric anisotropy Δε ranging from 5 to 40.

19. A bistable liquid crystal device according to claim 15, wherein said liquid crystal composition comprises from 1 to 90 weight %, of said component (ωω).

20. A bistable liquid crystal device according to claim 15, wherein said component (αα) of said composition comprises at least one compound of formula V

V

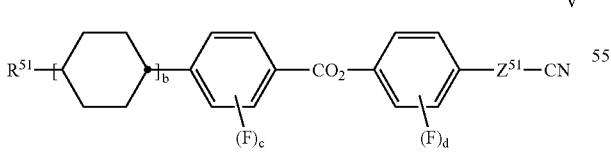

in which
b is 0 or 1;
c and d are independently of each other 0, 1, 2, 3 or 4;
$R^{51}$ is $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;and
$Z^{51}$ is a single bond or —C≡C—;
with the provisos that d is 1, 2, 3 or 4, if b is 1; and $R^{51}$ is $C_1$-$C_3$ alkyl, if both b and d are 1.

21. A bistable liquid crystal device according to claim 18, wherein said component (ωω) comprises at least one compound of formula VI and/or of formula VII and/or of formula VIII and/or of formula IX and/or of formula X

VI

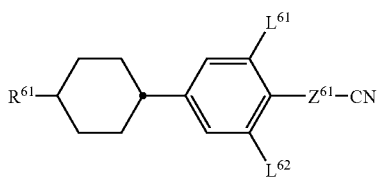

VII

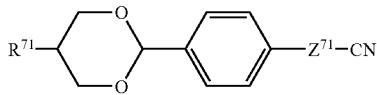

VIII

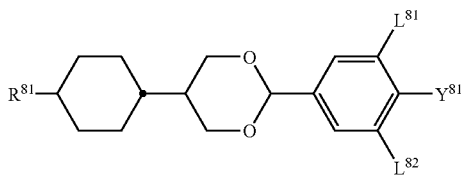

IX

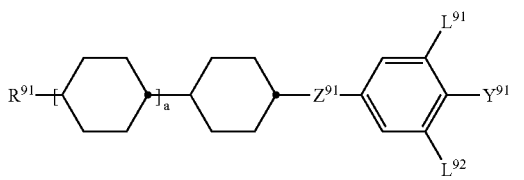

X

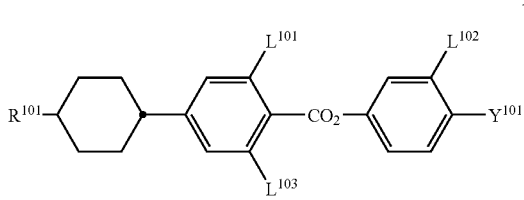

wherein
g is 0 or 1;
$R^{61}$, $R^{71}$, $R^{81}$, $R^{91}$, and $R^{101}$ are independently of each other $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other,
whereby $R^{81}$ is $C_3$-$C_{15}$ alkyl, if $Y^{81}$ is CN,
$R^{91}$ has no —CH=CH— moiety, if, at the same time, g is 1, $Z^{91}$ is a single bond, $L^{91}$ is F and $L^{92}$ is H, and
$R^{101}$ is $C_4$-$C_{15}$ alkyl, if, at the same time, $L^{101}$ and $L^{102}$ are F and $Y^{101}$ is CN;
$L^{61}$, $L^{62}$, $L^{81}$, $L^{82}$, $L^{91}$, $L^{92}$, $L^{100}$, $L^{102}$ and $L^{103}$ are independently of each other H or F;
$Y^{81}$ is F, Cl, CN, NCS, $SF_5$, or $C_{1-15}$ alkanyl or alkoxy which are mono- or poly-substituted with F and/or Cl;

$Y^{91}$ is F, Cl, CN, NCS, SF$_5$, C$_{1-15}$ alkanyl or alkoxy which are mono- or poly-substituted with F and/or Cl, whereby $Y^{101}$ is F, Cl, CN, NCS or SF$_5$, if both $L^{91}$ and $L^{92}$ are H;

$Y^{101}$ is F, Cl, CN, NCS, SF$_5$, C$_{1-15}$ alkanyl or alkoxy which are mono- or poly-substituted with F and/or Cl, whereby $Y^{101}$ is F, Cl, CN, NCS or SF$_5$, if $L^{101}$, $L^{102}$ and $L^{103}$ are H at the same time;

$Z^{61}$ and $Z^{71}$ are independently of each other a single bond or —C≡C—; and $Z^{91}$ is a single bond, —CO—O— or —CF$_2$O—, whereby $Z^{91}$ is not a single bond, if g is 0.

22. A bistable liquid crystal device according to claim 18, wherein said component (ββ) comprises one or more compounds of formula XV:

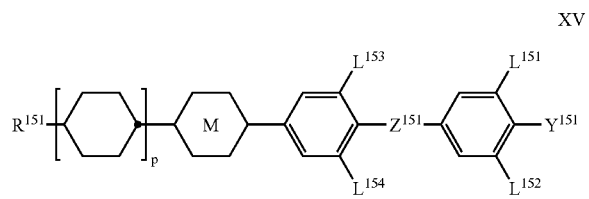

wherein $R^{151}$ is C$_1$-C$_{15}$ alkyl which is unsubstituted or mono- or poly-substituted with CN or halogen and in which one or more of the CH$_2$ groups may be replaced independently of each other by —O—, —S—, —CH═CH—, —C≡C—, —CO—O—, —OC—O— such that there are no hetero atoms adjacent to each other;

$Y^{151}$ is F, Cl, CN, NCS, SF$_5$, or C$_{1-15}$ alkanyl, alkenyl or alkoxy wherein said alkanyl, alkenyl or alkoxy radical is mono or poly-substituted with F and/or Cl;

$Z^{151}$ is a single bond, —CO$_2$— or —CF$_2$O—;

$L^{151}$, $L^{152}$, $L^{153}$ and $L^{154}$ are independently of each other H or F;

p is 0 or 1; and

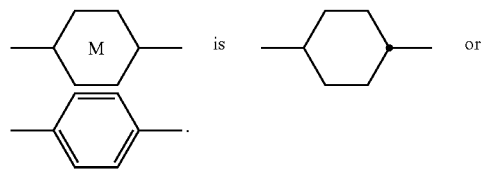

23. A bistable liquid crystal device according to claim 15, wherein said composition further comprises one or more compounds selected from compounds of formula XI and XII:

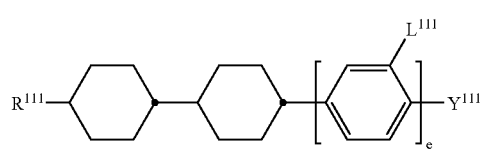

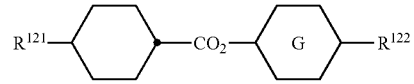

wherein e is 0 or 1;

$R^{111}$ is C$_2$-C$_{15}$ alkenyl which is unsubstituted or mono- or poly-substituted with CN or halogen and in which one or more of the CH$_2$ groups may be replaced independently of each other by —O—, —S—, —CH═CH—, —C≡C—, —CO—O—, —OC—O— such that there are no hetero atoms adjacent to each other;

$R^{121}$ and $R^{122}$ are independently of each other C$_1$-C$_{15}$ alkyl which is unsubstituted or mono- or poly-substituted with CN or halogen and in which one or more of the CH$_2$ groups may be replaced independently of each other by —O—, —S—, —CH═CH—, —C≡C—, —CO—O—, —OC—O— such that there are no hetero atoms adjacent to each other;

$L^{111}$ is H or F;

$Y^{111}$ is F, Cl, CN, CF$_3$, OCF$_3$, OCHF$_2$ or C$_1$-C$_{15}$ alkyl which is unsubstituted or mono- or poly-substituted with CN or halogen and in which one or more of the CH$_2$ groups may be replaced independently of each other by —O—, —S—, —CH═CH—, —C≡C—, —CO—O—, —OC—O— such that there are no hetero atoms adjacent to each other; and

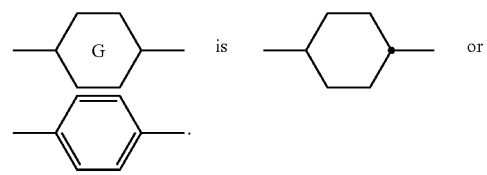

24. A bistable liquid crystal device according to claim 15, wherein said component (αα) is comprised in said composition in an amount of 1 to 25 weight %.

25. A bistable liquid crystal device according to claim 15, wherein said device is a reflective or transflective device.

26. A method according to claim 4, wherein said composition comprises from 1 to 80 weight % of said component (ωω).

27. A method according to claim 1, wherein said component (αα) is comprised in said composition in an amount of 10 to 25 weight %.

28. A bistable liquid crystal device according to claim 15, wherein said liquid crystal composition comprises from 1 to 80 weight % of said component (ωω).

29. A bistable liquid crystal device according to claim 15, wherein said liquid crystal composition comprises from 10 to 60 weight % of said component (ωω).

30. A bistable liquid crystal device according to claim 15, wherein said component (αα) is comprised in said composition in an amount of 10 to 25 weight %.

31. A bistable liquid crystal device according to claim 15, wherein said device is a a single polariser reflective or transflective display.

* * * * *

UNITED STATES PATENT AND TRADEMARK OFFICE
CERTIFICATE OF CORRECTION

PATENT NO. : 7,335,404 B2 Page 1 of 1
APPLICATION NO. : 10/555593
DATED : February 26, 2008
INVENTOR(S) : Mark Goulding It is certified that error appears in the above-identified patent and that said Letters Patent is hereby corrected as shown below:

Column 81, line 22 delete "and" at the end of sentence.
Column 84, line 36 - 37 delete "characterized in that"
Column 88, line 64 reads "$L^{100}$" should read -- $L^{101}$ --
Column 89, line 3 reads "$Y^{101}$" should read -- $Y^{91}$ --

Signed and Sealed this

Fifth Day of August, 2008

JON W. DUDAS
*Director of the United States Patent and Trademark Office*